(12) United States Patent
Artwohl et al.

(10) Patent No.: US 10,390,633 B2
(45) Date of Patent: *Aug. 27, 2019

(54) DISPLAY CASE DOOR ASSEMBLY WITH VACUUM PANEL AND LIGHTING FEATURES

(71) Applicant: Anthony, Inc., Sylmar, CA (US)

(72) Inventors: Paul J. Artwohl, Stevensville, MI (US); Jeffery W. Nicholson, Palmdale, CA (US); Matthew Rolek, Valencia, CA (US); Mark Sandnes, Sylmar, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,570

(22) Filed: Nov. 19, 2018

(65) Prior Publication Data

US 2019/0090661 A1 Mar. 28, 2019

Related U.S. Application Data

(63) Continuation of application No. 15/925,054, filed on Mar. 19, 2018, now Pat. No. 10,130,193, which is a (Continued)

(51) Int. Cl.
*A47F 3/04* (2006.01)
*A47F 3/00* (2006.01)
(Continued)

(52) U.S. Cl.
CPC .......... *A47F 3/0434* (2013.01); *A47F 3/001* (2013.01); *A47F 3/125* (2013.01); *A47F 11/10* (2013.01);
(Continued)

(58) Field of Classification Search
CPC ........ A47F 3/001; A47F 3/0434; A47F 3/125; A47F 11/10; E05D 3/02; E05D 7/081;
(Continued)

(56) References Cited

U.S. PATENT DOCUMENTS 2,002,322 A 5/1935 Kraemer
2,959,493 A 11/1960 Vincent
(Continued)

FOREIGN PATENT DOCUMENTS

DE 10 2008010585 8/2009
EP 1795839 6/2007
(Continued)

OTHER PUBLICATIONS

Extended European Search Report for Application No. 15151666.3 (107939-0229), dated Jul. 2, 2015, 8 pages.
(Continued)

*Primary Examiner* — James M Ference
(74) *Attorney, Agent, or Firm* — Fish & Richardson P.C.

(57) ABSTRACT

A display case door assembly for a temperature-controlled storage device includes a vacuum panel, a hinge rail, and a lighting element. The vacuum panel includes a first vacuum pane, a second vacuum pane, and an evacuated gap between the first and second vacuum panes. The evacuated gap provides thermal insulation for the vacuum panel. The hinge rail is coupled to an edge of the vacuum panel and configured to rotate along with the vacuum panel between an open position and a closed position. The lighting element is coupled to at least one of the edge rail and the vacuum panel and configured to emit light toward an interior of the temperature-controlled storage device when the hinge rail and vacuum panel are in at least the closed position.

18 Claims, 32 Drawing Sheets

Related U.S. Application Data continuation of application No. 15/624,342, filed on Jun. 15, 2017, now Pat. No. 9,918,566, which is a continuation of application No. 15/184,842, filed on Jun. 16, 2016, now Pat. No. 9,687,087.

(51) Int. Cl.

| | | |
|---|---|---|
| *A47F 11/10* | (2006.01) | |
| *A47F 3/12* | (2006.01) | |
| *E06B 3/36* | (2006.01) | |
| *E06B 3/66* | (2006.01) | |
| *E06B 5/00* | (2006.01) | |
| *E05F 1/06* | (2006.01) | |
| *E05D 3/02* | (2006.01) | |
| *E06B 3/02* | (2006.01) | |
| E05D 7/081 | (2006.01) | |
| E06B 3/54 | (2006.01) | |
| E06B 3/663 | (2006.01) | |
| E06B 3/677 | (2006.01) | |

(52) U.S. Cl.
CPC .............. *E05D 3/02* (2013.01); *E05F 1/063* (2013.01); *E06B 3/025* (2013.01); *E06B 3/367* (2013.01); *E06B 3/6612* (2013.01); *E06B 5/006* (2013.01); *E05D 7/081* (2013.01); *E05Y 2800/106* (2013.01); *E05Y 2900/202* (2013.01); *E05Y 2900/31* (2013.01); *E06B 3/5454* (2013.01); *E06B 3/6617* (2013.01); *E06B 3/66304* (2013.01); *E06B 3/677* (2013.01); *Y02A 30/25* (2018.01); *Y02B 80/24* (2013.01)

(58) Field of Classification Search
CPC .............. E05F 1/063; E05Y 2800/106; E05Y 2900/202; E05Y 2900/31; E06B 3/025; E06B 3/367; E06B 3/5454; E06B 3/6612; E06B 3/6617; E06B 3/66304; E06B 3/677; E06B 5/006; Y02A 30/25; Y02B 80/24

See application file for complete search history.

(56) References Cited

U.S. PATENT DOCUMENTS

| | | |
|---|---|---|
| 3,076,163 A | 1/1963 | Nodge |
| 3,441,924 A | 4/1969 | Peek et al. |
| 3,733,650 A | 5/1973 | Douglas |
| 4,371,870 A | 2/1983 | Biferno |
| 4,631,777 A | 12/1986 | Takimoto |
| 4,671,582 A | 6/1987 | Stromquist et al. |
| 4,683,154 A | 7/1987 | Benson et al. |
| 4,786,344 A | 11/1988 | Beuther |
| 4,893,902 A | 1/1990 | Baughman |
| 4,928,448 A | 5/1990 | Phillip |
| 4,991,259 A | 2/1991 | Finkelstein et al. |
| 4,998,382 A | 3/1991 | Kostos |
| 5,024,023 A | 6/1991 | Kostos |
| 5,027,574 A | 7/1991 | Phillip |
| 5,111,618 A | 5/1992 | Kaspar |
| 5,113,628 A | 5/1992 | Richardson |
| 5,124,185 A | 6/1992 | Kerr et al. |
| 5,270,084 A | 12/1993 | Parker |
| RE35,149 E | 1/1996 | Richardson |
| RE35,392 E | 12/1996 | Richardson |
| 5,643,644 A | 7/1997 | Demars |
| 5,645,330 A | 7/1997 | Artwohl |
| 5,657,607 A | 8/1997 | Collins et al. |
| 5,664,395 A | 9/1997 | Collins et al. |
| 5,891,536 A | 4/1999 | Collins et al. |
| 5,902,652 A | 5/1999 | Collins et al. |
| 5,910,083 A | 6/1999 | Richardson |
| 5,937,666 A | 8/1999 | Trulaske |
| 5,989,659 A | 11/1999 | Kato et al. |
| 6,005,652 A | 12/1999 | Matsuhira |
| 6,052,965 A | 4/2000 | Florentin et al. |
| 6,071,575 A | 6/2000 | Collins et al. |
| 6,103,324 A | 8/2000 | Collins et al. |
| 6,105,336 A | 8/2000 | Katoh et al. |
| 6,148,563 A | 11/2000 | Roche |
| 6,210,763 B1 | 4/2001 | Katoh et al. |
| 6,261,652 B1 | 7/2001 | Poix et al. |
| 6,291,036 B1 | 9/2001 | Wang et al. |
| 6,326,067 B1 | 12/2001 | Veerasamy |
| 6,336,984 B1 | 1/2002 | Aggas |
| 6,352,749 B1 | 3/2002 | Aggas |
| 6,365,242 B1 | 4/2002 | Veerasamy |
| 6,372,312 B1 | 4/2002 | Aggas |
| 6,377,228 B1 | 4/2002 | Jenkin |
| 6,383,580 B1 | 5/2002 | Aggas |
| 6,387,460 B1 | 5/2002 | Shukuri et al. |
| 6,399,169 B1 | 6/2002 | Wang et al. |
| 6,420,002 B1 | 7/2002 | Aggas et al. |
| 6,427,772 B1 | 8/2002 | Oden |
| 6,435,630 B1 | 8/2002 | Anin et al. |
| 6,436,492 B1 | 8/2002 | Landa et al. |
| 6,436,493 B1 | 8/2002 | Asano et al. |
| 6,444,281 B1 | 9/2002 | Wang et al. |
| 6,472,032 B1 | 10/2002 | Asano |
| 6,475,087 B1 | 11/2002 | Cole |
| 6,476,885 B1 | 11/2002 | Murray |
| 6,478,911 B1 | 11/2002 | Wang et al. |
| 6,479,112 B1 | 11/2002 | Shukuri et al. |
| 6,497,931 B1 | 12/2002 | Aggas |
| 6,503,583 B2 | 1/2003 | Nalepka et al. |
| 6,506,272 B1 | 1/2003 | Aggas |
| 6,541,083 B1 | 4/2003 | Landa et al. |
| 6,541,084 B2 | 4/2003 | Wang |
| 6,558,494 B1 | 5/2003 | Wang et al. |
| 6,606,832 B2 | 8/2003 | Richardson et al. |
| 6,606,833 B2 | 8/2003 | Richardson et al. |
| 6,635,321 B2 | 10/2003 | Wang et al. |
| 6,641,689 B1 | 11/2003 | Aggas |
| 6,663,923 B2 | 12/2003 | Futagami et al. |
| 6,689,241 B1 | 2/2004 | Delhorme et al. |
| 6,692,600 B2 | 2/2004 | Veerasamy et al. |
| 6,701,575 B2 | 3/2004 | Padiak et al. |
| 6,701,749 B2 | 3/2004 | Wang et al. |
| 6,874,903 B2 | 4/2005 | Yang |
| 6,946,171 B1 | 9/2005 | Aggas |
| 6,955,026 B2 | 10/2005 | Misonou |
| 7,072,096 B2 | 7/2006 | Holman |
| 7,081,178 B2 | 7/2006 | Collins |
| 7,114,306 B2 | 10/2006 | Minaai et al. |
| 7,121,675 B2 | 10/2006 | Ter-Hovhannisian |
| 7,141,130 B2 | 11/2006 | Minaai et al. |
| 7,244,480 B2 | 7/2007 | Minaai et al. |
| 7,319,407 B2 | 1/2008 | Jang |
| 7,413,233 B2 | 8/2008 | Jung |
| 7,513,637 B2 | 4/2009 | Kelly |
| 7,553,527 B2 | 6/2009 | Minaai |
| 7,722,956 B2 | 5/2010 | Collins |
| 7,833,592 B2 | 11/2010 | Pilloy |
| 7,845,142 B2 | 12/2010 | Theios |
| 7,851,034 B2 | 12/2010 | Cooper |
| 7,870,686 B2 | 1/2011 | Hines |
| 7,919,157 B2 | 4/2011 | Cooper |
| 7,929,194 B2 | 4/2011 | Legois et al. |
| 8,137,494 B2 | 3/2012 | Cooper et al. |
| 8,182,887 B2 | 5/2012 | Jones |
| 8,202,587 B2 | 6/2012 | Wang |
| 8,227,055 B2 | 7/2012 | Wang |
| 8,377,524 B2 | 2/2013 | Theios et al. |
| 8,377,525 B2 | 2/2013 | Cooper et al. |
| 8,434,904 B2 | 5/2013 | Alvarez |
| 8,460,493 B2 | 6/2013 | Cooper |
| 8,492,788 B2 | 7/2013 | Veerasamy et al. |
| 8,500,933 B2 | 8/2013 | Cooper |
| 8,506,738 B2 | 8/2013 | Wang et al. |
| 8,512,829 B2 | 8/2013 | Cooper |
| 8,512,830 B2 | 8/2013 | Bettger et al. |

(56) References Cited

U.S. PATENT DOCUMENTS

| | | |
|---|---|---|
| 8,590,343 B2 | 11/2013 | Wang |
| 8,613,161 B2 | 12/2013 | Nicholson et al. |
| 8,679,271 B2 | 3/2014 | Veerasamy |
| 8,679,598 B2 | 3/2014 | Veerasamy |
| 8,679,599 B2 | 3/2014 | Grzybowski et al. |
| 8,733,128 B2 | 5/2014 | Dennis |
| 8,742,287 B2 | 6/2014 | Dear |
| 8,763,427 B2 | 7/2014 | Wang |
| 8,794,033 B2 | 8/2014 | Dear |
| 8,821,999 B2 | 9/2014 | Grzybowski et al. |
| 8,833,105 B2 | 9/2014 | Dennis et al. |
| 8,840,007 B2 | 9/2014 | Li |
| 8,899,471 B2 | 12/2014 | Li et al. |
| 8,899,472 B2 | 12/2014 | Li et al. |
| 8,900,679 B2 | 12/2014 | Theios et al. |
| 8,950,162 B2 | 2/2015 | Miller et al. |
| 8,955,358 B2 | 2/2015 | Grzybowski et al. |
| 8,984,909 B2 | 3/2015 | Li et al. |
| 9,010,149 B2 | 4/2015 | Jeon et al. |
| 9,169,155 B2 | 10/2015 | Dennis et al. |
| 9,187,947 B2 | 11/2015 | Raggio |
| 9,221,707 B2 | 12/2015 | Wang et al. |
| 9,687,087 B1 * | 6/2017 | Artwohl ............... A47F 3/0434 |
| 9,918,566 B2 * | 3/2018 | Artwohl ............... A47F 3/0434 |
| 10,039,390 B2 * | 8/2018 | Artwohl ................... E06B 7/28 |
| 10,130,193 B2 * | 11/2018 | Artwohl ............... A47F 3/0434 |
| 2001/0010516 A1 | 8/2001 | Roh |
| 2001/0052741 A1 | 12/2001 | Yun |
| 2002/0007486 A1 | 1/2002 | Yun |
| 2003/0038912 A1 | 2/2003 | Broer |
| 2003/0117790 A1 | 6/2003 | Lee |
| 2003/0124296 A1 | 7/2003 | Smith |
| 2003/0205059 A1 | 11/2003 | Roche |
| 2003/0207090 A1 | 11/2003 | Arora |
| 2003/0214619 A1 | 11/2003 | Masuda |
| 2003/0233841 A1 | 12/2003 | Yingst |
| 2004/0073334 A1 | 4/2004 | Terranova |
| 2004/0093379 A1 | 5/2004 | Roh |
| 2004/0144328 A1 | 7/2004 | Bonner |
| 2004/0160388 A1 | 8/2004 | O'Keeffe |
| 2004/0265518 A1 | 12/2004 | Yoshizawa |
| 2005/0068629 A1 | 3/2005 | Fernando |
| 2005/0138892 A1 | 6/2005 | Misonou |
| 2005/0172654 A1 | 8/2005 | Rohrer |
| 2005/0202178 A1 | 9/2005 | Roche |
| 2005/0265019 A1 | 12/2005 | Sommers |
| 2006/0005484 A1 | 1/2006 | Riblier |
| 2006/0012985 A1 | 1/2006 | Archie, Jr. |
| 2006/0103269 A1 | 5/2006 | Artwohl |
| 2006/0145576 A1 | 7/2006 | Lee |
| 2006/0158579 A1 | 7/2006 | Hasegawa |
| 2006/0192767 A1 | 8/2006 | Murakami |
| 2007/0016478 A1 | 1/2007 | Hill |
| 2007/0024822 A1 | 2/2007 | Cortenraad |
| 2007/0058114 A1 | 3/2007 | Niiyama |
| 2007/0076431 A1 | 4/2007 | Atarashi |
| 2007/0133192 A1 | 6/2007 | Alessandro |
| 2007/0148379 A1 | 6/2007 | Theios |
| 2007/0151274 A1 | 7/2007 | Roche |
| 2007/0171647 A1 | 7/2007 | Artwohl |
| 2007/0175236 A1 | 8/2007 | Dryzun |
| 2007/0193280 A1 | 8/2007 | Tuskiewicz |
| 2007/0195535 A1 | 8/2007 | Artwohl |
| 2007/0216657 A1 | 9/2007 | Konicek |
| 2007/0257615 A1 | 11/2007 | Soh |
| 2008/0018228 A1 | 1/2008 | Choi |
| 2008/0024047 A1 | 1/2008 | Juo |
| 2008/0158858 A1 | 7/2008 | Madireddi |
| 2008/0265770 A1 | 10/2008 | Seon |
| 2009/0002990 A1 | 1/2009 | Becker |
| 2009/0036208 A1 | 2/2009 | Pennington |
| 2009/0052206 A1 | 2/2009 | Matsui |
| 2009/0108724 A1 | 4/2009 | Jang |
| 2009/0121970 A1 | 5/2009 | Ozbek |
| 2009/0146945 A1 | 6/2009 | Cho |
| 2009/0244884 A1 | 10/2009 | Trulaske |
| 2009/0276319 A1 | 11/2009 | Lungu |
| 2009/0295731 A1 | 12/2009 | Kim |
| 2010/0013925 A1 | 1/2010 | Fowler |
| 2010/0026912 A1 | 2/2010 | Ho |
| 2010/0043293 A1 | 2/2010 | Nicholson |
| 2010/0061079 A1 | 3/2010 | Biao et al. |
| 2010/0083672 A1 | 4/2010 | Yoon |
| 2010/0152892 A1 | 6/2010 | Gavra |
| 2010/0214786 A1 | 8/2010 | Nichol |
| 2010/0275477 A1 | 11/2010 | Kim |
| 2010/0293827 A1 | 11/2010 | Suss |
| 2011/0083460 A1 | 4/2011 | Thomas |
| 2011/0098849 A1 | 4/2011 | Hudis |
| 2011/0100044 A1 | 5/2011 | Reichert |
| 2011/0116231 A1 | 5/2011 | Dunn |
| 2011/0181792 A1 | 7/2011 | Hammonds |
| 2012/0062080 A1 | 3/2012 | Maslen |
| 2012/0105424 A1 | 5/2012 | Lee |
| 2012/0285089 A1 | 11/2012 | Artwohl |
| 2013/0063326 A1 | 3/2013 | Riegel |
| 2013/0142972 A1 | 6/2013 | Raggio |
| 2013/0202821 A1 | 8/2013 | Son et al. |
| 2013/0208447 A1 | 8/2013 | Maslen |
| 2013/0255317 A1 | 10/2013 | Cooper |
| 2013/0271696 A1 | 10/2013 | Dunn |
| 2013/0291594 A1 | 11/2013 | Cooper |
| 2013/0316099 A1 | 11/2013 | Miller et al. |
| 2013/0323441 A1 | 12/2013 | Dennis et al. |
| 2014/0078407 A1 | 3/2014 | Green |
| 2014/0087099 A1 | 3/2014 | Veerasamy |
| 2014/0162000 A1 | 6/2014 | Son et al. |
| 2014/0182774 A1 | 7/2014 | Grzybowski et al. |
| 2014/0186557 A1 | 7/2014 | Grzybowski et al. |
| 2014/0212605 A1 | 7/2014 | Son et al. |
| 2014/0265756 A1 | 9/2014 | Rasch |
| 2014/0291448 A1 | 10/2014 | Luck |
| 2014/0335291 A1 | 11/2014 | Hasegawa et al. |
| 2014/0356558 A1 | 12/2014 | Hasegawa et al. |
| 2015/0079313 A1 | 3/2015 | Vogel-Martin et al. |
| 2015/0184446 A1 | 7/2015 | Veerasamy et al. |
| 2015/0218032 A1 | 8/2015 | Hogan et al. |
| 2015/0218042 A1 | 8/2015 | Hogan et al. |
| 2015/0223619 A1 | 8/2015 | Artwohl et al. |
| 2015/0233174 A1 | 8/2015 | Stark |
| 2015/0337591 A1 | 11/2015 | Koga et al. |
| 2016/0166085 A1 | 6/2016 | Twohy |
| 2016/0174734 A1 | 6/2016 | Artwohl |
| 2017/0150828 A1 | 6/2017 | Artwohl |

FOREIGN PATENT DOCUMENTS

| | | |
|---|---|---|
| FR | 2777762 | 10/1999 |
| WO | WO-96/12862 | 5/1996 |
| WO | WO-2008/029801 | 3/2008 |

OTHER PUBLICATIONS

International Search Report and Written Opinion in International Application No. PCT/US2017/037640, dated Aug. 14, 2017, 11 pages.

* cited by examiner

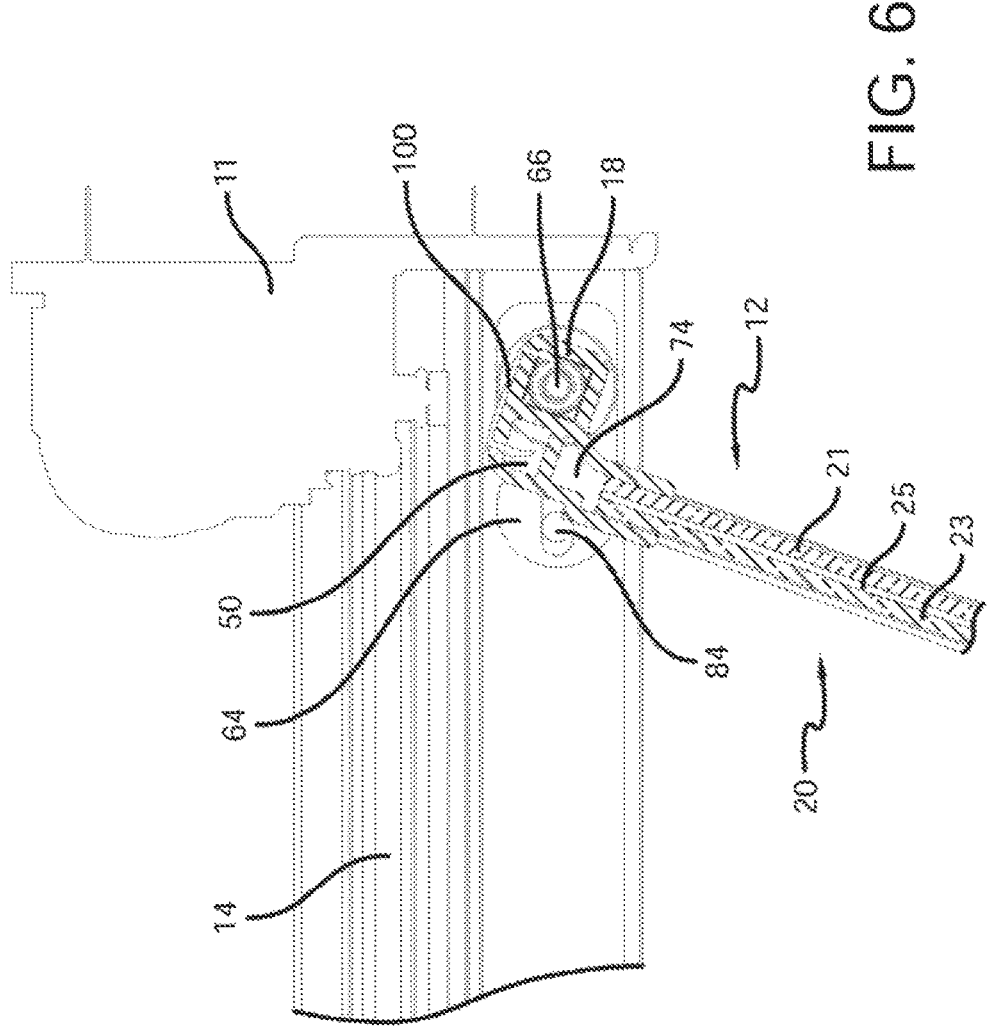

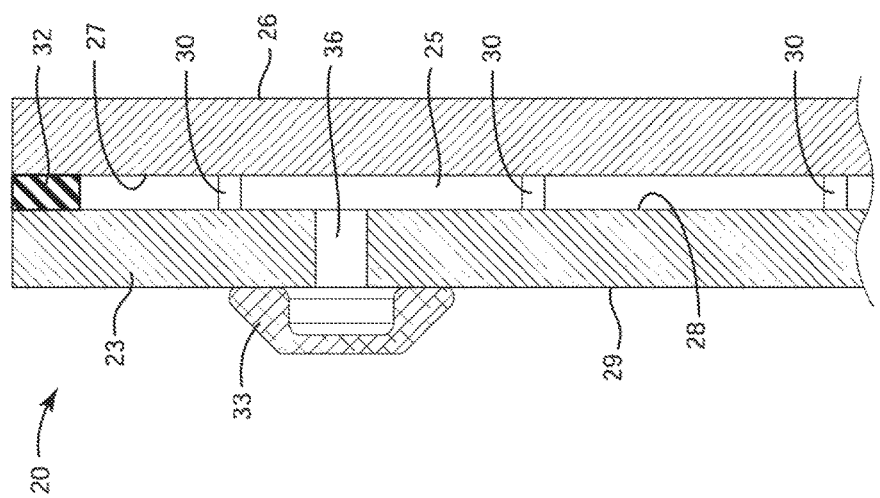
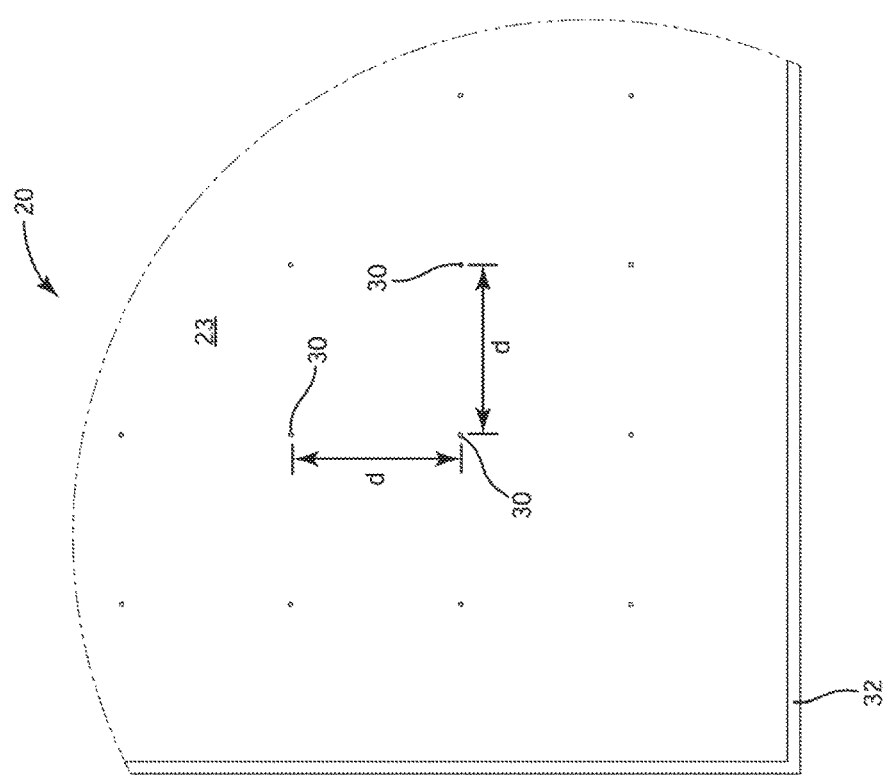

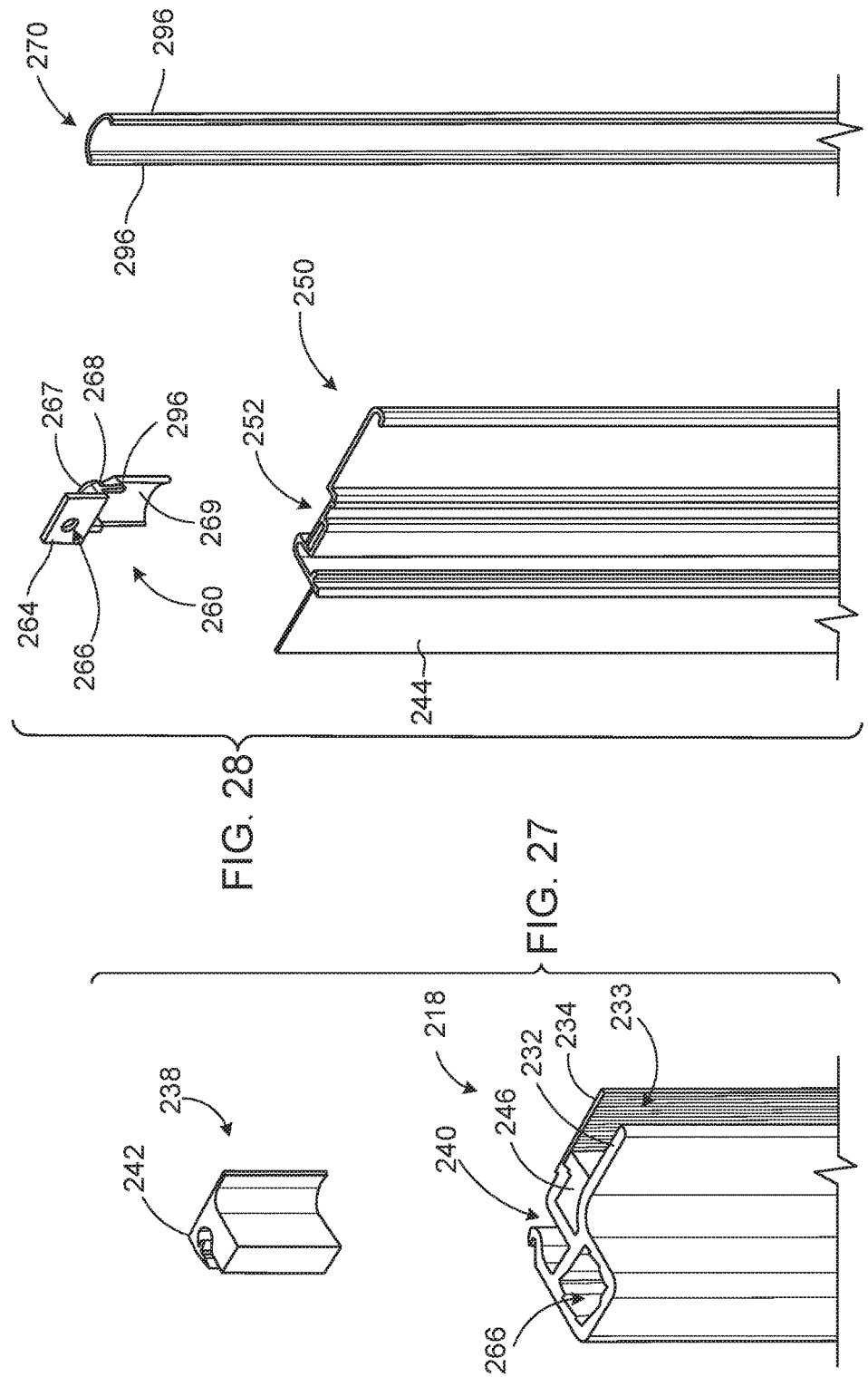

DISPLAY CASE DOOR ASSEMBLY WITH VACUUM PANEL AND LIGHTING FEATURES

CROSS-REFERENCE TO RELATED APPLICATIONS

This application is a continuation application of and claims priority to U.S. application Ser. No. 15/925,054, filed Mar. 19, 2018, now U.S. Pat. No. 10,130,193, which is a continuation of and claims priority to U.S. application Ser. No. 15/624,342, filed on Jun. 15, 2017, now U.S. Pat. No. 9,918,566, which is a continuation application of and claims priority to U.S. application Ser. No. 15/184,842, filed Jun. 16, 2016, now U.S. Pat. No. 9,687,087, which are incorporated herein by reference.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the present invention and is not admitted to be prior art by inclusion in this section.

Temperature-controlled storage devices (e.g., a refrigerator, freezer, refrigerated merchandiser, display case, etc.) are used in a wide variety of commercial, institutional, and residential applications for storing and/or displaying refrigerated or frozen objects. Many temperature-controlled storage devices have a display case door (e.g., a door with an insulated glass panel) through which objects within the temperature-controlled storage device can be viewed.

Conventional insulated glass panels typically include multiple parallel panes with a layer of gas between the panes. The gas is generally air or a noble gas (e.g., Argon, Krypton, etc.) which functions as a thermal insulator to reduce heat transfer through the panel. In conventional insulated glass panels, the pressure of the air or gas between the panes is equal or substantially equal to atmospheric pressure. Reducing the pressure of the air or gas between the panes would cause atmospheric pressure to apply a large force (e.g., thousands of pounds of force) to the surface of the panel. Such a force is likely to bend or break an insulated glass panel, especially if the panel is relatively thin.

Vacuum insulated glass is a type of insulated glass panel which uses an evacuated space or gap between parallel panes of glass as an insulating layer. The manufacture of vacuum insulated glass typically involves sealing parallel panes of glass to each other at their edges (e.g., using glass solder) and drawing a vacuum in a thin gap between the parallel panes. Such a manufacturing process requires the panes of glass to be held at a high temperature while the edge seal is formed in order to ensure proper bonding.

Conventional vacuum insulated glass panels use panes of non-tempered glass. Non-tempered glass typically has an improved flatness relative to tempered glass, which allows the gap between panes to have a substantially uniform thickness. However, non-tempered glass is typically more fragile than tempered glass and fractures into larger shards when broken. Using tempered glass in a vacuum insulated glass panel could have significant durability and safety advantages. However, the typical manufacturing process used to create vacuum insulated glass panels prevents the use of tempered glass because the high temperatures used to form the edge seal removes any tempering from the glass. For these reasons, a vacuum insulated glass panel constructed from tempered glass has not been successfully implemented.

SUMMARY

Various aspects of the invention feature evacuated window panel assemblies, such as for refrigerated display case doors and the like, and methods of making such assemblies. The window panel assemblies have two overlapped transparent panels, such as of tempered glass, defining an evacuated thermal insulation gap between them. The gap is sealed about the edges of the panels. To the assembled window panel a hinge rail and other framing components may be assembled to form a display case door.

One aspect of the present invention features a display case door assembly for a temperature-controlled storage device. The display case door assembly includes a vacuum panel, a hinge rail, and a lighting element. The vacuum panel includes a first vacuum pane, a second vacuum pane, and an evacuated gap between the first and second vacuum panes. The evacuated gap provides thermal insulation for the vacuum panel. The hinge rail is coupled to an edge of the vacuum panel and configured to rotate along with the vacuum panel between an open position and a closed position. The lighting element is coupled to at least one of the hinge rail and the vacuum panel and configured to emit light toward an interior of the temperature-controlled storage device when the hinge rail and vacuum panel are in at least the closed position.

In some embodiments, the hinge rail includes a front arm, a rear arm, and a vacuum panel channel between the front arm and the rear arm. The hinge rail may be configured to receive an edge of the vacuum panel within the vacuum panel channel and to support the vacuum panel via the edge.

In some embodiments, the hinge rail includes an axle opening in at least one of a top surface of the hinge rail and a bottom surface of the hinge rail. The axle opening may include corners, linear corner segments extending from the corners, and curved central segments connecting the linear corner segments.

In some embodiments, the display case door assembly includes a mounting bracket coupled to at feast one of the hinge rail and the vacuum and defining a lighting channel within which the lighting element is contained. In some embodiments, the mounting bracket is located along a rear surface of the hinge rail and configured to provide thermal insulation for the hinge rail.

In some embodiments, the display case door assembly includes a light cover coupled to the mounting bracket and forming a rear surface of the lighting channel. The lighting element may emit light through the light cover. In some embodiments, the lighting channel includes a rear corner, a coupling feature extending into the lighting channel, and a gap between the rear corner and the coupling feature. The light cover may include a side edge configured to fit within the gap between the rear corner and the coupling feature to secure the light cover to the mounting bracket. In some embodiments, the light cover is configured to provide thermal insulation for the hinge rail and to maintain a space within the lighting channel at an elevated temperature relative to an internal temperature of the temperature-controlled storage device.

In some embodiments, the display case door assembly includes a light cap coupled to the mounting bracket and configured to secure the light cover between the light cap and the mounting bracket. The light cap may include an end portion coupled to the mounting bracket via a fastener and a cover portion configured to fit over an end of the light cover to secure the light cover between the cover portion and the mounting bracket. In some embodiments, the light cover includes a curved surface. The light cap may further include a middle portion connecting the end portion to the cover portion and configured to align with the curved surface of the light cover.

Another aspect of the present invention features another display case door assembly for a temperature-controlled storage device. The display case door assembly includes a vacuum panel, a hinge rail, and a hinge cover. The vacuum panel includes a first vacuum pane, a second vacuum pane, and an evacuated gap between the first and second vacuum panes. The evacuated gap provides thermal insulation for the vacuum panel. The hinge rail is coupled to an edge of the vacuum panel and configured to rotate along with the vacuum panel between an open position and a closed position. The hinge cover is located along a rear surface of the hinge rail and configured to provide thermal insulation for the hinge rail.

In some embodiments, the hinge rail includes a front arm, a rear arm, and a vacuum panel channel between the front arm and the rear arm. The hinge rail may be configured to receive an edge of the vacuum panel within the vacuum panel channel and to support the vacuum panel via the edge.

In some embodiments, the display case door assembly includes a lighting element coupled to the hinge rail and configured to emit light toward an interior of the temperature-controlled storage device when the hinge rail and vacuum panel are in at least the closed position. In some embodiments, the hinge cover is a mounting bracket coupled to the hinge rail and defining a lighting channel within which the lighting element is contained.

In some embodiments, the display case door assembly includes a light cover coupled to the mounting bracket and forming a rear surface of the lighting channel. The lighting element may emit light through the light cover. In some embodiments, the lighting channel includes a rear corner, a coupling feature extending into the lighting channel, and a gap between the rear corner and the coupling feature. The light cover may include a side edge configured to fit within the gap between the rear corner and the coupling feature to secure the light cover to the mounting bracket. In some embodiments, the light cover is configured to provide thermal insulation for the hinge rail and to maintain a space within the lighting channel at an elevated temperature relative to an internal temperature of the temperature-controlled storage device.

In some embodiments, the display case door assembly includes a light cap coupled to the mounting bracket and configured to secure the light cover between the light cap and the mounting bracket. In some embodiments, the light cap includes an end portion coupled to the mounting bracket via a fastener and a cover portion configured to fit over an end of the light cover to secure the light cover between the cover portion and the mounting bracket.

Another aspect of the present invention features a display case door assembly for a temperature-controlled storage device. The display case door assembly includes a vacuum panel, a hinge rail, a lighting element, a mounting bracket, a light cover, and a light cap. The vacuum panel includes a first vacuum pane, a second vacuum pane, and an evacuated gap between the first and second vacuum panes. The evacuated gap provides thermal insulation for the vacuum panel. The hinge rail is coupled to an edge of the vacuum panel and configured to rotate along with the vacuum panel between an open position and a closed position. The lighting element is coupled to at least one of the hinge rail and the vacuum panel and configured to emit light toward an interior of the temperature-controlled storage device when the hinge rail and vacuum panel are in at least the closed position. The mounting bracket is coupled to at least one of the hinge rail and the vacuum panel and defines a lighting channel within which the lighting element is contained. The light cover is coupled to the mounting bracket and forms a rear surface of the lighting channel. The lighting element emits light through the light cover. The light cap is coupled to the mounting bracket and configured to secure the light cover between the light cap and the mounting bracket.

In some embodiments, the display case door assembly includes one or more wipers configured to provide a seal along an edge of the display case door assembly. In some embodiments, the display case door assembly includes one or more magnets coupled to a perimeter of the vacuum panel and configured to magnetically engage a perimeter of the temperature-controlled storage device when the vacuum panel is in the closed position. In some embodiments, the lighting element is oriented substantially horizontally and coupled to at least one of the hinge rail and the vacuum panel using an adhesive. In some embodiments, the hinge rail includes a substantially vertical rail coupled to a side edge of the vacuum panel. In some embodiments, the hinge rail includes at least one of a top hinge clamp coupled to a top edge of the vacuum panel and a bottom hinge clamp coupled to a bottom edge of the vacuum panel.

Another aspect of the present invention features a display case door assembly for a temperature-controlled storage device. The display case door assembly includes a vacuum panel. The vacuum panel includes a first vacuum pane, a second vacuum pane, and an evacuated gap between the first and second vacuum panes. The evacuated gap provides thermal insulation for the vacuum panel. The vacuum panel includes a perimeter seal bonding the first vacuum pane to the second vacuum pane along a perimeter of the vacuum panes. In some embodiments, the perimeter seal is located between the first vacuum pane and the second vacuum pane. In some embodiments, the perimeter seal is lead-free or substantially lead-free. In some embodiments, the perimeter seal is made of a lead-free material or a substantially lead-free material. In some embodiments, the perimeter seal is an active solder which includes at least one of tin, silver, and titanium. In some embodiments, the perimeter seal contains bismuth. In some embodiments, the perimeter seal contains gallium, cerium, iron, copper, and/or nickel without containing any lead.

Another aspect of the present invention features a display case door assembly for a temperature-controlled storage device. The display case door assembly includes a vacuum panel and a lighting element. The vacuum panel includes a first vacuum pane, a second vacuum pane, and an evacuated gap between the first and second vacuum panes. The evacuated gap provides thermal insulation for the vacuum panel. The lighting element is coupled to the vacuum panel and configured to emit light toward an interior of the temperature-controlled storage device when the display case door assembly is in at least a closed position.

Another aspect of the present invention features a display case door assembly for a temperature-controlled storage device. The display case door assembly includes a vacuum panel, a mounting bracket, and a lighting element. The vacuum panel includes a first vacuum pane, a second vacuum pane, and an evacuated gap between the first and second vacuum panes. The evacuated gap provides thermal insulation for the vacuum panel. The mounting bracket is coupled to the vacuum panel. In some embodiments, the mounting bracket is configured to provide thermal insulation. In some embodiments, the mounting bracket defines a lighting channel within which the lighting element is contained. The lighting element is coupled to the mounting bracket and configured to emit light toward an interior of the temperature-controlled storage device when the display case door assembly is in at least a closed position.

Another aspect of the present invention features a display case door assembly for a temperature-controlled storage device. The display case door assembly includes a vacuum panel, a hinge rail, and a lighting element. The vacuum panel includes a first vacuum pane, a second vacuum pane, and an evacuated gap between the first and second vacuum panes. The evacuated gap provides thermal insulation for the vacuum panel. In some embodiments, the hinge rail is coupled to a side edge of the vacuum panel. In other embodiments, the hinge rail is coupled to at least one of a top edge of the vacuum panel and a bottom edge of the vacuum panel. The hinge rail is configured to rotate along with the vacuum panel between an open position and a closed position. The lighting element is coupled to the hinge rail and configured to emit light toward an interior of the temperature-controlled storage device when the display case door assembly is in at least a closed position.

In some embodiments, the display case door assembly includes a hinge cover. The hinge cover can be located along a rear surface of the hinge rail and configured to provide thermal insulation for the hinge rail. In some embodiments, the display case door assembly include a mounting bracket. The mounting bracket can be coupled to a rear surface of the hinge rail and configured to facilitate mounting the lighting element. In some embodiments, the mounting bracket provides thermal insulation for the hinge rail. In some embodiments, the mounting bracket defines a lighting channel within which the lighting element is contained. In some embodiments, the display case door assembly includes a light cover. The light cover can be coupled to the mounting bracket and can form a rear surface of the lighting channel. The lighting element can emit light through the light cover.

In any aspect, the vacuum panel can include a perimeter seal bonding the first vacuum pane to the second vacuum pane along a perimeter of the vacuum panes. In some embodiments, the perimeter seal is located between the first vacuum pane and the second vacuum pane. In some embodiments, the perimeter seal is lead-free or substantially lead-free. In some embodiments, the perimeter seal is made of a lead-free material or a substantially lead-free material. In some embodiments, the perimeter seal is an active solder which includes at least one of tin, silver, and titanium. In some embodiments, the perimeter seal contains bismuth. In some embodiments, the perimeter seal contains gallium, cerium, iron, copper, and/or nickel without containing any lead.

Although some of the features of the display case door assembly are described with respect to specific implementations or embodiments, it should be understood that any feature described herein can be included or omitted from any of the implementations or embodiments of the present disclosure. For example, any of the above implementations can be modified to add features from other implementations and/or modified to omit features described as being part of the implementation. Furthermore, it is contemplated that a new implementation not specifically described above can be constructed using any combination of the features described herein. The features of each implementation should not be regarded as necessary or essential features, but rather should be interpreted as optional features which can be included, omitted, and/or combined with other features to define a variety of different implementations of the display case door assembly using any combination of the features described herein.

Another aspect of the invention features a method of making an evacuated window panel assembly for a refrigerated display case door, the method including printing a pattern of discrete spacers on a first transparent panel; positioning a second transparent panel over the printed spacers, such that the spacers hold the panels separated by a gap; and evacuating and sealing the gap. In some cases the spacers are of a ceramic material. In some embodiments the method includes printing an edge seal about a perimeter of at least one of the first and second panels, such as while the spacers are being printed.

Another aspect of the invention features a method of making an evacuated window panel assembly for a refrigerated display case door, the method including overlapping two tempered glass panels with a pattern of spacers therebetween so as to define a gap between the panels, with a sealing material filling the gap at edges of the overlapped panels, and then fusing the sealing material by applying heat at a temperature below a glass transition temperature of the two glass panels, thereby sealing the gap without detempering the glass. In some embodiments the sealing material comprises a ceramic frit, such as from a granulated or powdered ceramic or glass material. In some cases the application of heat sinters the sealing material while sealing the gap. In some cases the sealing material comprises a low-temperature solder. In some examples the applied heal is internally generated by the application of ultrasonic welding energy.

BRIEF DESCRIPTION OF THE DRAWINGS

FIG. 6 is a detail taken from FIG. 2 as indicated, according to an exemplary embodiment.

FIG. 7C is a detail view of a portion of the vacuum panel shown in FIG. 7A, according to an exemplary embodiment.

FIG. 7D is a side cross-sectional view of the vacuum panel shown in FIG. 7A. according to an exemplary embodiment.

FIG. 27 is an exploded view of a hinge rail and a corner block of the display case door assembly of FIG. 22, according to an exemplary embodiment.

FIG. 28 is an exploded view of a mounting bracket and a light cap of the display case door assembly of FIG. 22, according to an exemplary embodiment.

FIG. 29 is an exploded view of a light cover of the display case door assembly of FIG. 22, according to an exemplary embodiment.

DETAILED DESCRIPTION

Overview

Figure 1:
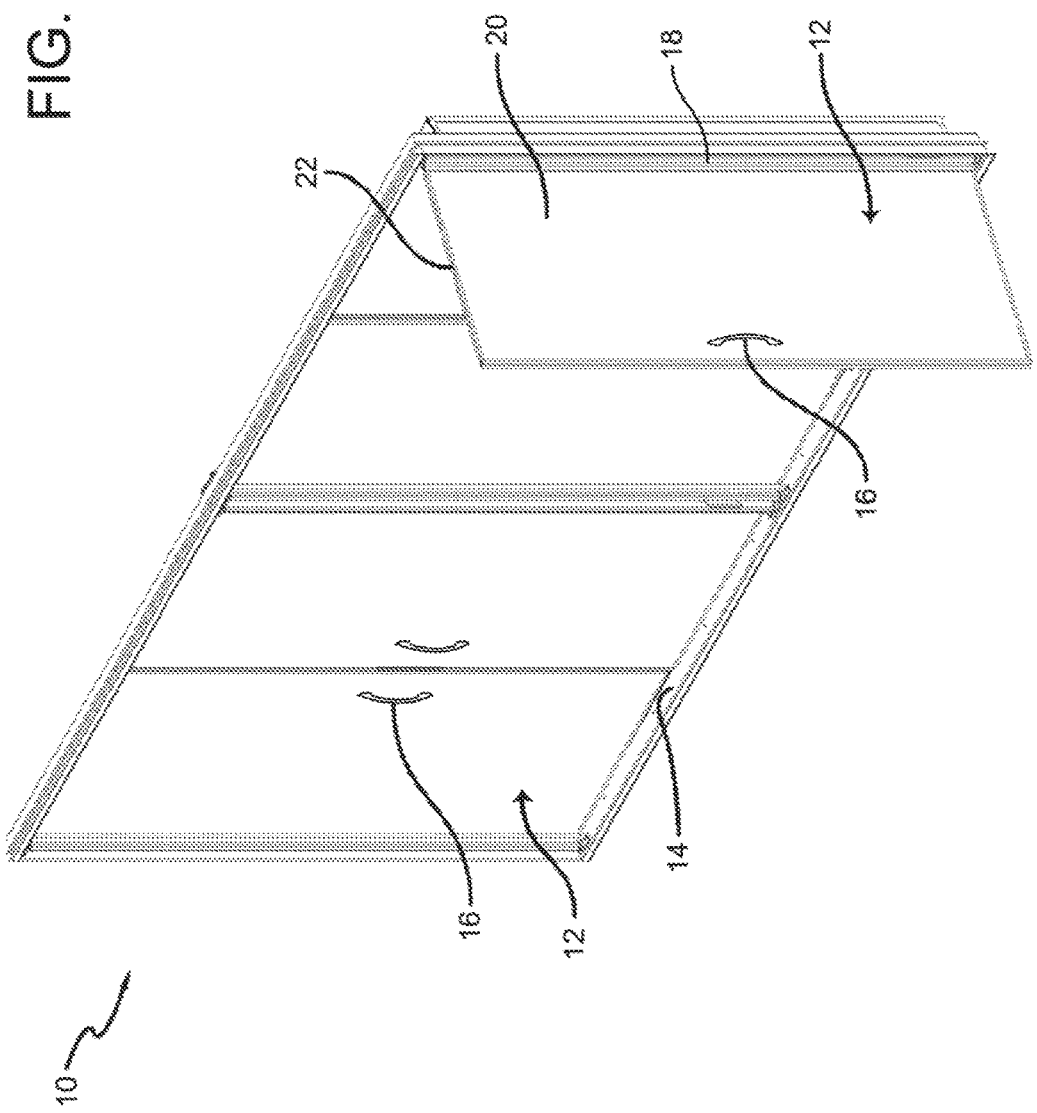
FIG. 1 is a perspective view of a display case door assembly including a door frame and four display case doors coupled to the door frame via a rail assembly, each door having a transparent vacuum panel, according to an exemplary embodiment.
Figure 2:
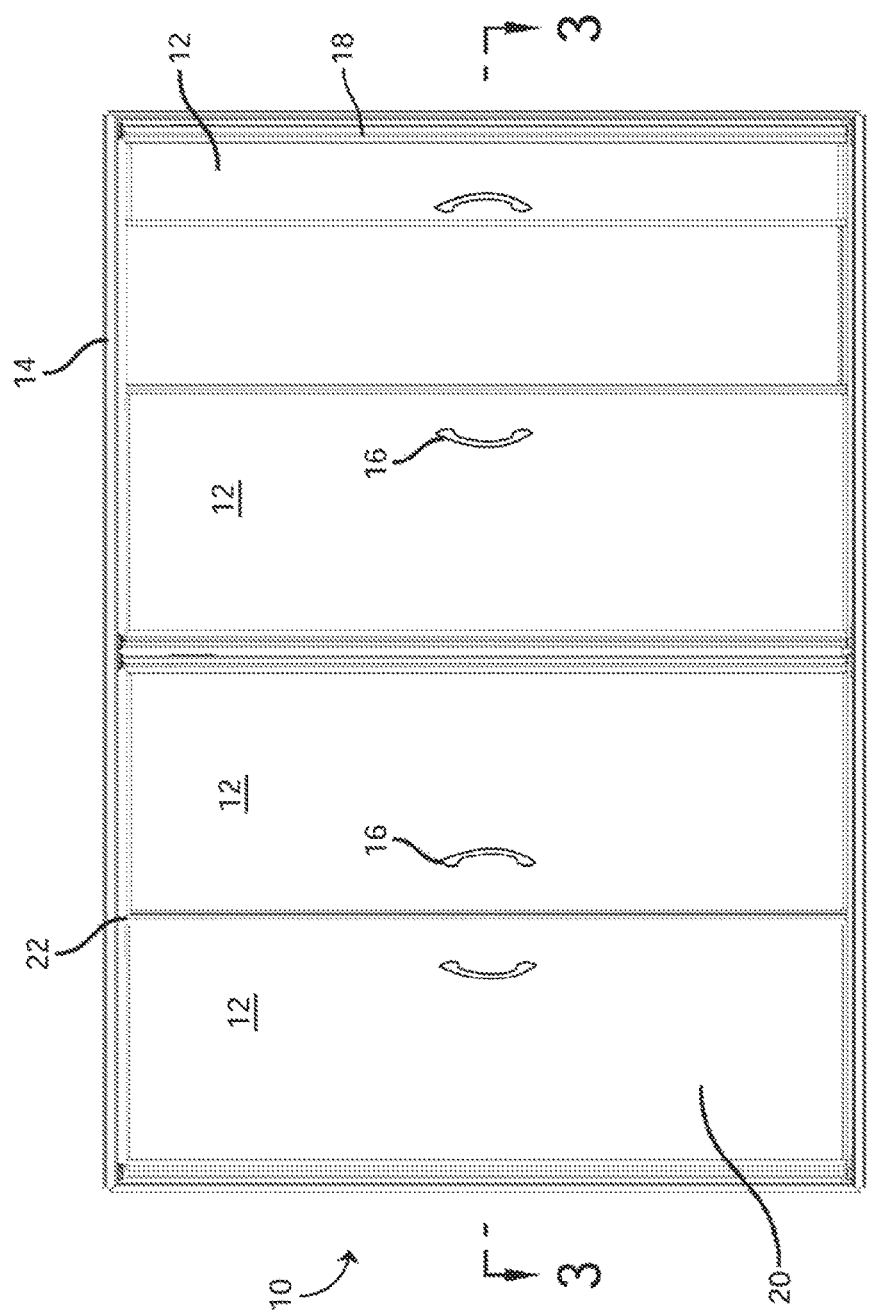
FIG. 2 is a front elevation view of the display case door assembly of FIG. 1, according to an exemplary embodiment.
Figure 3:
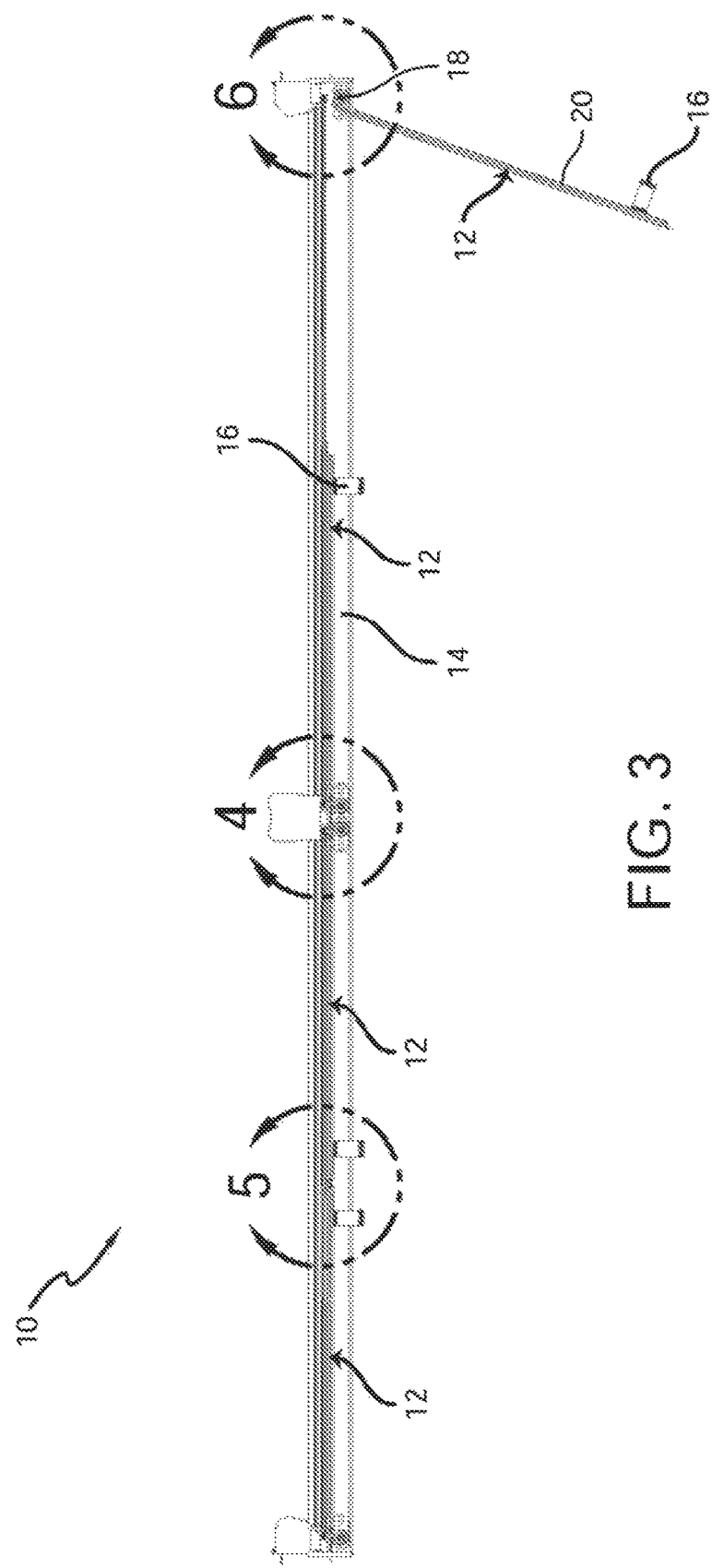
FIG. 3 is a cross-sectional plan view of the display case door assembly of FIG. 1 taken along line 3-3 of FIG. 2, according to an exemplary embodiment.
Figure 4:
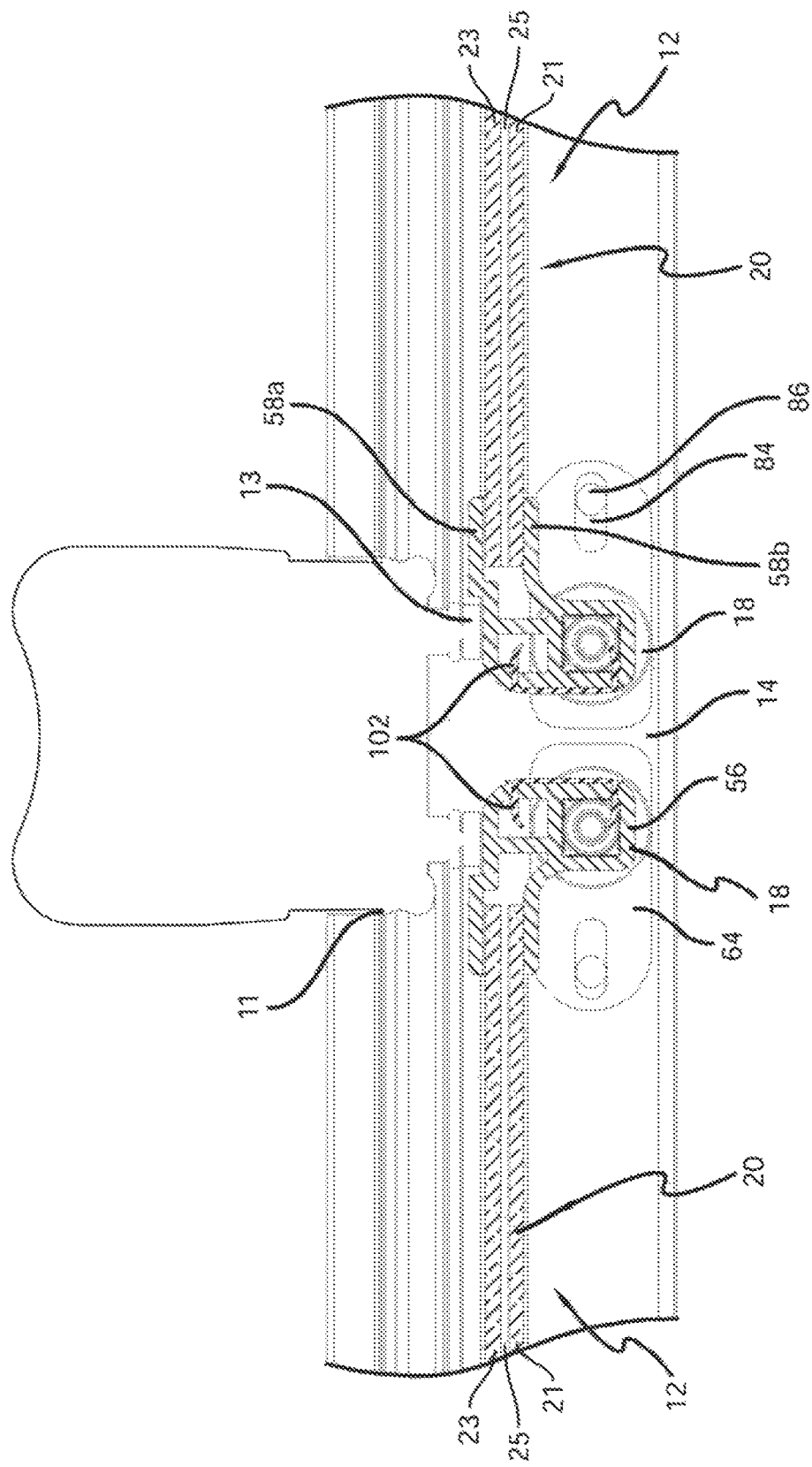
FIG. 4 is a detail taken from FIG. 2 as indicated, according to an exemplary embodiment.

Referring generally to the FIGURES, a display case door assembly with a vacuum panel is shown, according to an exemplary embodiment. The display case door assembly described herein may be used as a door assembly for a refrigerator, freezer, refrigerated merchandiser, or other display case in a wide variety of commercial, institutional, and residential applications. For example, the display case door assembly may be used as part of a temperature-controlled storage device in a supermarket or other similar facility and may include one or more transparent panels or panes (e.g., insulated glass panels) through which objects within the temperature-controlled storage device can be viewed.

The display case door assembly described herein includes a vacuum panel. The vacuum panel may include multiple parallel vacuum panes separated by a small gap (e.g., less than 1 mm, as small as 0.2 mm, etc.). In some embodiments, the gap between the vacuum panes is approximately 0.2 mm. The gap is evacuated to produce a vacuum between the vacuum panes. Advantageously, the vacuum provides a high thermal insulation effect in a relatively small space. In some embodiments, one or more of the panes is made of low emissivity glass to reduce radiation heat transfer through the vacuum panel.

The vacuum panel may include spacers in the evacuated gap to maintain the separation between panes when the gap is evacuated. The spacers prevent external pressure (e.g., atmospheric pressure) from causing the vacuum panes to flex inward when a vacuum is drawn between the panes. In some embodiments, the spacers include a plurality of support pillars between the vacuum panes. The support pillars may be arranged in a grid (e.g., approximately 50 mm apart) and configured to provide internal support for the vacuum panel to counter the pressure differential caused by the evacuated gap.

In some embodiments, one or more of the vacuum panes are made of tempered glass. Advantageously, using tempered glass improves the durability of the vacuum panes relative to non-tempered glass. Since tempered glass is stronger and can withstand more pressure than non-tempered glass without incurring damage, the distance between the spacers can be increased relative to conventional vacuum glass panels that use non-tempered glass. In some embodiments, distance between spacers is approximately 50 mm or 2 inches. Such a distance between spacers would not be feasible for non-tempered glass because it results in less spacers, thereby distributing the compressive force among less spacers and increasing the point forces exerted by spacers on the vacuum panes. If the vacuum panes were made of non-tempered glass, the forces exerted by the spacers could cause damage to the vacuum panes. However, the use of tempered glass allows the spacers to be separated by a greater distance without causing damage to the vacuum panes.

The vacuum panel may include a perimeter seal. The perimeter seal may be solder glass or another sealing material configured to bond the vacuum panes along a perimeter thereof and to provide an airtight (i.e., hermetic) seal within the evacuated gap. In some embodiments, the perimeter seal is made of an inorganic material capable of providing a hermetic seal within the evacuated gap. In some embodiments, the perimeter seal is made of an alloy material specifically formulated for joining glass, silicon, and other types of silicates. For example, the perimeter seal may be a metallic alloy or an active solder which includes tin, silver, and titanium. In some embodiments, the perimeter seal is formed using the "S-BOND® 220M" alloy manufactured by S-Bond Technologies, LLC.

In some embodiments, the perimeter seal is a low-temperature solder or other sealing material that has a melting range significantly lower than the glass transition temperature of the vacuum panes. The relatively lower melting temperature of the perimeter seal allows the perimeter seat to melt and bond to the vacuum panes without heating any portion of the vacuum panes to a temperature that would remove the temper from the glass. In some embodiments, the vacuum panes are bonded together using an ultrasonic welding process. The ultrasonic welding process may be characterized by temperatures well below the glass transition temperature of the vacuum panes. Advantageously, these features allow the vacuum panes to be made of tempered glass and to retain their temper throughout the manufacturing/bonding process. This advantage allows the vacuum panel to include multiple parallel panes of tempered glass bonded together along their perimeter to form a hermetic seal around the evacuated gap.

The vacuum panel described herein provides a thermopane unit that appears as a single pane of glass due to the minimal separation between panes. The separation between panes of glass is minimized by providing an evacuated layer (e.g., a vacuum layer) which creates a thermobreak having a high thermal resistance. The thickness of the evacuated layer can be precisely controlled by providing spacers to maintain the separation between panes. A coating or laminate layer can be used to keep the unit intact if breakage occurs. In a preferred embodiment, coating or layer can also function as an anti-condensate coating and/or UV inhibitor.

Before discussing further details of the display case door and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

Display Case Door Assembly

Referring now to FIGS. 1-6, a display case door assembly 10 is shown, according to an exemplary embodiment. Display case door assembly 10 may be used in conjunction with a temperature-controlled storage device (e.g., a refrigerator, a freezer, a warmer, a heater, etc.) for storing and/or displaying refrigerated or frozen goods. For example, display case door assembly 10 may be implemented as part of a refrigerated display case in a supermarket, warehouse store, or other similar facility.

Display case door assembly 10 is shown to include a plurality of display case doors 12 mounted in a door frame 14. Each display case door 12 includes a vacuum panel 20. In some embodiments, vacuum panel 20 is hingedly connected to frame 14 via a rail 18. In various other embodiments, vacuum panel 20 may be implemented as part of a sliding door or window, a rotary door, a swing sliding door, a fixed-position window or panel, or otherwise positioned within a frame or opening. Vacuum panel 20 may be configured to move relative to the frame or opening (e.g., rotating via hinges as shown in FIG. 1, sliding along a track, etc.) or may be fixed within the frame or opening. In various implementations, vacuum panel 20 may be used as part of a door assembly configured to provide a thermal insulation effect (e.g., for a refrigerated display case) or otherwise used as any type of transparent or substantially transparent panel that provides a thermal insulation effect (e.g., a sliding or hinged window, a fixed-position window, a revolving or sliding door, a hinged door, etc.).

In some embodiments, frame 14 can be omitted to provide a frameless display case door assembly 10. For example, vacuum panel 20 can be mounted within the opening into the temperature-controlled storage device via hinges that directly attach to vacuum panel 20 without requiring an intermediate frame to support and/or contain vacuum panel 20. Advantageously, omitting frame 14 enhances the minimalistic appearance of display case door assembly 10 and supplements the aesthetics provided by vacuum panel 20, which appears as a single pane of glass.

In some embodiments, vacuum panel 20 includes one or more panes of transparent or substantially transparent glass (e.g., insulated glass, non-tempered glass, tempered glass, etc.), plastics, or other transparent or substantially transparent materials. As such, vacuum panel 20 may be referred to as a transparent unit. In some embodiments, vacuum panel 20 includes multiple layers of transparent panes (i.e., multiple panes per door 12). For example, vacuum panel 20 may be a multi-pane unit having a first vacuum pane 21 and a second vacuum pane 23. Vacuum panes 21 and 23 may be separated by a small gap 25 which can be evacuated to draw a vacuum between panes 21 and 23.

Figure 5:
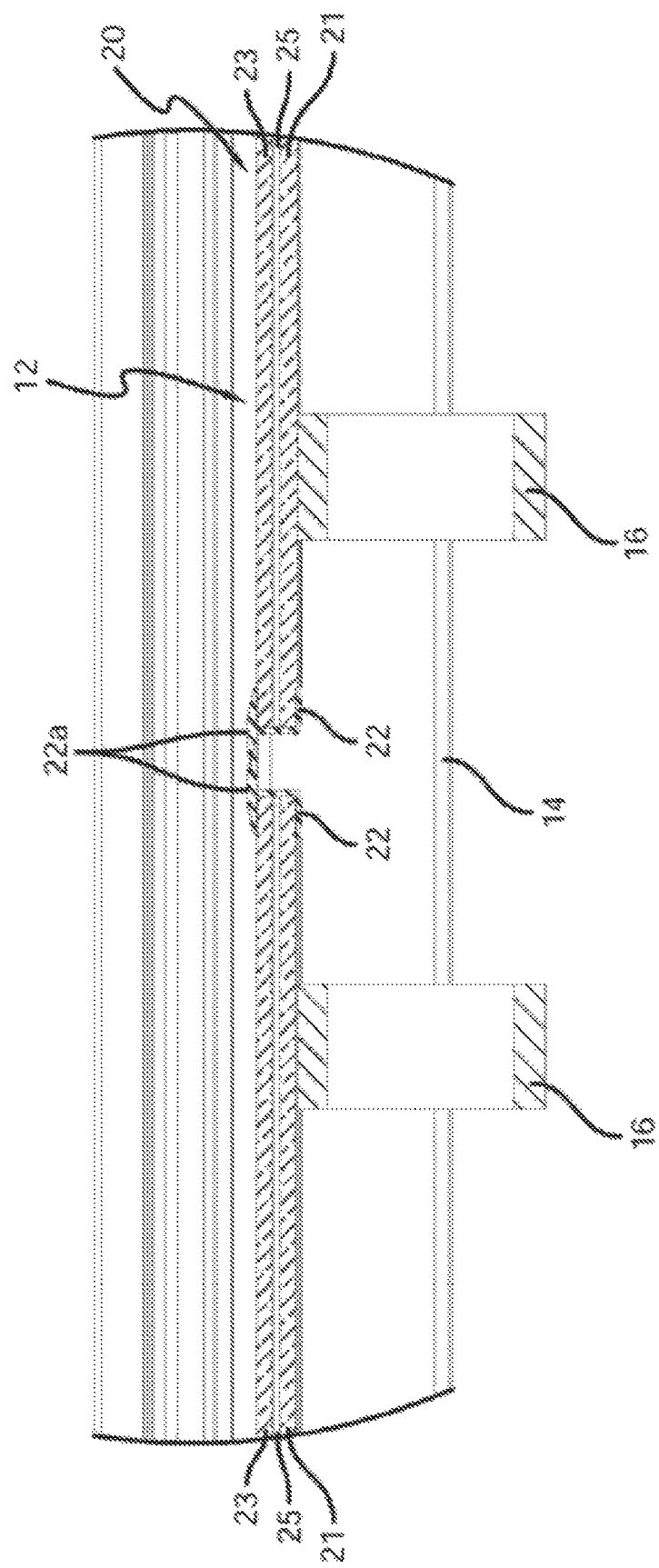
FIG. 5 is a detail taken from FIG. 2 as indicated, according to an exemplary embodiment.

Display case door 12 is shown to include edge guards 22. In some embodiments, edge guards 22 are transparent moldings. Edge guards 22 may be adhered to the top edge, bottom edge, and non-hinge side edge of vacuum panel 20. Silicon or the like may be used for bonding edge guards 22 to the edges of vacuum panel 20. Edge guards 22 provide a sealing feature for display case door 12. For example, as shown in FIG. 5, the edge guard 22 on the non-hinged edge of vacuum panel 20 (i.e., the edge opposite the hinged edge) may include a wiper 22a that cooperates with a wiper 22a on another door 12 to seal the display case when doors 12 are closed. In some embodiments, edge guards 22 can be omitted.

In some embodiments, display case door 12 includes a handle 16. Handle 16 may be used to open, close, lock, unlock, seal, unseal, or otherwise operate display case door 12. Handle 16 may be made from extruded aluminum tubes that are cut to a specified dimension and bonded to a front surface of display case door 12. However, this is not a limitation on the present invention and other handle configurations can be used.

Display case door 12 may include any of a variety of structures or features for attaching display case door 12 to frame 14. For example, display case door 12 may include a structure for housing wiring, a mullion 11, one or more gaskets 13, and/or other associated brackets and components typically included in refrigerated display cases. Detailed descriptions of such components are provided in U.S. Pat. Nos. 6,606,832, and 6,606,833, which are incorporated by reference herein in their entireties.

Vacuum Panel

Figure 7B:
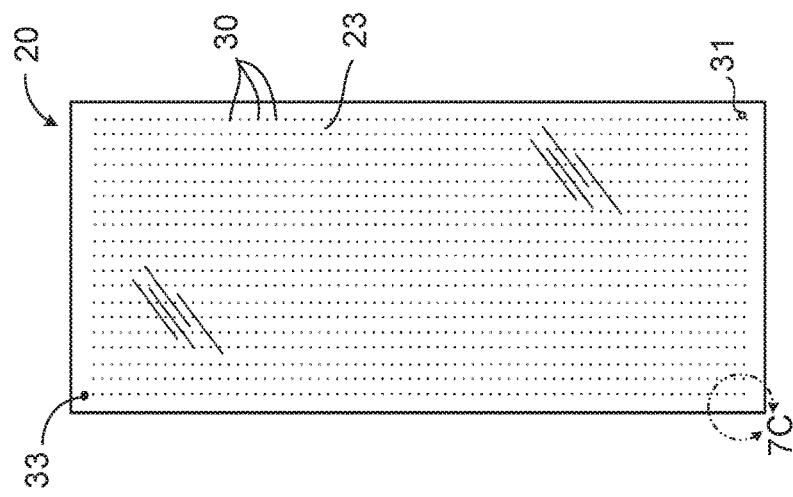
FIG. 7B is a from elevation view of the vacuum panel shown in FIG. 7A, according to an exemplary embodiment.
Figure 7A:
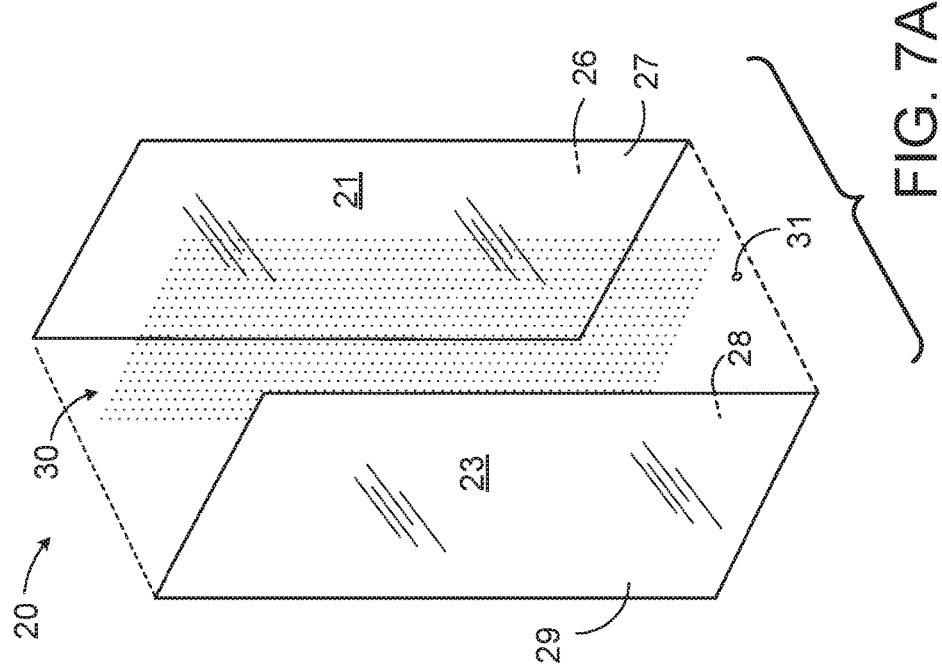
FIG. 7A is an exploded view of the vacuum panel shown in FIG. 1, according to an exemplary embodiment.

Referring now to FIGS. 7A-7D, several drawings illustrating vacuum panel 20 in greater detail are shown, according to an exemplary embodiment. In brief overview, FIG. 7A is an exploded view of vacuum panel 20; FIG. 7B is a front elevation view of vacuum panel 20; FIG. 7C is a detail view of the portion of vacuum panel 20 circled in FIG. 7B; and FIG. 7D is a side cross-section view of vacuum panel 20.

Vacuum panel 20 is shown to include a front vacuum pane 21 and a rear vacuum pane 23. Front vacuum pane 21 has an outside surface 26 and an inside surface 27. Outside surface 26 faces toward a consumer standing in front of the display case when door 12 is closed. Inside surface 27 faces toward merchandise within the display case when door 12 is closed. Rear vacuum pane 23 has an inside surface 28 and an outside surface 29. Inside surface 28 faces toward a consumer standing in front of the display case when door 12 is closed. Outside surface 29 faces toward merchandise within the display case when door 12 is closed. When vacuum panel 20 is assembled, inside surfaces 27 and 28 may be separated front each other by the width of gap 25.

In some embodiments, vacuum panel 20 includes spacers 30 positioned between vacuum panes 21 and 23. Spacers 30 may be configured to maintain the separation between panes 21 and 23 when gap 25 is evacuated. Spacers 30 may prevent external pressure (e.g., atmospheric pressure) from causing panes 21 and 23 to flex inward when a vacuum is drawn in gap 25. In some embodiments, spacers 30 include a plurality of support pillars extending between panes 21 and 23 (i.e., between surfaces 27 and 28). The support pillars may be configured to provide internal compression support for vacuum panel 20 to counter the pressure differential between atmospheric pressure outside panes 21 and 23 and the vacuum within gap 25 between panes 21 and 23. Spacers 30 may be arranged in a grid (e.g., approximately 50 mm apart) between panes 21 and 23. In some embodiments, spacers 30 are ceramic spacers. Spacers 30 can be applied using a printing process or silkscreen process (described in greater detail below) to reduce the time and effort required to properly position spacers 30. For example, one swipe of a silkscreen or an automated printing process can place an entire grid of spacers 30 in proper locations without requiring a user to manually place spacers 30.

In some embodiments, front vacuum pane 21 and rear vacuum pane 23 are made of tempered glass. Advantageously, using tempered glass improves the durability of vacuum panes 21 and 23 relative to non-tempered glass. Using tempered glass also improves the safety of vacuum panel 20 by causing vacuum panes 21 and 23 to fracture into many small pieces in the event that breakage occurs. Since tempered glass is stronger and can withstand more pressure than non-tempered glass without incurring damage, the distance between spacers 30 can be increased relative to conventional vacuum glass panels that use non-tempered glass. For example, a vacuum glass panel manufactured from non-tempered glass may require a relatively small distance between spacers 30 (e.g., 20 mm or less) in order to distribute the compressive force among more spacers 30 and to reduce the point forces exerted by spacers 30 on vacuum panes 21 and 23.

Advantageously, using tempered glass for vacuum panes 21 and 23 allows spacers 30 to be separated by a greater distance d, as shown in FIG. 7C. In some embodiments, distance d is between 20 mm and 80 mm. In some embodiments, distance d is between 40 mm and 60 mm. In some embodiments, distance d is approximately 50 mm or 2 inches. Such a distance between spacers 30 would not be feasible for non-tempered glass because it results in less Spacers 30. thereby distributing the compressive force among less spacers 30 and increasing the point forces exerted by spacers 30 on vacuum panes 21 and 23. If vacuum panes 21 and 23 were made of non-tempered glass, the forces exerted by spacers 30 could cause damage to vacuum panes 21 and 23. However, the use of tempered glass allows spacers 30 to be separated by distance d without causing damage to vacuum panes 21 and 23.

Vacuum panel 20 is shown to include a perimeter seal 32. Perimeter seal 32 may be glass solder, ceramic frit, or another sealing material configured to bond panes 21 and 23 along a perimeter thereof and to provide an airtight (i.e., hermetic) seal within gap 25. Perimeter seal 32 can be applied to one or both of vacuum panes 21 and 23 prior to assembly and may extend along an entire perimeter of vacuum panel 20. Perimeter seal 32 may form a closed perimeter (e.g., a rectangle) and may be bonded to both of vacuum panes 21 and 23. Spacers 30 may be contained within the closed perimeter formed by perimeter seal 32.

Perimeter seal 32 may be made of an inorganic material capable of providing a hermetic seal within gap 25. In some embodiments, perimeter seal 32 is made of an alloy material specifically formulated for joining glass, silicon, and other types of silicates. For example, perimeter seal 32 may be a metallic alloy or an active solder which includes tin, silver, and titanium. In some embodiments, perimeter seal 32 is formed using the "S-BOND® 220M" alloy, the "S-BOND 220-50®" alloy, or the "S-BOND 140®" alloy, all of which are manufactured by S-Bond Technologies, LLC. Property data sheets and material safety data sheets (MSDSs) for each of these materials are publicly available via the S-Bond Technologies website (see http://www.s-bond.com/technical-resources/property-datasheets-and-msds/) as of the date of the present disclosure.

In some embodiments, perimeter seal 32 is a lead-free material (i.e., a material that does not contain any lead (Pb)). For example, perimeter seal 32 can be a metallic alloy that consists of only tin (Sn), silver (Ag), and titanium (Ti). In some embodiments, perimeter seal 32 contains bismuth (Bi) and/or trace amounts of other active elements (e.g., gallium (Ga) or cerium (Ce)) or inactive elements (e.g., iron (Fe), copper (Cu), or nickel (Ni)) without containing any lead (Pb). Unlike seal materials that contain lead, perimeter seal 32 can be used in proximity to food and other consumer products without the possibility of any lead or other potentially harmful materials contaminating the food. This advantage allows perimeter seal 32 to be used as part of a vacuum panel 20 in a refrigerated display case for refrigerated or frozen foods.

In some embodiments, perimeter seal 32 is a ceramic frit made from a granulated or powdered ceramic or glass material. The ceramic frit may be a ceramic composition that has been fused in a fusing oven, quenched to form a glass, and granulated. The ceramic frit may be applied to vacuum panes 21 and/or 23 in the form of a powdered or granulated solid, paste, slurry, suspension, or other composition. In some embodiments, the ceramic frit is bonded to the perimeter of vacuum panes 21 and 23 using a sintering process. The sintering process may involve compacting and forming a solid mass of material by applying heat and/or pressure to the perimeter of vacuum panes 21 and 23 after a layer of the ceramic frit has been applied along the perimeter (e.g., between vacuum panes 21 and 23). The heat applied may be sufficient to bond the ceramic frit to the perimeter of vacuum panes 21 and 23 without heating vacuum panes 21 and 23 to a temperature that would remove the temper from the glass.

In some embodiments, perimeter seal 32 is a low-temperature solder or other sealing material that has a melting range significantly lower than the glass transition temperature of vacuum panes 21 and 23. For example, perimeter seal 32 may have a melting range of approximately 220° C.-280° C., whereas the glass transition temperature of vacuum panes 21 and 23 may be approximately 520° C.-600° C. (i.e., the glass transition temperature for soda lime glass). The relatively lower melting temperature of perimeter seal 32 allows perimeter seal 32 to melt and bond to vacuum panes 21 and 23 without heating any portion of vacuum panes 21-23 to a temperature that would remove the temper from the glass. Advantageously, this allows vacuum panes 21 and 23 to be made of tempered glass and to retain their temper throughout the manufacturing/bonding process. This advantage allows vacuum panel 20 to include multiple parallel panes of tempered glass (i.e., vacuum panes 21 and 23) bonded together along their perimeter to form a hermetic seal around gap 25.

In some embodiments, vacuum panes 21 and 23 are bonded together using an ultrasonic welding process. Ultrasonic welding is an industrial technique whereby high-frequency ultrasonic acoustic vibrations are locally applied to workpieces being held together under pressure to create a solid-state weld. The main components of an ultrasonic welding system are a high-frequency voltage generator, a converter (i.e., an ultrasonic transducer), a booster, and a welding tool called a sonotrode. The high-frequency voltage generator converts an input voltage into a high frequency voltage, which is transformed by the converter into mechanical oscillations of the same frequency. The booster modifies (i.e., amplifies) the amplitude of vibration based on a signal from a controller. The sonotrode emits the converted energy in the form of mechanical shear waves into the components being welded together (i.e., vacuum panes 21 and 23). During the welding process, the sonotride may be pressed onto an exterior surface of vacuum pane 21 or vacuum pane 23 by a perpendicular force. In some embodiments, the perpendicular force is within the range of 250 N-350 N.

Advantageously, the ultrasonic welding process may be characterized by temperatures well below the glass transition temperature of vacuum panes 21 and 23. For example, the ultrasonic welding process can be performed to form a hermetic seal between vacuum panes 21 and 23 without exposing any portion of vacuum panes 21 and 23 to a temperature that would remove the temper from the glass. This advantage allows vacuum panes 21 and 23 to be made of tempered glass and to retain their temper throughout the ultrasonic welding process. The ultrasonic welding can be performed with or without an intermediate adhesive or solder used to bond vacuum panes 21 and 23. For example, perimeter seal 32 may be used in some embodiments and omitted in other embodiments. If perimeter seal 32 is used, the ultrasonic welding process may be performed to melt and bond perimeter seal 32 to vacuum panes 21 and 23 at a temperature significantly below the glass transition temperature of vacuum panes 21 and 23. If perimeter seal 32 is not used, the ultrasonic welding process may be performed to bond vacuum panes 21 and 23 directly to each other.

In some embodiments, perimeter seal 32 and spacers 30 are formed using a priming process (e.g., 2D or 3D printing, ceramic in-glass printing, etc.) or an additive manufacturing process. For example, a printer (e.g., a dot-matrix printer, a ceramic printer, a 3D printer, etc.) can be used to print a layer of material along the perimeter of vacuum pane 21 and/or vacuum pane 23 to form perimeter seal 32. The primer can also be used to print columns or dots of material to form a grid of spacers 30 at the locations shown in FIGS. 7B-7C. In various embodiments, perimeter seal 32 and spacers 30 may be formed using different materials or the same material. For example, the printer may be configured to print a layer of a first material along the perimeter of vacuum panes 21 and/or 23 to form perimeter seal 32, and a layer of a second material to form spacers 30 at the locations shown in FIGS. 7B-7C. The different materials/layers may be printed sequentially or concurrently using a printer that can switch between printing different materials.

In some embodiments, perimeter seal 32 and spacers 30 are formed using a glass printing process. The glass printing process may include using an in-glass printer and/or digital ceramic inks to print perimeter seal 32 and/or spacers 30 onto a surface of vacuum pane 21 and/or vacuum pane 23. Exemplary in-glass printers and digital ceramic inks may which may be used to perform the glass printing process may include those manufactured by Dip-Tech Digital Printing Technologies Ltd. The glass printing process may include printing a layer of ceramic ink onto vacuum pane 21 and/or vacuum pane 23, drying the ceramic ink (e.g., using a blower or diver), placing vacuum panes 21 and 23 in parallel with each other with the layer of ceramic ink between vacuum panes 21 and 23, and tempering the assembly to fuse the ceramic ink to both vacuum panes 21 and 23.

Vacuum panel 20 is shown to include a vacuum port 34. Vacuum port 34 may be used to remove air from gap 25 after vacuum panel 20 has been assembled to draw a vacuum within gap 25. In various embodiments, vacuum port 34 may extend through vacuum pane 21 or vacuum pane 23. Vacuum port 34 may be formed (e.g., drilled, cut, etc.) prior to tempering vacuum panes 21 and 23 to avoid damage that could result from forming a vacuum port in tempered glass. After vacuum port 34 is formed, vacuum panes 21 and 23 may be tempered. A cap 33 may be used to cover vacuum port 34 once the vacuum has been drawn within gap 25. Cap 33 can be adhered to outside surface 29 or 26 using any of a variety of adhesives or sealing materials. In some embodiments, cap 33 is adhered using the same material used to form perimeter seal 32.

In some embodiments, vacuum panel 20 includes a getter 31 located within gap 25. Getter 31 may be a reactive material configured to remove small amounts of gas from gap 25. For example, getter 31 may be configured to combine chemically with gas molecules within gap 25 or may remove the gas molecules by adsorption. Advantageously, getter 31 helps to form and maintain the vacuum within gap 25 by removing any gas molecules not removed via vacuum port 34 or which leak into gap 25 over time. In some embodiments, getter 31 is inserted into gap 25 in a preformed condition. In other embodiments, getter 31 can be printed onto vacuum panel 21 or 23 along with perimeter seal 32 and/or spacers 30.

In some embodiments, one or more of surfaces 26-29 have a film or coating applied thereto. For example, one or more of surfaces 26-29 may have an anti-condensate film or coating (e.g., a pyrolitic coating, a mylar coating, etc.) which may be used to prevent condensation from occurring. In one embodiment the anti-condensate film or coating is applied to surface 29. In some embodiments, the film or coating applied to surface 29 prevents the contamination of merchandise in the temperature-controlled storage device in the event that vacuum panels 21 and/or 23 are damaged (e.g., by containing glass shards). In other embodiments, the anti-condensate coating can be applied to any of surfaces 26-29 or to a surface of another pane or panel of vacuum panel 20. For example, the anti-condensate coating can be applied to an optional safety panel located adjacent to surface 26 and/or surface 29. The anti-condensate coating can be applied by spraying, adhering, laminating, or otherwise depositing the coating (e.g., using chemical vapor deposition or any other suitable technique). In some embodiments, the anti-condensate coating is made of a self-healing material (e.g., urethane) and is capable of healing scratches.

In some embodiments, the anti-condensate coating is an electrically-conductive coating. To provide electricity to the coating, vacuum panel 20 may include parallel bus bars (e.g., top and bottom, left and right side, etc.). The bus bars may be spaced apart from one another and adhered to the electrically-conductive coating. Each bus bar may include a lead assembly or solder tab for adhering wires that are in communication with an electrical source. In this arrangement, electric current may pass through one of the lead assemblies, to a first of the bus bars, across the electrically-conductive coating to the second bus bar, and through the other lead assembly. The electric current may cause heat to be generated across panes 21 and/or 23 (e.g., due to electrical resistance of the coating), which may assist in preventing condensation on panes 21 and/or 23. An exemplary bus bar system is described in greater detail in U.S. Pat. Nos. 6,606,832, and 6,606,833, which are incorporated by reference herein for their descriptions thereof. The bus bars and the electrically-conductive coating may be components of a heating element configured to apply heat to vacuum panel 20. The heating element may be used to prevent condensation when vacuum panel 20 is implemented in humid environments and/or when vacuum panel 20 is used to provide thermal insulation between spaces having relatively large temperature differences. For example, the heating element may be used when vacuum panel 20 is implemented as part of a freezer door.

In some embodiments, display case door 12 is configured to maximize visible light transmission from inside the case to the customer, thereby improving the ability of customers to view display items. However, it is also desirable to minimize the transmission of non-visible tight (i.e., ultraviolet and infrared light) through vacuum panel 20 from outside to inside the case in order to improve thermal performance (e.g., by reducing radiation heat transfer) and to protect items therein. In some embodiments, an anti-reflective coating may be applied to one or both of vacuum panes 21 and 23. The anti-reflective coating may absorb or transmit infrared light, ultraviolet light, or any combination thereof. In some embodiments, the anti-reflective coating may absorb or transmit some frequencies of visible light in addition to infrared and/or ultraviolet light.

In some embodiments, display case door 12 may be configured to use non-visible wavelengths of light to heat vacuum panel 20, thereby reducing or preventing condensation. For example, one or both of vacuum panes 21 and 23 may include an ultraviolet (UV) inhibitor. A UV inhibitor may increase the shelf life of products within the temperature-controlled storage device by preventing ultraviolet light from passing through vacuum panel 20. The ultraviolet light may be absorbed or reflected by the UV inhibitor and may be used as a source of energy to heat vacuum panel 20. As another example, one or more panes of vacuum panel 20 may be treated with a low-emissivity heat-reflective coating to improve overall thermal resistance (e.g., by reducing radiation heat transfer) and/or to prevent external condensation.

Advantageously, vacuum panel 20 is a thermopane unit that appears as a single pane of glass due to the minimal separation (e.g., 0.2 mm) between vacuum panes 21 and 23. The minimal separation is achieved by providing an evacuated gap 25 between vacuum panes 21 and 23, which creates a thermobreak having a high thermal resistance. The thickness of gap 25 can be precisely controlled by providing spacers 30 to maintain the separation between panes 21 and 23.

Figure 7G:
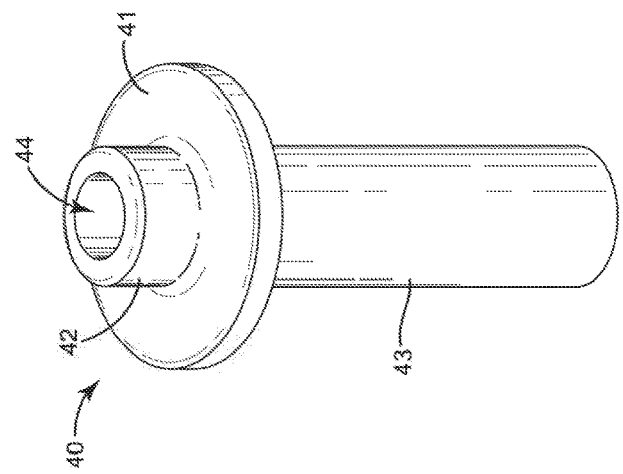
FIG. 7G is a perspective view of the vacuum tube shown in FIG. 7E, according to an exemplary embodiment.
Figure 7E:
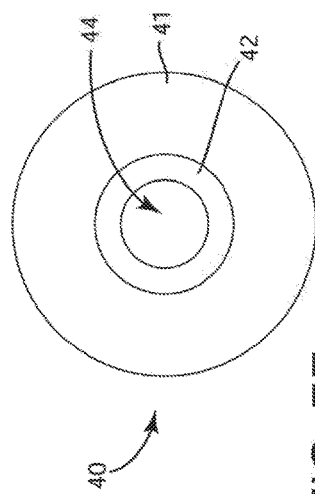
FIG. 7E is a top view of a vacuum tube which may be used to draw a vacuum within the vacuum panel, according to an exemplary embodiment.
Figure 7F:
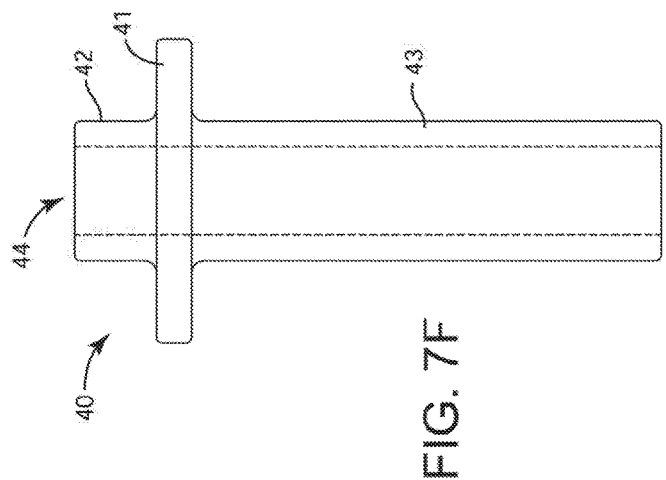
FIG. 7F is a front cross-sectional view of the vacuum tube shown in FIG. 7E, according to an exemplary embodiment.

Referring now to FIGS. 7E-7G, several drawings of a vacuum tube 40 are shown, according to an exemplary embodiment. FIG. 7E is a top view of vacuum tube 40; FIG. 7F is a front cross-sectional view of vacuum tube 40; and FIG. 7G is a perspective view of vacuum tube 40. Vacuum tube 40 may be used to pump air out of gap 25 via vacuum port 34. For example, vacuum tube 40 may be inserted into vacuum port 34 and may be configured to attach to an external vacuum pump. In some embodiments, vacuum tube 40 is made of a soft copper material. In other embodiments, vacuum tube 40 may be made of glass.

Vacuum tube 40 is shown as a cylindrical tube having a bore 44 extending axially therethrough. Vacuum tube 40 includes a radial flange 41 projecting from an outer circumferential surface of vacuum tube 40 and dividing vacuum tube 40 into a first portion 42 and a second portion 43. In some embodiments, flange 41 is offset from the center of vacuum tube 40 such that the axial length of first portion 42 is shorter than the axial length of second portion 43. Vacuum tube 40 may be fused or bonded to vacuum pane 21 or 23 such that first portion 42 or second portion 42 is located within vacuum port 34. In some embodiments, vacuum tube 40 is bonded to vacuum pane 21 or 23 using the same material that forms perimeter seal 32 (e.g., S-Bond solder).

Figure 7I:
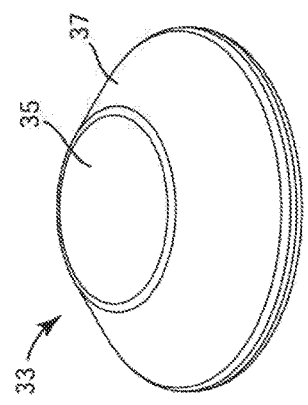
FIG. 7I is a perspective view of the cap shown in FIG. 7H, according to an exemplary embodiment.
Figure 7K:
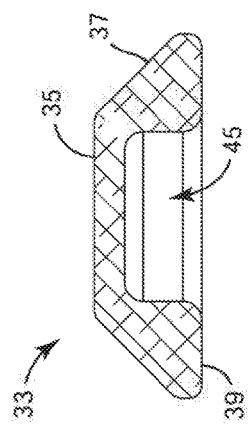
FIG. 7K is a side cross-sectional view of the cap shown in FIG. 7H, according to an exemplary embodiment.
Figure 7H:
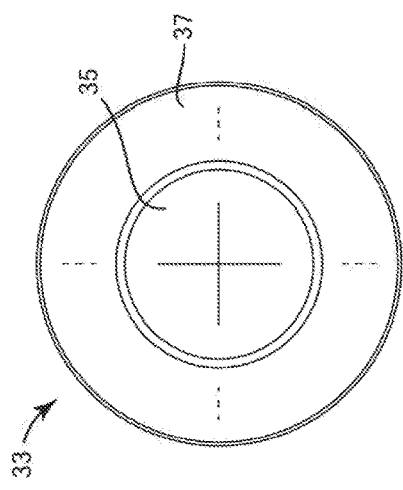
FIG. 7H is a top view of a cap which may be used to cover a vacuum port in the vacuum panel, according to an exemplary embodiment.
Figure 7J:
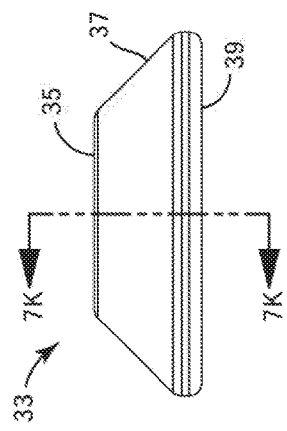
FIG. 7J is a front view of the cap shown in FIG. 7H, according to an exemplary embodiment.

Referring now to FIGS. 7H-7K, several drawings illustrating cap 33 in greater detail are shown, according to an exemplary embodiment. FIG. 7H is a top view of cap 33; FIG. 7I is a perspective view of cap 33; FIG. 7J is a front view of cap 33; and FIG. 7K is a side cross-sectional view of cap 33. Cap 33 is shown having a frustoconical shape including a top circular surface 35, a bottom circular surface 39, and a side surface 37 connecting top surface 35 and bottom surface 39. Top surface 35 and bottom surface 39 may be parallel surfaces offset from each other and concentrically aligned. In some embodiments, top surface 35 is smaller than bottom surface 39. Side surface 37 may be oriented at an oblique angle (e.g., approximately 45 degrees) relative to top surface 35 and bottom surface 39.

As shown in FIG. 7K, a cylindrical bore 45 may extend partially through cap 33. Bore 45 may have a diameter that is substantially equal to the outer diameter of vacuum tube 40 such that first portion 42 or second portion 43 can be received in bore 45. In various embodiments, cap 33 may be made of a metal (e.g., aluminum, copper, stainless steel, etc.), ceramic, glass, or other inorganic material capable of maintaining the vacuum within gap 25. Cap 33 may be bonded to vacuum tube 40, vacuum pane 21, and/or vacuum pane 23. For example, the inner surface of bore 45 may be bonded to the outer surface of vacuum tube 40. Bottom surface 39 may be bonded to outside surface 29 of vacuum pane 23 (as shown in FIG. 7D) or to outside surface 26 of vacuum pane 21 (e.g., for embodiments in which vacuum port 34 extends through vacuum pane 21).

Figure 7M:
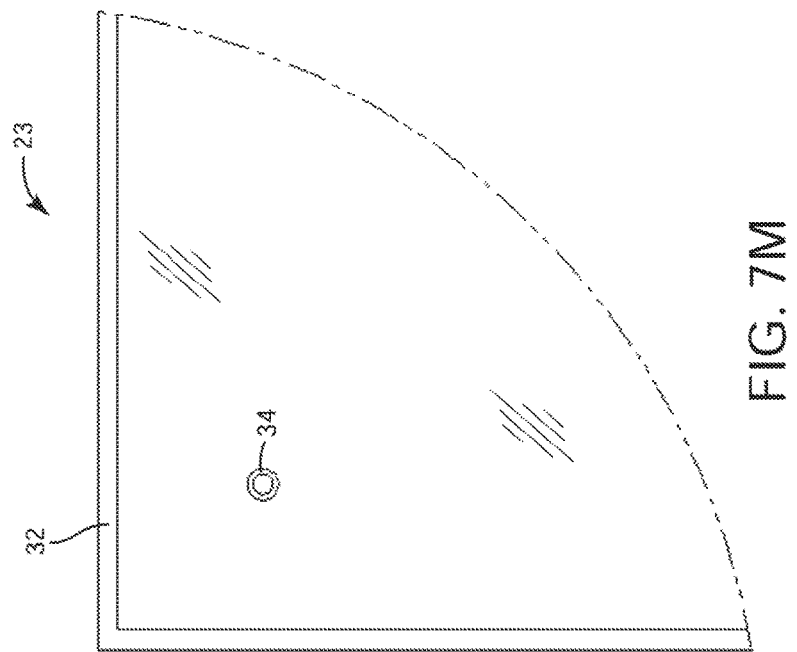
FIG. 7M is a detail view of a portion of the vacuum pane shown in FIG. 7L, according to an exemplary embodiment.
Figure 7L:
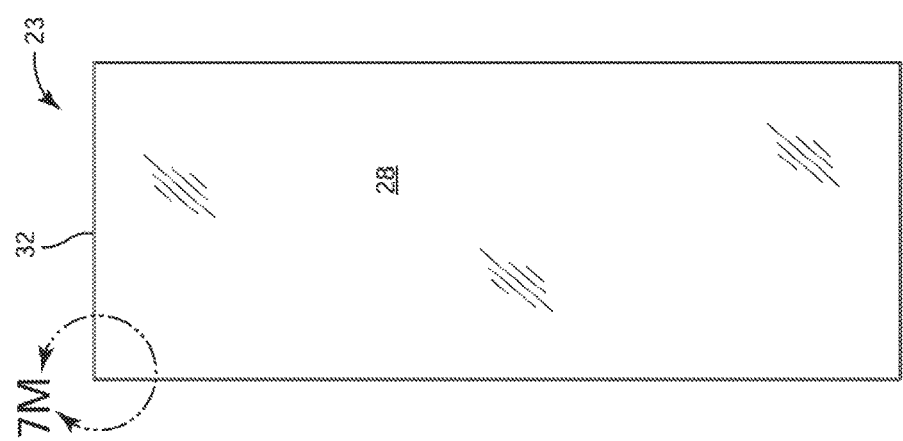
FIG. 7L is a front elevation view of one of the vacuum panes which may be used to form the vacuum panel shown in FIG. 1, according to an exemplary embodiment.

Referring now to FIGS. 7L-7M, vacuum pane 23 is shown in greater detail, according to an exemplary embodiment. FIG. 7L is a front elevation view of vacuum pane 23 and FIG. 7M is a detail view of the portion of vacuum pane 23 highlighted in FIG. 7L. Vacuum pane 23 is shown to include a vacuum port 34 extending through the thickness of the glass (e.g., between surfaces 28 and 29). Vacuum port 34 may be formed prior to tempering vacuum pane 23 to avoid damage that could result from cutting a hole in tempered glass. After vacuum port 34 is formed, vacuum pane 23 may be tempered, along with vacuum pane 21.

Perimeter seal 32 is shown extending along the perimeter of vacuum pane 23. As previously described, perimeter seal 32 may be applied using a printing process. In other embodiments, perimeter seal 32 may be applied by tinning the perimeter of vacuum pane 23 and applying perimeter seal 32 to the tinned portion. Vacuum pane 21 may be the same or similar to vacuum pane 23, with the exception that vacuum pane 21 may not include vacuum port 34. In other embodiments, vacuum port 34 may be formed in vacuum pane 21 (and not vacuum pane 23). One or both of vacuum panes 21 and 23 may include a low-emissivity coating, an anti-condensate coating, a heat-reflective coating, a protective laminate layer, or other types of coatings as previously described.

Figure 7N:
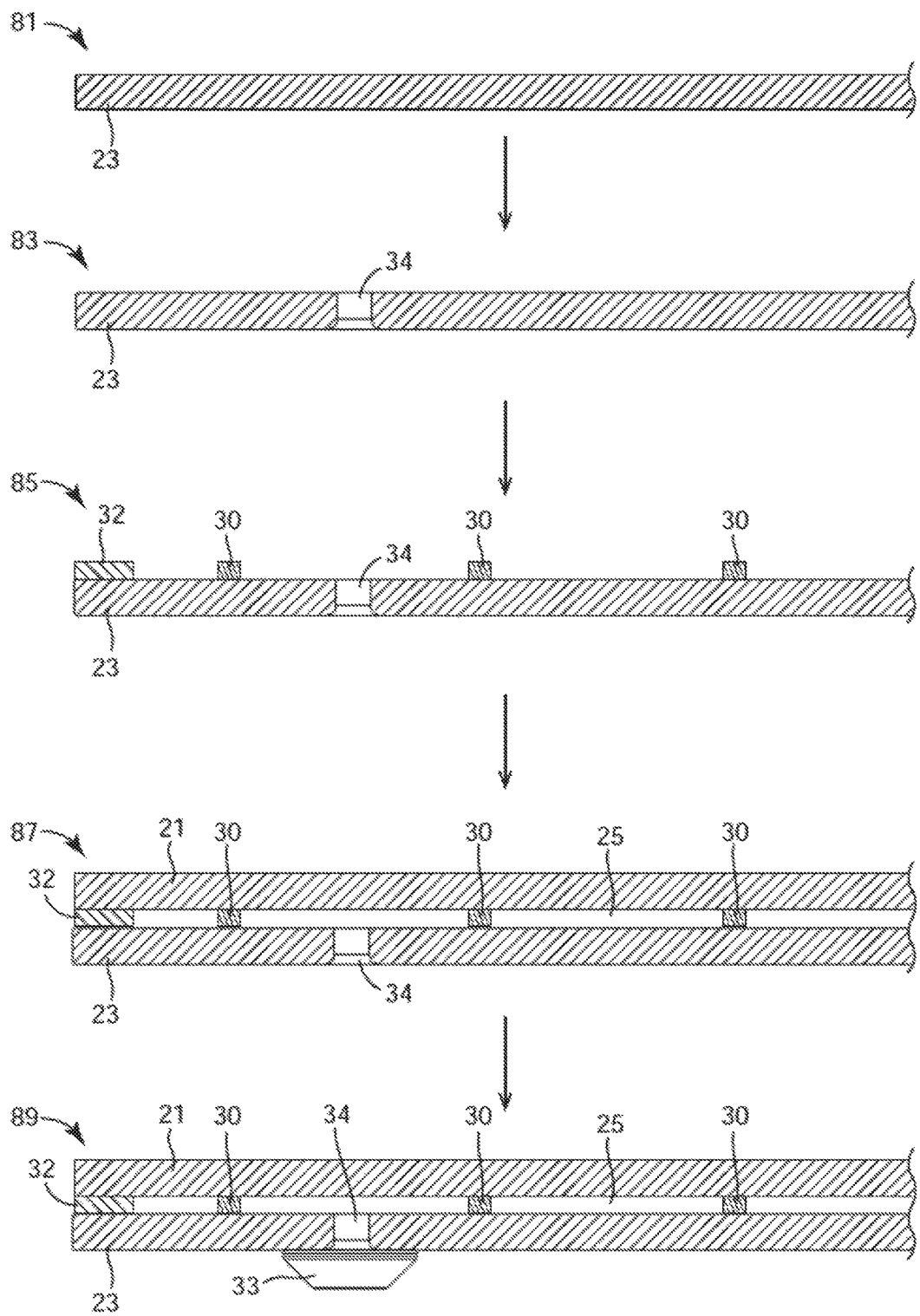
FIG. 7N is a flow diagram illustrating, a manufacturing process which may be used to form the vacuum panel shown in FIG. 1, according to an exemplary embodiment.

Referring now to FIG. 7N, a flow diagram illustrating a manufacturing process for vacuum panel 20 is shown, according to an exemplary embodiment. The manufacture of vacuum panel 20 may begin with vacuum pane 23 in a non-tempered condition (stage 81). Prior to tempering vacuum pane 23, vacuum port 34 may be formed (e.g., cut, drilled, etc.) in vacuum pane 23. This allows vacuum port 34 to be formed without damaging vacuum pane 33. After vacuum port 34 is formed, vacuum pane 23 may be tempered, resulting in a tempered pane of glass with a vacuum port 34 extending therethrough (stage 83).

The manufacturing process may include applying perimeter seal 32 and spacers 30 (stage 85). In some embodiments, perimeter seal 32 and spacers 30 are formed using a printing process (e.g., 2D or 3D printing) or an additive manufacturing process as previously described. In other embodiments, the outer perimeter of vacuum pane 23 may be tinned and perimeter seal 32 may be applied to the tinned portion. Perimeter seal 32 may be applied to only vacuum pane 23, only vacuum pane 21, or both vacuum pane 21 and 23 in various embodiments.

Vacuum panes 21 and 23 may be aligned in parallel and welded together (stage 87). In some embodiments, the welding process is an ultrasonic welding process. In some embodiments, the welding process involves heating the perimeter of vacuum panes 21 and 23 to a temperature sufficient to melt perimeter seal 32. As previously described, perimeter seal 32 may be a low-temperature solder or other sealing material that has a melting range significantly lower than the glass transition temperature of vacuum panes 21 and 23. For example, perimeter seal 32 may have a melting range of approximately 220° C.-280° C., whereas the glass transition temperature of vacuum panes 21 and 23 may be approximately 520° C.-600° C. (i.e., the glass transition temperature for soda lime glass). The relatively lower melting temperature of perimeter seal 32 allows perimeter seal 32 to melt and bond to vacuum panes 21 and 23 without heating any portion of vacuum panes 21-23 to a temperature that would remove the temper from the glass. Advantageously, this allows vacuum panes 21 and 23 to be made of tempered glass and to retain their temper throughout the manufacturing/bonding process.

After vacuum panes 21 and 23 are welded together, a vacuum may be drawn within gap 25 (e.g., using vacuum tube 40) and cap 33 may be applied (stage 89). Cap 33 may be fastened (e.g., attached, bonded, fixed, etc.) to the surface of vacuum pane 23 or vacuum pane 21 to cover vacuum port 34 and maintain the vacuum in gap 25. Cap 33 may be bonded to vacuum tube 40, vacuum pane 21, and/or vacuum pane 23. For example, end cap 33 may be bonded to outside surface 29 of vacuum pane 23 (as shown in FIG. 7N) or to outside surface 26 of vacuum pane 21 (e.g., for embodiments in which vacuum port 34 extends through vacuum pane 21).

Figure 8A:
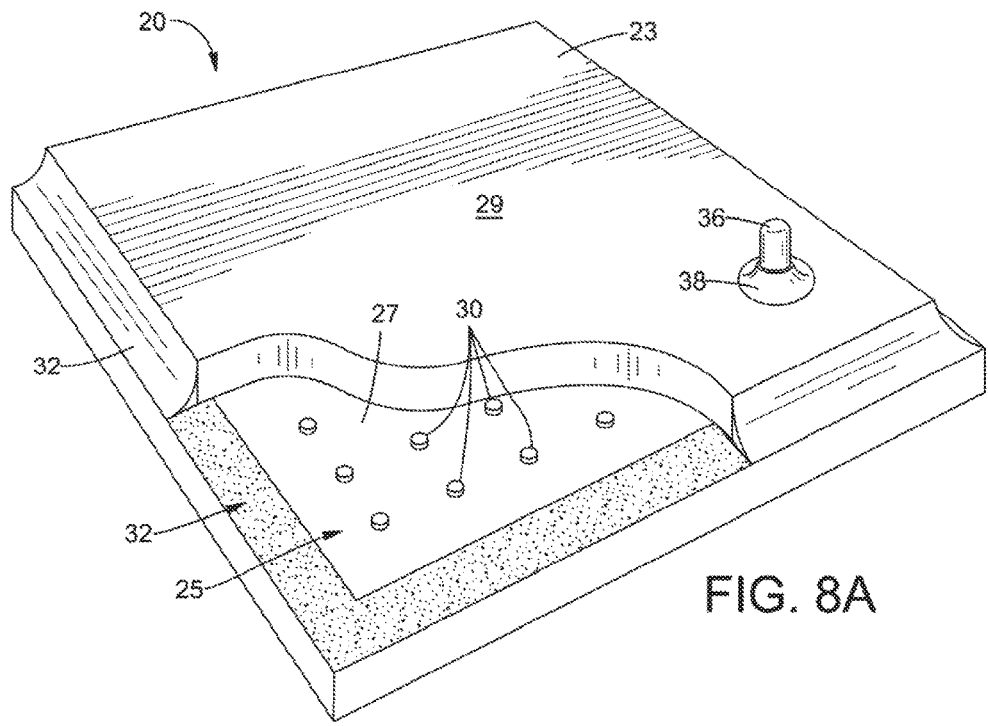
FIG. 8A is a perspective view of the transparent glass unit of FIG. 1, according to an exemplary embodiment.
Figure 8B:
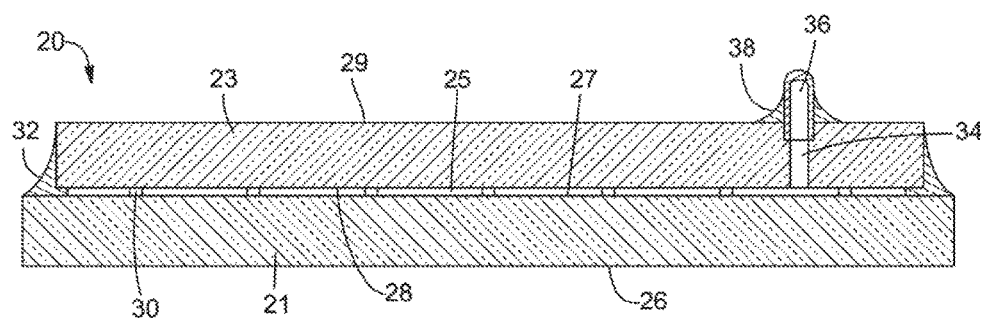
FIG. 8B is a cross-sectional view of the transparent glass unit shown in FIG. 8A, according to an exemplary embodiment.

Referring now to FIGS. 8A and 8B, an assembled version of vacuum panel 20 is shown, according to another exemplary embodiment. As shown in FIG. 8B, vacuum panes 21 and 23 are positioned in parallel and offset from each other by the width of gap 25. The width of gap 25 (e.g., the distance between panes 21 and 23) may be uniform or substantially uniform at various locations between vacuum panes 21 and 23 due to the flatness of vacuum panes 21 and 23.

Still referring to FIG. 8B, a plurality of spacers 30 are shown positioned within gap 25. Spacers 30 may be configured to maintain the separation between vacuum panes 21 and 23 when gap 25 is evacuated. Spacers 30 may prevent external pressure (e.g., atmospheric pressure) from causing vacuum panes 21 and 23 to flex inward when a vacuum is drawn in gap 25. In some embodiments, spacers 30 include a plurality of support pillars extending between vacuum panes 21 and 23 (e.g., between surfaces 27 and 28). The support pillars may be configured to provide internal support (e.g., compression support) for vacuum panel 20 to counter the pressure differential between atmospheric pressure outside vacuum panes 21 and 23 and the vacuum between panes 21 and 23 (e.g., in gap 25).

As shown in FIG. 8A, spacers 30 may be arranged in a grid (e.g., approximately 50 mm apart) between panes 21 and 23. In some embodiments, spacers 30 are separated from each other by a distance approximately ten times the thickness of gap 25. In some embodiments, each of spacers 30 has a thickness equivalent to the thickness of gap 25 (e.g., approximately 0.2 mm). Spacers 30 may contact surfaces 27 and 28 to ensure that the thickness of gap 25 is maintained. In some embodiments, spacers 30 are cylindrical or Substantially cylindrical. Spacers 30 may have a diameter or width of approximately 0.5 mm. Spacers 30 may be transparent or semi-transparent to minimize the visibility thereof.

Still referring to FIGS. 8A and 8B, gap 25 may be sealed around a perimeter of vacuum panes 21 and 23 by perimeter seal 32. Perimeter seal 32 may be, for example, a ceramic frit, glass solder or another sealing material configured to bond vacuum panes 21 and 23 along a perimeter thereof and to provide an airtight seal within gap 25. In some embodiments vacuum pane 23 is smaller than vacuum pane 21. For example, the perimeter of vacuum pane 23 may be circumscribed by the perimeter of vacuum pane 21. Perimeter seal 32 may bond with vacuum pane 23 along the top, bottom, and side surfaces of vacuum pane 23. Perimeter seal 32 may bond with vacuum pane 21 along inside surface 27. Gap 25 may be accessed via a vacuum port 34 extending through one of vacuum panes 21 or 23. For example, as shown in FIG. 8A. vacuum port 34 passes through rear vacuum pane 23 between surfaces 28 and 29. In other embodiments, vacuum port 34 may pass through front vacuum pane 21 or through perimeter seal 32. Vacuum port 34 may be used to remove air from gap 25 (e.g., after perimeter seal 32 is applied) to draw a vacuum in gap 25.

Vacuum port 34 may be capped (e.g., closed, sealed, blocked, etc.) by an end cap 36. End cap 36 may be fastened (e.g., attached, bonded, fixed, etc.) within vacuum port 34 to maintain the vacuum in gap 25. End cap 36 may be sealed to vacuum pane 23 or to vacuum pane 23 by a cap seal 38. Cap seal 38 may be the same or similar to perimeter seal 32. For example, cap seal 38 may be a ceramic frit, glass solder, or another sealing material configured to bond end cap 36 to one or both of vacuum panes 21 and 23 (e.g., bonding to surface 29 or to surface 26).

Rail Assembly

Figure 9:
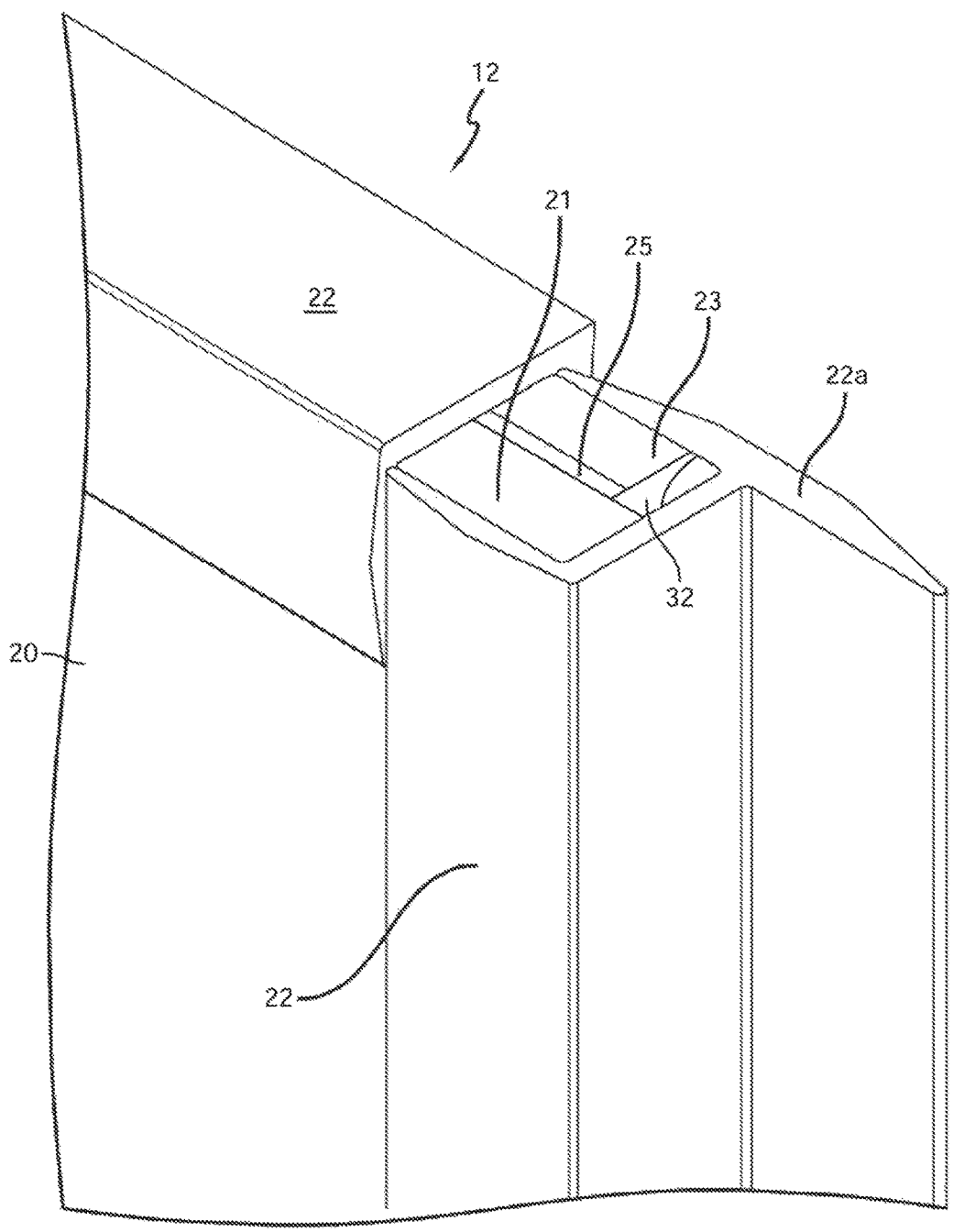
FIG. 9 is a perspective view of the transparent glass unit with edge guards thereon, according to an exemplary embodiment.

Referring now to FIG. 9, vacuum panel 20 is shown with edge guards 22, according to an exemplary embodiment. Edge guards 22 may by open channels (e.g., U-shaped or C-shaped channels) configured to fit over an edge of vacuum panel 20. Edge guards 22 may be adhered to the top edge, bottom edge, and non-hinge side edge of vacuum panel 20. For example, silicon or the like could be used for bonding. In some embodiments, edge guards 22 may be made of a transparent or semi-transparent material to maximize visibility through display case door 12.

Edge guards 22 may provide a sealing feature and may ensure that a person cannot come into contact with any electrically charged surfaces. Preferably, the edge guard 22 on the non-hinged side edge of vacuum panel 20 (e.g., on the right in FIG. 9) includes a wiper 22a that cooperates with a corresponding wiper 22a on an opposite oriented door (as shown in FIG. 5) to seal the temperature-controlled storage device when doors 12 are closed. In another embodiment, edge guards 22 may be omitted.

Figure 10:
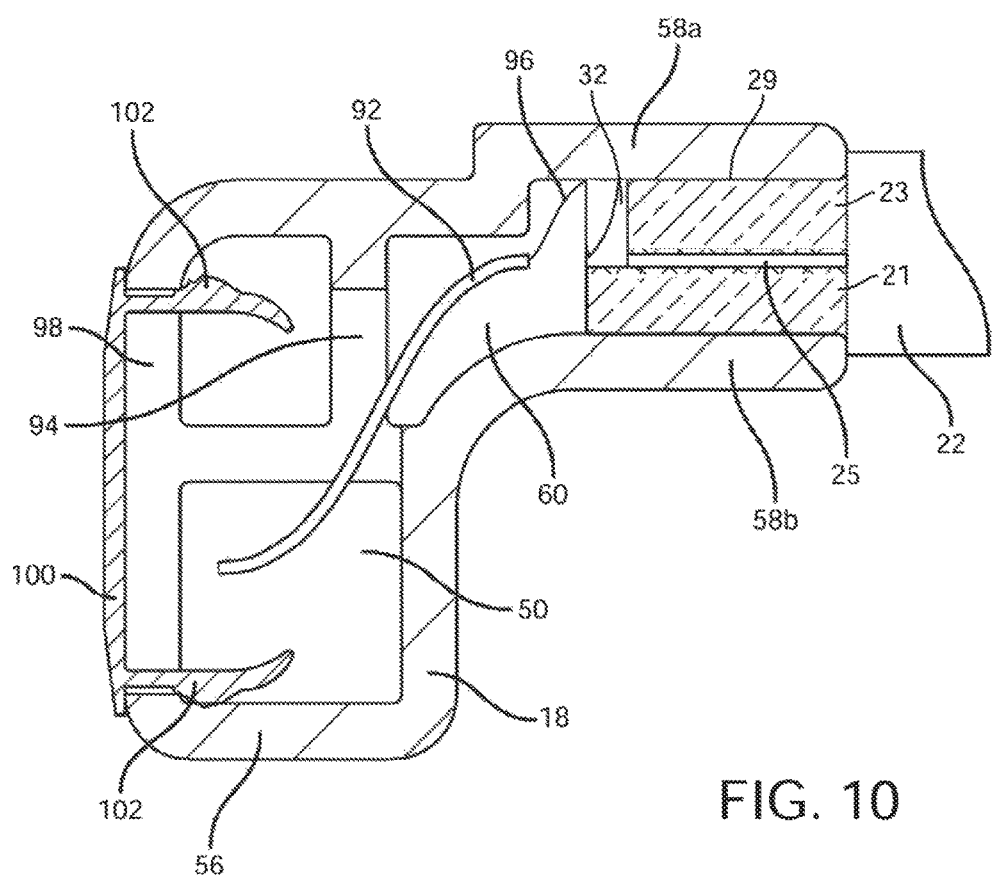
FIG. 10 is a cross-sectional plan view of the rail of the assembly of FIG. 1, according to an exemplary embodiment.
Figure 11:
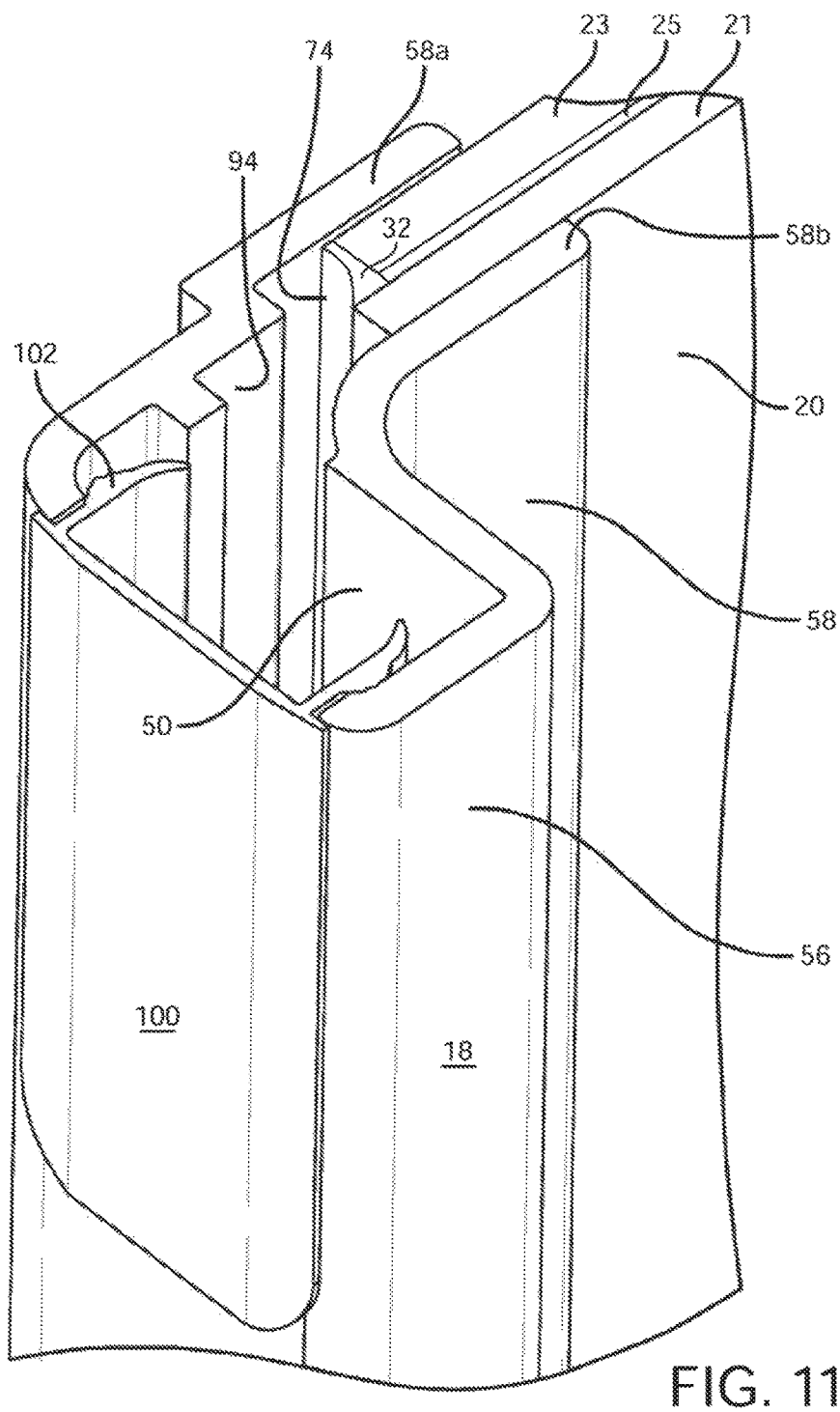
FIG. 11 is a cross-sectional perspective view of the rail of the assembly of FIG. 1, according to an exemplary embodiment.
Figure 12:
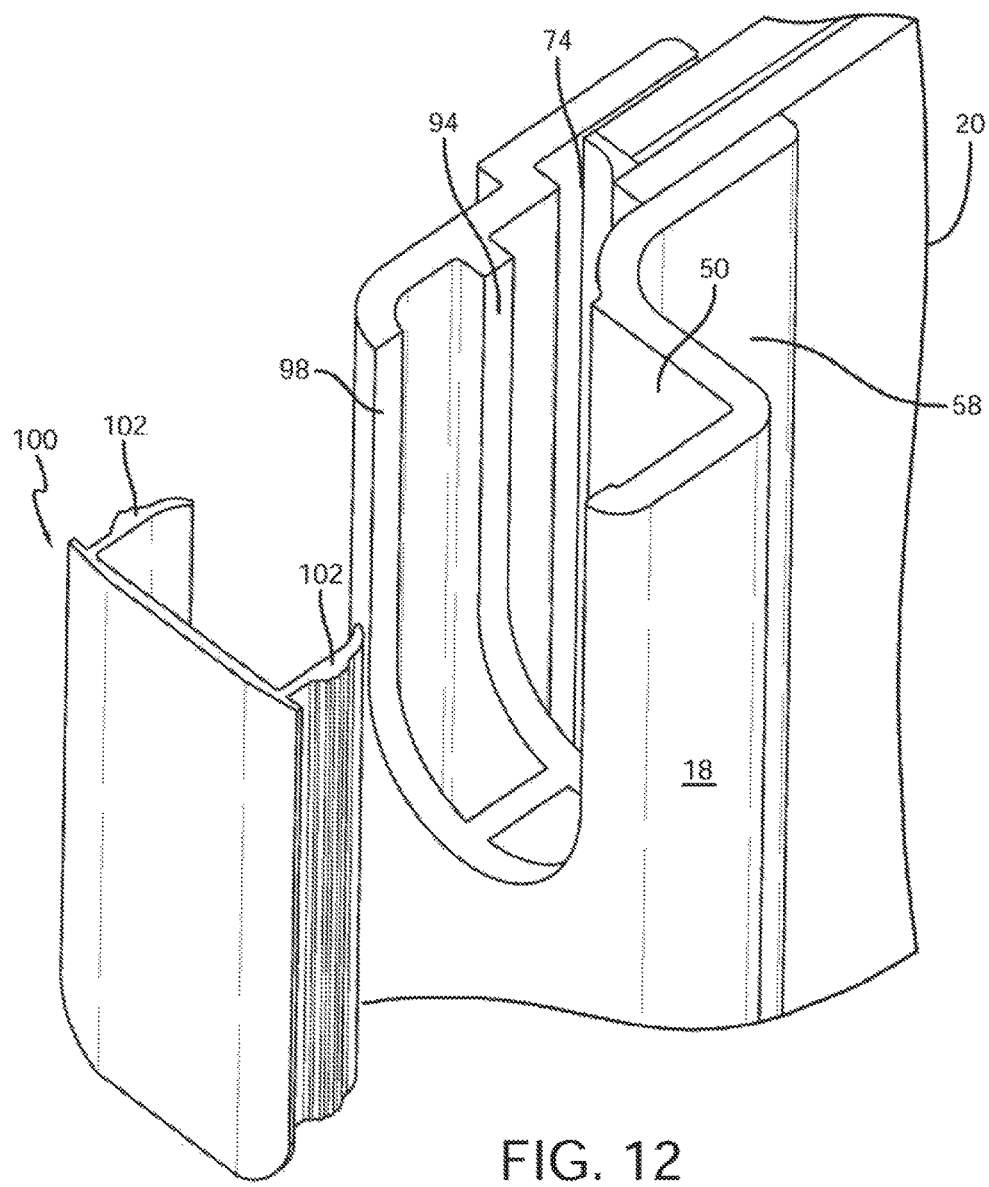
FIG. 12 a is a cross sectional perspective view of the rail of the assembly of FIG. 1 with an access cover removed from an access opening, according to an exemplary embodiment.

Referring now to FIGS. 10-12, vacuum panel 20 is shown secured in rail 18, according to an exemplary embodiment. Rail 18 may attach to vacuum panel 20 along the vertical length of vacuum panel 20. Rail 18 is shown to include a channel 50 having openings at the top and bottom thereof. The openings into channel 50 may be configured to receive hinge pins for hingedly connecting door 12 to frame 14. In a preferred embodiment, display case door assembly 10 includes a gravity hinge 52 at the bottom of channel 50 and an electrical hinge 54 at the top of channel 50 (described in greater detail with reference to FIGS. 13-16). In other embodiments, electrical hinge 54 may be omitted or replaced with a non-electrical hinge.

As shown in FIG. 10, rail 18 may have an "L" shaped cross-section when viewed from the top or the bottom. The "L" shape is shown to include a hinge portion 56 and a vacuum panel receiving portion 58. Vacuum panel receiving portion 58 may include opposing members 58a and 58b that define a channel 74 for receiving and securing vacuum panel 20. In some embodiments, rail 18 is an aluminum extrusion into which vacuum panel 20 is bonded (e.g., using an adhesive such as epoxy or polyurethane). A tape that incorporates an adhesive, such as acrylic or the like may also be used. In other embodiments, a mechanical clamp could be used to secure vacuum panel 20 place. Combinations of a clamp and adhesives or tape could also be used. None of these are a limitation on the present invention. In other embodiments, rail 18 can be made of another material, such as stainless steel or other metal.

Gravity Hinge

Referring now to FIGS. 13-16, those skilled in the art will appreciate the advantages of a gravity hinge, which generally includes a lower portion and an upper portion that rotates about an oblique junction upon the application of a rotational force. As the upper portion rotates, the two portions separate due to the oblique junction. The upper portion "rises" thereby storing potential energy which will cause the upper portion to "fall" or rotate back to a neutral position when the rotational force is terminated. Examples of gravity hinges are shown in U.S. Pat No. 4,631,777 to Takimoto, U.S. Pat. No. 3,733,650 to Douglas and U.S. Pat. No. 4,991,259 to Finkelstein et al, the entireties of which are incorporated herein by reference.

The gravity hinge 52 of the preferred embodiment includes a lower portion 60 and an upper 62. The lower portion 60 includes a plate 64 having an axial rod 66 extending upwardly therefrom. The upper portion 62 includes a collar 68 and a hinge pin 70 that are axially aligned and cooperate to define an opening 72 for receiving axial rod 66 of lower portion 60. Lower and upper portions 60 and 62 each include a cam track thereon (e.g., cam tracks 60a and 62a, respectively) that cooperate as described below. To secure door 12 on gravity hinge 52, hinge pin 70 is received in an opening at the bottom of channel 50 and rail 18 rests on collar 68.

In a preferred embodiment, the gravity hinge 52 includes a hold open feature. As shown in FIG. 14, cam track 62a on the upper portion 62 includes two peaks 76 and 78, one corresponding to the door closed position 76 and the other corresponding to the door open position 78. These peaks or detents are sized to receive the lower portion's cam track 62a. FIG. 17, shows gravity hinge 52 in the closed position. Preferably, closed peak 76 extends vertically higher than open peak 78. With this arrangement, when a user pushes door 12 from the open position toward the closed position, as a result of gravity and the potential energy stored when the door is in the open position, the door will fall to the closed position. FIG. 17 shows gravity hinge 52 just as the upper portion 62 is about to fall to the closed position. As shown in FIGS. 13-16, peaks 76 and 78 are preferably located about 90° apart, which allows door 12 to be held open at a position about perpendicular to the closed position. However, open detent 78 can be defined at other angles about the collar 68, as desired.

Figure 16:
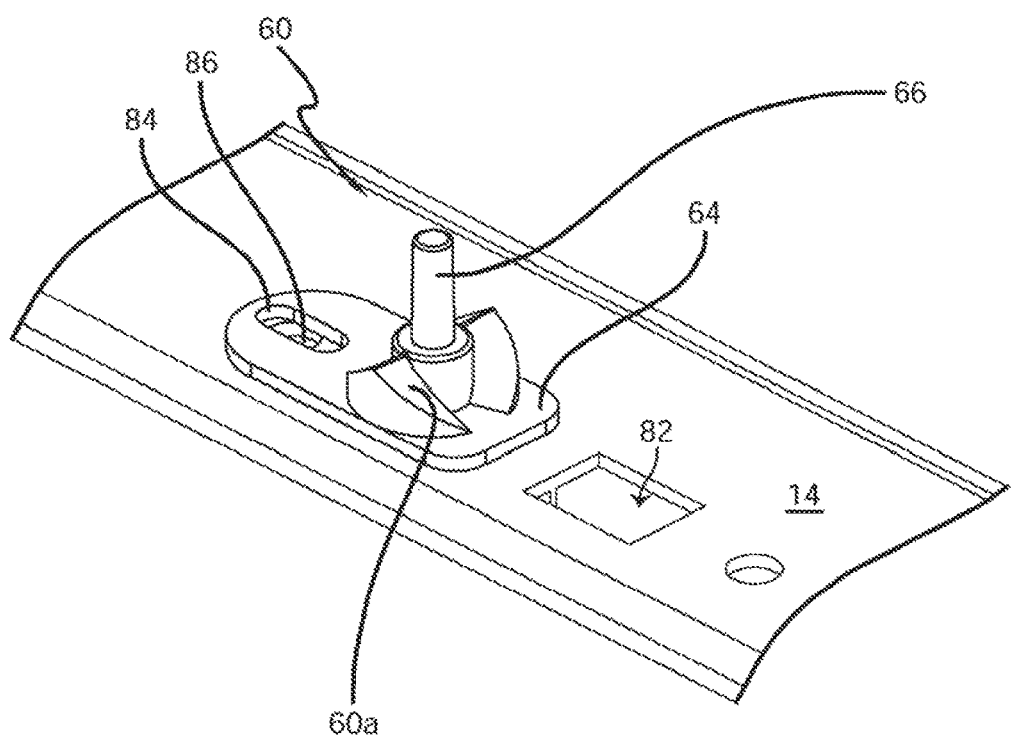
FIG. 16 is a perspective view of a lower portion of the gravity hinge of FIG. 14 mounted in the door frame of FIG. 1, according to an exemplary embodiment.
Figure 17:
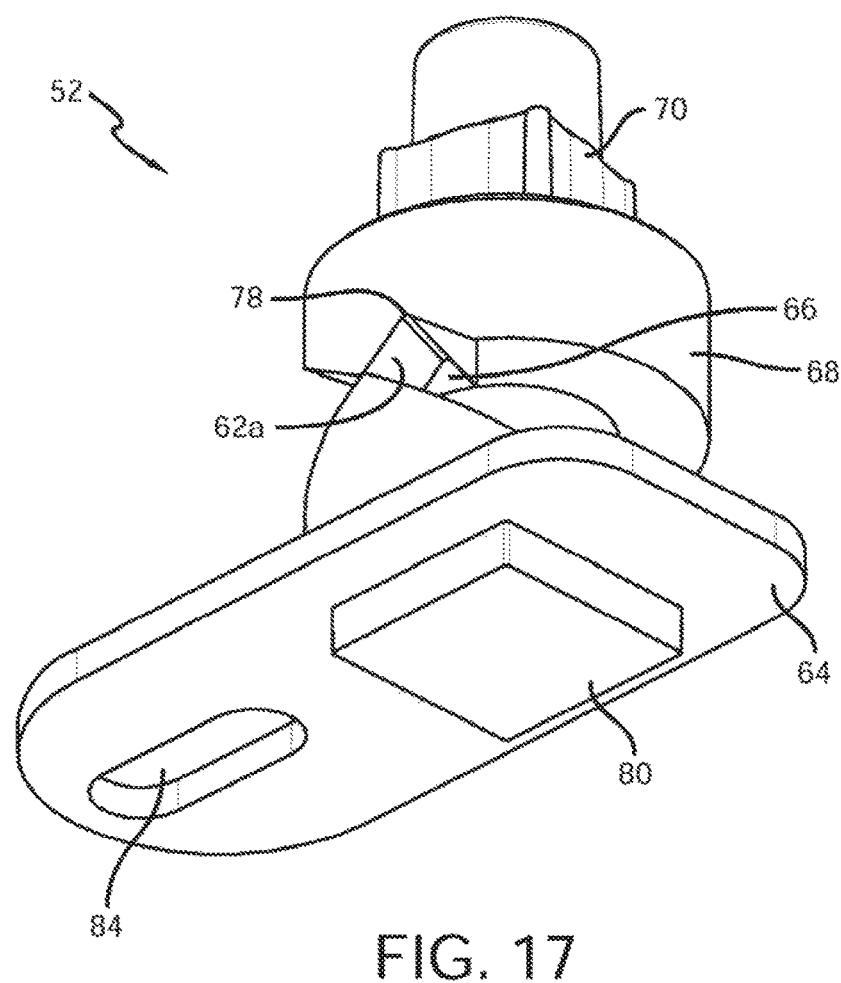
FIG. 17 is a bottom perspective view of the gravity hinge of FIG. 14 showing an upper portion of the gravity hinge in an open position, according to an exemplary embodiment.

Referring now to FIGS. 16-17, plate 66 is shown to include an alignment member 80 extending downwardly that is received into an alignment opening 82 in frame 14. Plate 64 also has an elongated slot 84 defined therein. To secure gravity hinge 52 to frame 14, a threaded fastener, such as a riv nut or clinch nut (not shown) extends through slot 84 and is threaded into an opening 86 in frame 14. Elongated slot 84 allows gravity hinge 52 a degree of adjustability. This helps prevent door sag and helps keep door 12 square or plumb as desired. It will be understood that gravity hinge 52 can be secured to frame 14 by other methods, such as welding, adhering, a threaded fastener with a nut, riveting, etc. In a preferred embodiment, upper portion 62 is comprised of a molded nylon and lower portion 60 is comprised of a metal, such as die cast zinc, stainless steel or the like.

Figure 19:
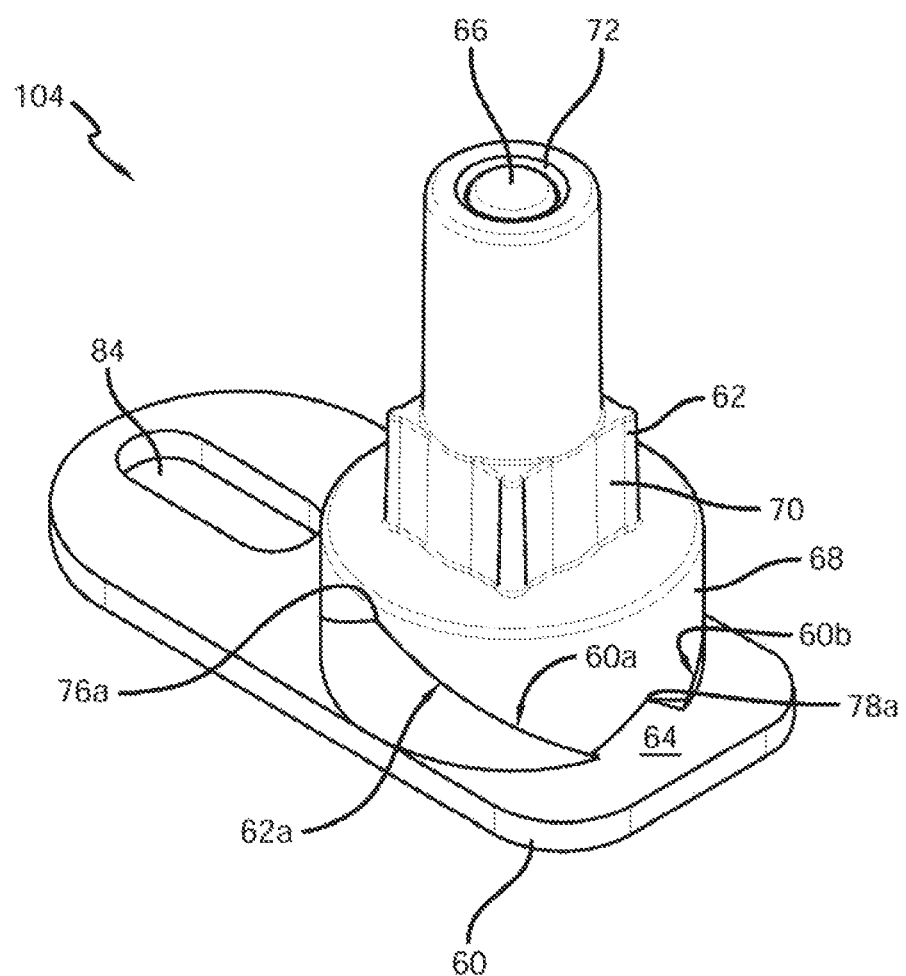
FIG. 19 is a perspective view of another gravity hinge for use with the display case door assembly of FIG. 1, according to another exemplary embodiment.
Figure 20:
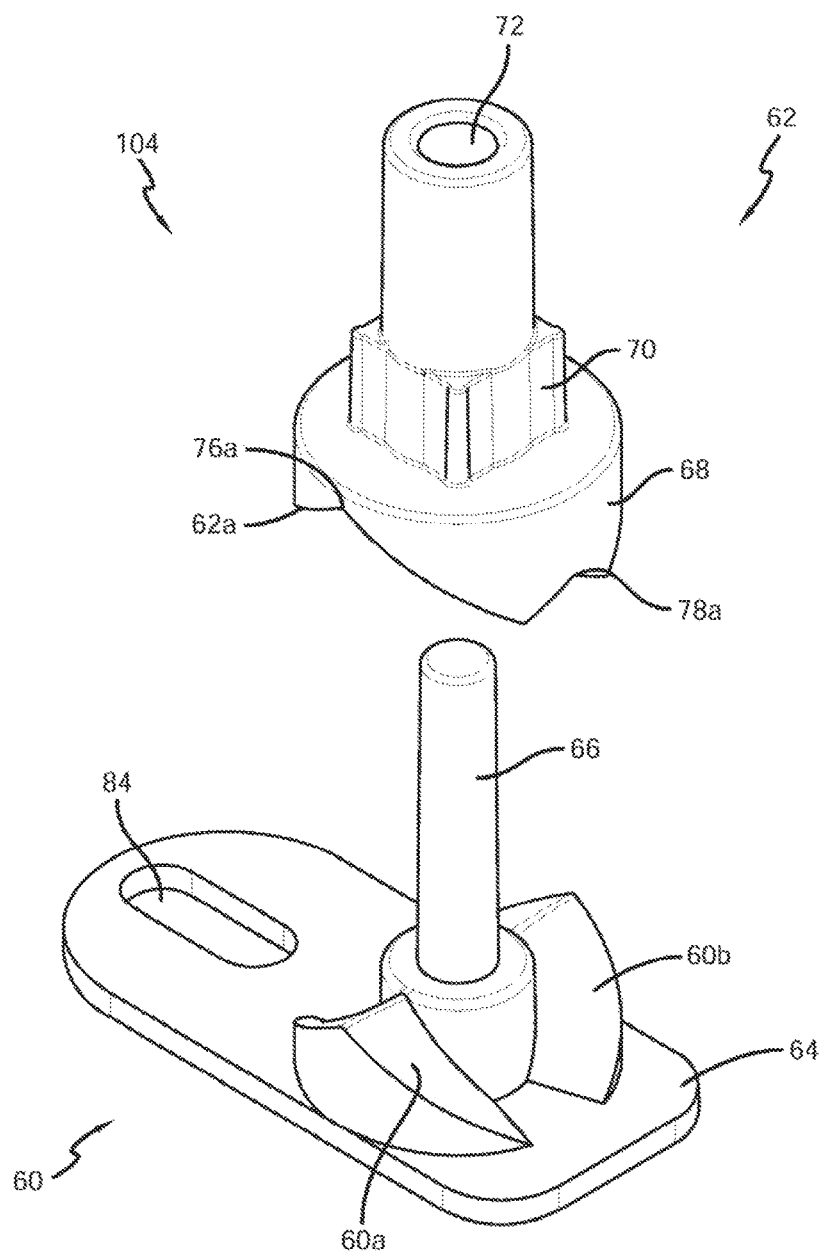
FIG. 20 is a top exploded perspective view of the gravity hinge of FIG. 19, according to an exemplary embodiment.
Figure 21:
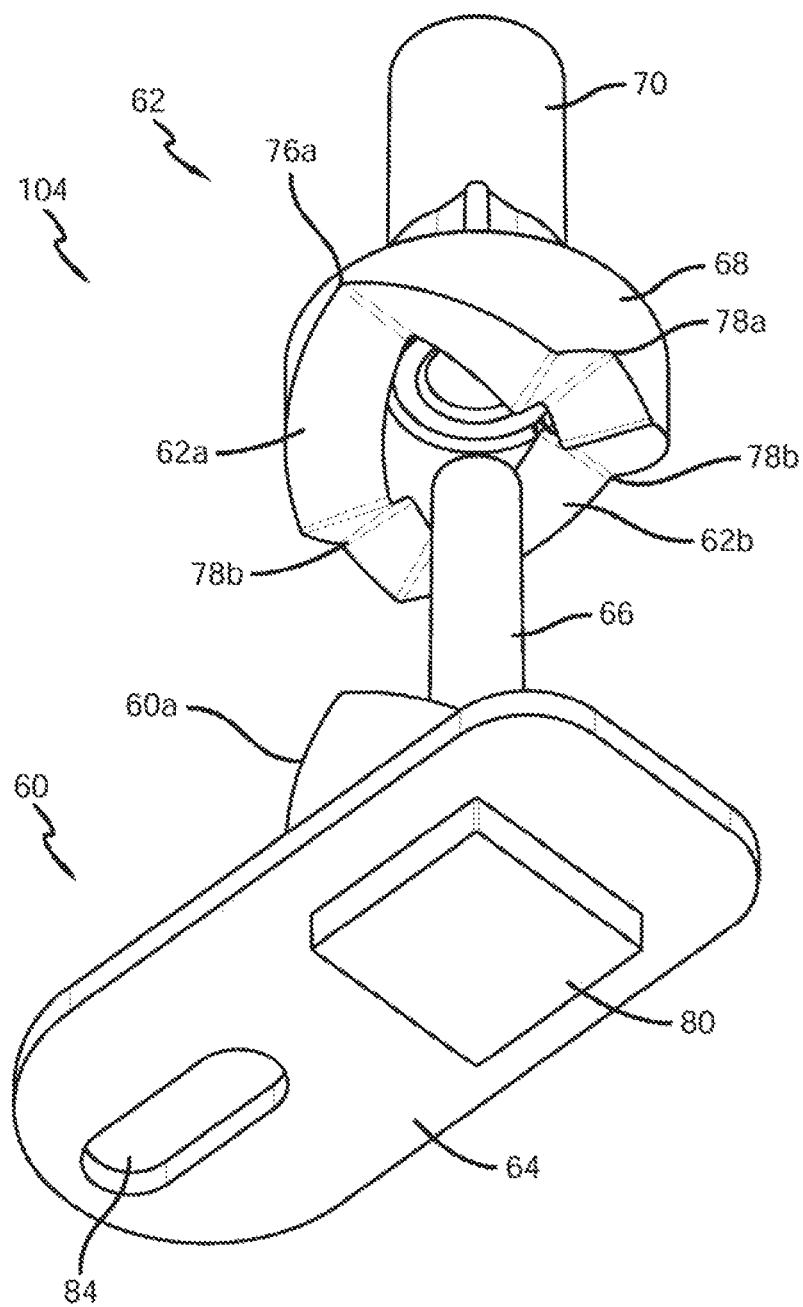
FIG. 21 is a bottom exploded perspective view of the gravity hinge of FIG. 19, according to an exemplary embodiment.

With reference to FIGS. 19-21, another embodiment of a gravity hinge 104 is shown. This gravity hinge 104 is similar to the gravity hinge 52 described above, except that the lower and upper portions 60 and 62 each include dual or first and second cam tracks 60a, 60b and 62a thereon. As shown in FIG. 21, cam tracks 62a and 62b on upper portion 62 each comprise two peaks 76a, 76b and 78a, 78b, two corresponding to the door closed position 76a, 76b and the others corresponding to the door open position 78a, 78b. These peaks or detents are sized to receive the lower portion's cam tracks 62a and 62b. FIG. 19, shows gravity hinge 104 in the closed position. Preferably, closed peaks 76a and 76b extend vertically higher than open peaks 78a and 78b. With this arrangement, when a user pushes the door from the open position toward the closed position, as a result of gravity and the potential energy stored when the door is in the open position, the door will fall to the closed position. As shown in FIGS. 19-21, in a preferred embodiment, closed peaks 76a and 76b are about 180° apart. Also, open peaks 78a and 78b are about 180° apart. This helps distribute the weight or load of the door and helps prevent door sag. damage, wear and tear, etc.

It will be understood by those skilled in the an that all of the components of display case door assembly 10, including door 12 (e.g., vacuum panel 20, rail 18, etc.), gravity hinges 52 or 104 and electrical hinge pin 54, among others, are all reversible and can be used on left hinge and right hinge doors. For example, see FIG. 15, which shows the same configuration gravity hinge 52 for left hinge and right hinge doors. In another embodiment, the components of the upper and lower portions 60, 62 of the gravity hinges can be reversed such that the concave portions of the cam track are on the lower portion, the convex portions of the cam track are on the upper portion and the axial rod extends from the upper portion, etc.

In some embodiments, gravity hinge 104 can be replaced with one or more torque hinges. The torque hinges may be configured to apply a torque to door 12 which automatically returns door 12 to a closed position. For example, the torque hinges may include internal springs (e.g., torsion springs, linear springs, etc.) which store energy when door 12 is opened and apply a closing torque to door 12 (i.e., a torque which causes door 12 to move toward the closed position). In some embodiments, the torque hinges are attached directly to vacuum panel 20. Examples of torque hinges which may be used in display case door assembly 10 include any of the torque hinges manufactured by TorqMaster International of Stamford, Conn.

Electrical Hinge Pin

Figure 13:
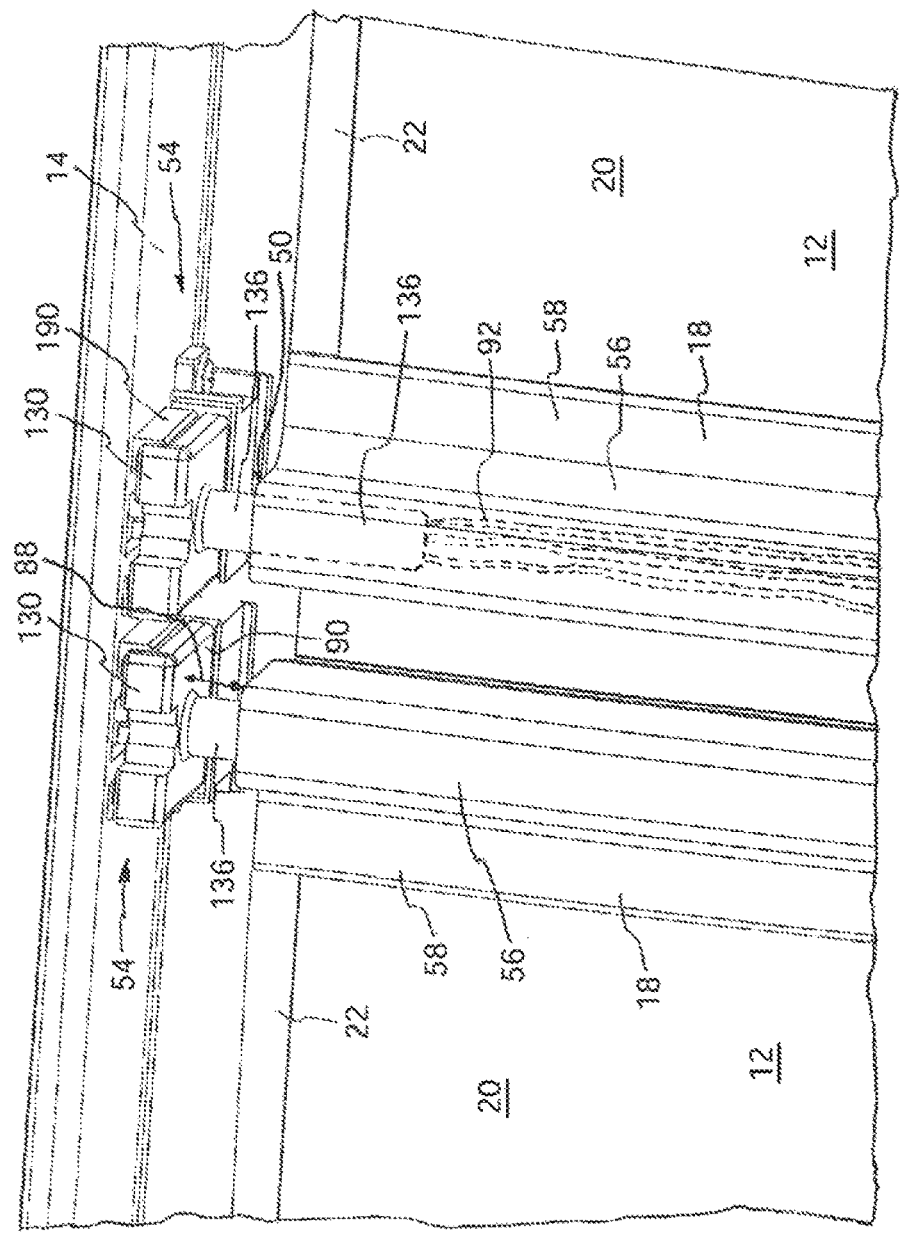
FIG. 13 is a partial interior perspective view of the assembly of FIG. 1, showing electrical hinge pins and doors, according to an exemplary embodiment.
Figure 14:
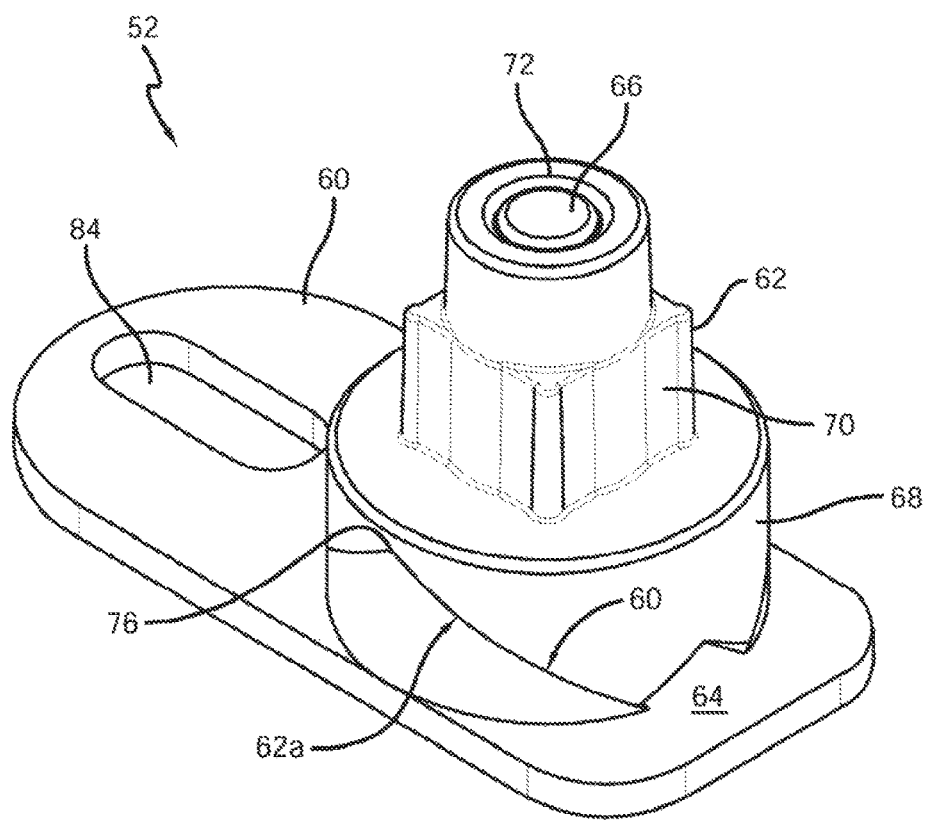
FIG. 14 is a perspective view of a gravity hinge for use with the display case door assembly of FIG. 1, according to an exemplary embodiment.
Figure 15:
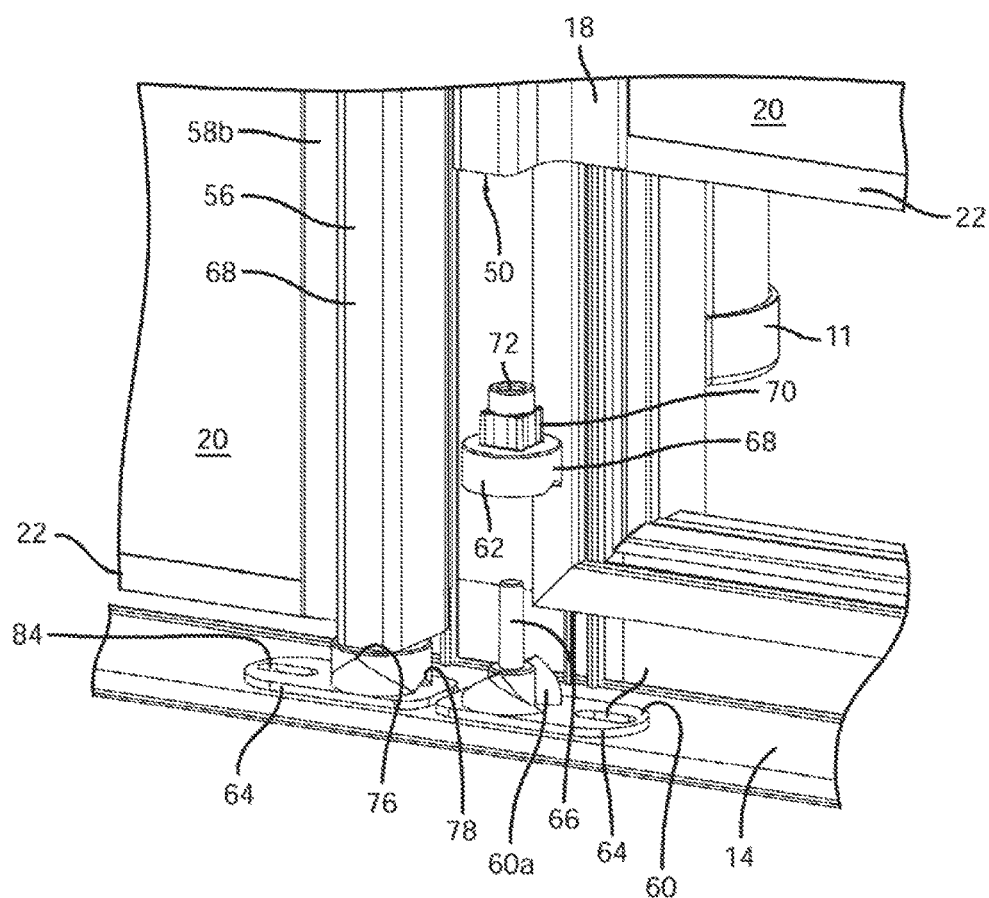
FIG. 15 is a partial interior perspective view of the assembly of FIG. 1 showing the gravity hinge of FIG. 14 exploded from the door and rail, according to an exemplary embodiment.
Figure 18:
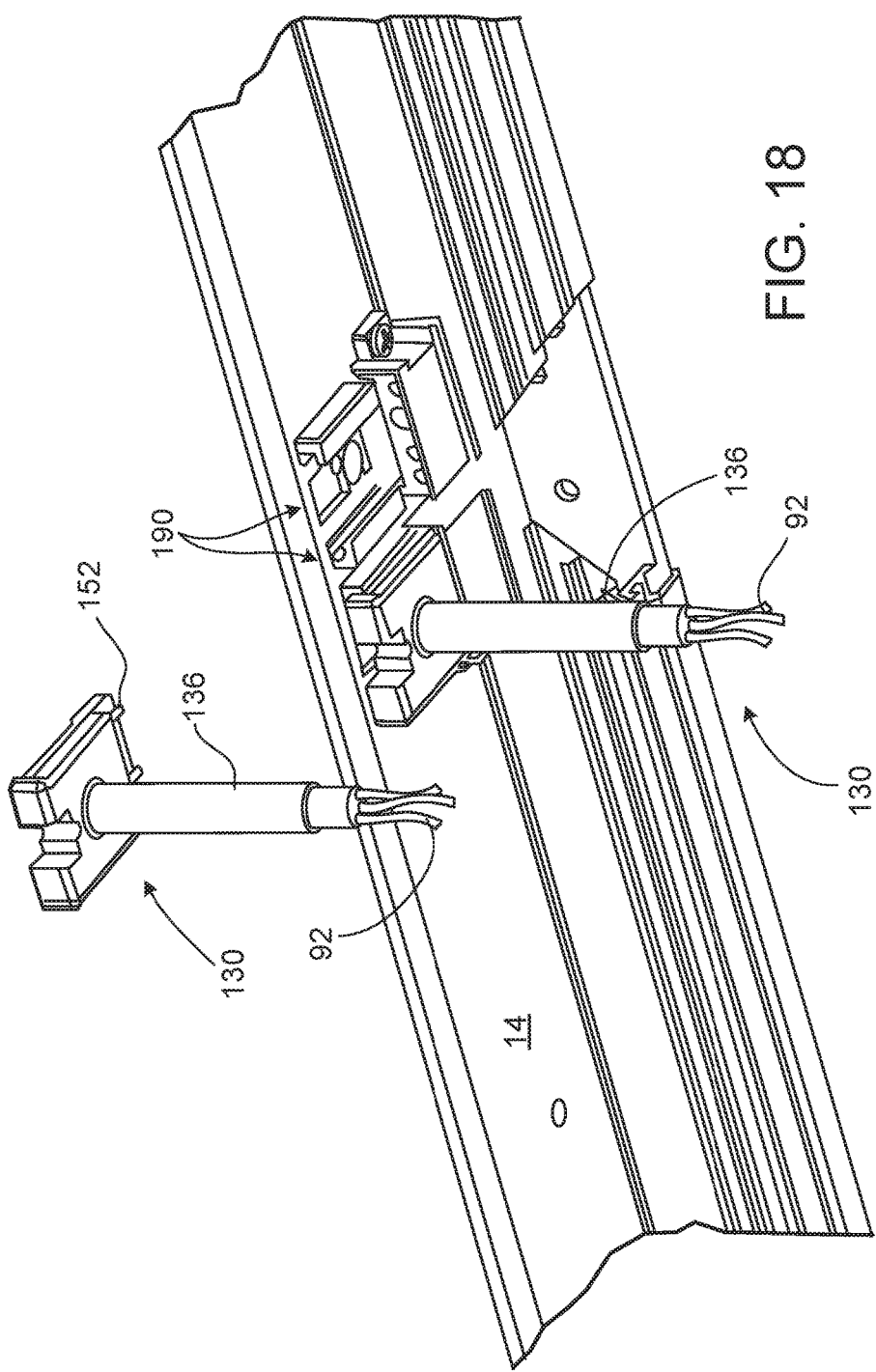
FIG. 18 is a perspective view drawing of two electrical hinge pins for use with the display case door assembly of FIG. 1, showing one of the hinge pins exploded away from a female connector, according to an exemplary embodiment.

With reference to FIGS. 13 and 18, as discussed above, the assembly preferably includes an electrical or plug in hinge pin 54 at the top thereof. For example, electrical hinge pin 54 can be that taught in U.S. Pat. No. 4,671,582 (referred to herein as "the '582 patent"), titled combined plug-in hinge pin and double ended electrical connector for a hinged appliance door, with mating receptacle and connectors, issued Jun. 9, 1987, the entirety of which is incorporated herein by reference. As shown in FIG. 18, the components identified as the combined plug-in hinge pin and double-ended electrical plug assembly 130, hinge pin part 136, male contact pin members 152, and female connector assembly 190 are numbered items 30, 36, 52, and 90 of the '582 patent.

In a preferred embodiment, there is a gap 88 between the top of rail 18. As shown in FIG. 13, gap 88 is more specifically between rail 18 and reinforcing member 90 (part of the male connection portion of electrical hinge pin 54).

Gap 88 allows door 12 to travel up and down as a result of the cam action of gravity hinge 52.

As shown in FIG. 13, electrical hinge pin 54 includes a hinge pin part 136 that extends downwardly into the top opening of tunnel 50. Therefore, hinge pin part 136 and hinge pin 70 are coaxial (as a result of both extending into tunnel 50) and allow door 12 to pivot. Hinge pin part 136 houses insulated conductors 92 that extend out of the bottom of hinge pin part 136 and into tunnel 50. As shown in FIG. 10, which is across section of door 12, rail 18 includes a conductor opening 94 defined therein that provides communication between tunnel 50 and channel 74. For implementations in which vacuum panel 20 is powered, power can run from a wall outlet or the like, through wiring hidden in frame 14, through electrical hinge pin 54 down wires 92 extending down tunnel 51, through the conductor opening 94, into channel 74 and to solder tabs 96. Solder tabs 96 may connect with bus bars to provide power to an electro-conductive coating (e.g., on surface 29). In this arrangement, all the wires necessary to provide power to the electro-conductive coating (if any) can be hidden from view of a consumer.

In a preferred embodiment, rail 18 also includes wire access opening 98 that opens to the outside of rail 18. In this embodiment wires 92 from electrical hinge pin 54 pass down tunnel 50 to opening 98, and wires 92 from the bus pass down channel 74, through opening 94 to opening 98 where, during assembly, electrical connections between the wires can be made externally. Once electrical hinge pin 54 and vacuum panel 20 lead connections are made, wires 92 are placed back into rail 18 and an access cover 100 is inserted in the wire access hole 98 to conceal the connections. Access cover 100 is preferably made of plastic or the like and includes tabs 102 that secure it within the opening 98 via a snap fit.

Display Case Door Assembly with Lighting Features

Referring now to FIGS. 22-33, another display case door assembly 200 is shown, according to an exemplary embodiment. Display case door assembly 200 may be used in conjunction with a temperature-controlled storage device (e.g., a refrigerator, a freezer, a warmer, a heater, etc.) to provide access to a temperature-controlled space. In some embodiments, display case door assembly 200 is part of a refrigerated merchandiser configured for storing and/or displaying refrigerated or frozen goods. For example, display case door assembly 200 may be implemented as part of a refrigerated display case in a supermarket, warehouse store, or other similar facility. Display case door assembly 200 can be used as part of a medium-temperature refrigerated display case (e.g., a refrigerator), a low-temperature refrigerated display case (e.g., a freezer), or other types of refrigerated display cases.

Figure 23:
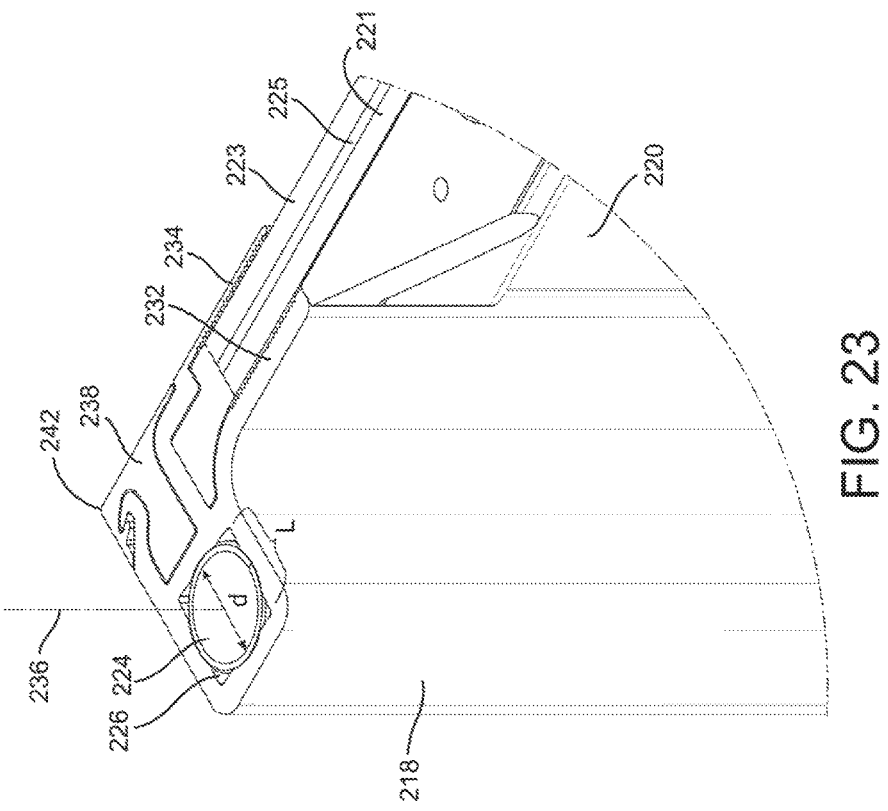
FIG. 23 is a front perspective detail view of a corner of the display case door assembly of FIG. 22, according to an exemplary embodiment.
Figure 22:
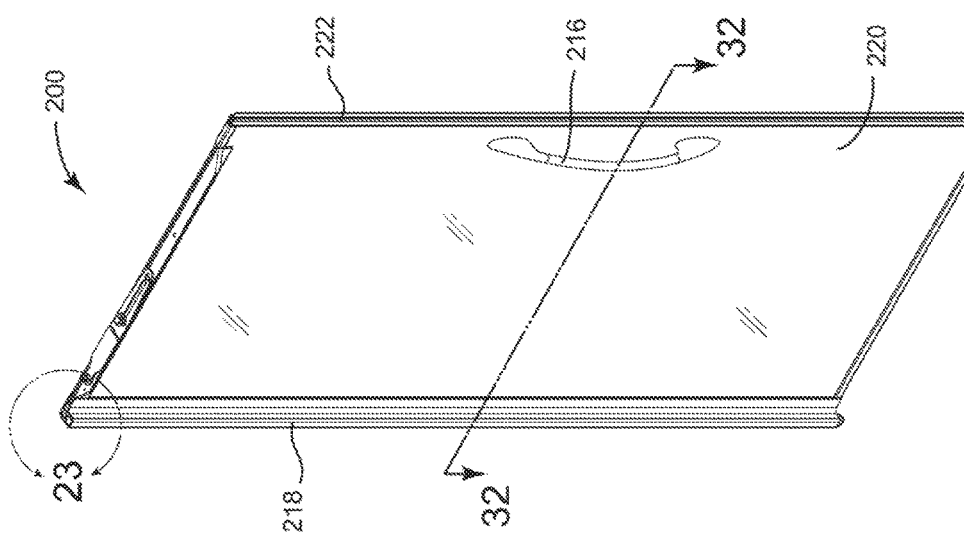
FIG. 22 is a front perspective view of another display case door assembly, according to an exemplary embodiment.
Figure 25:
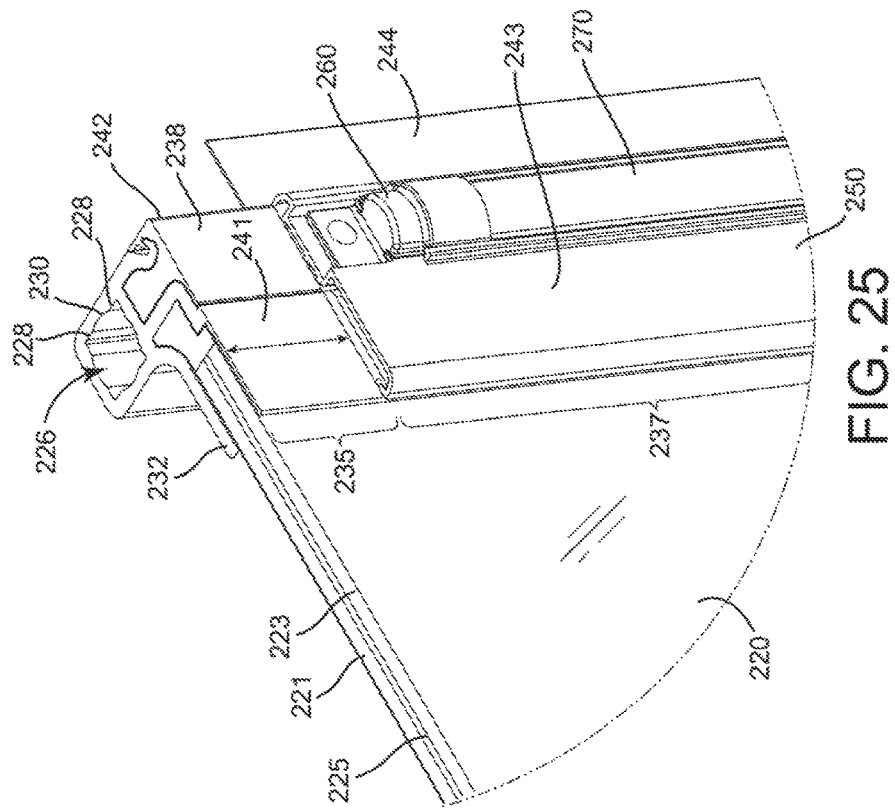
FIG. 25 is a rear perspective detail view of the coiner of display case door assembly shown in FIG. 24, according to an exemplary embodiment.
Figure 24:
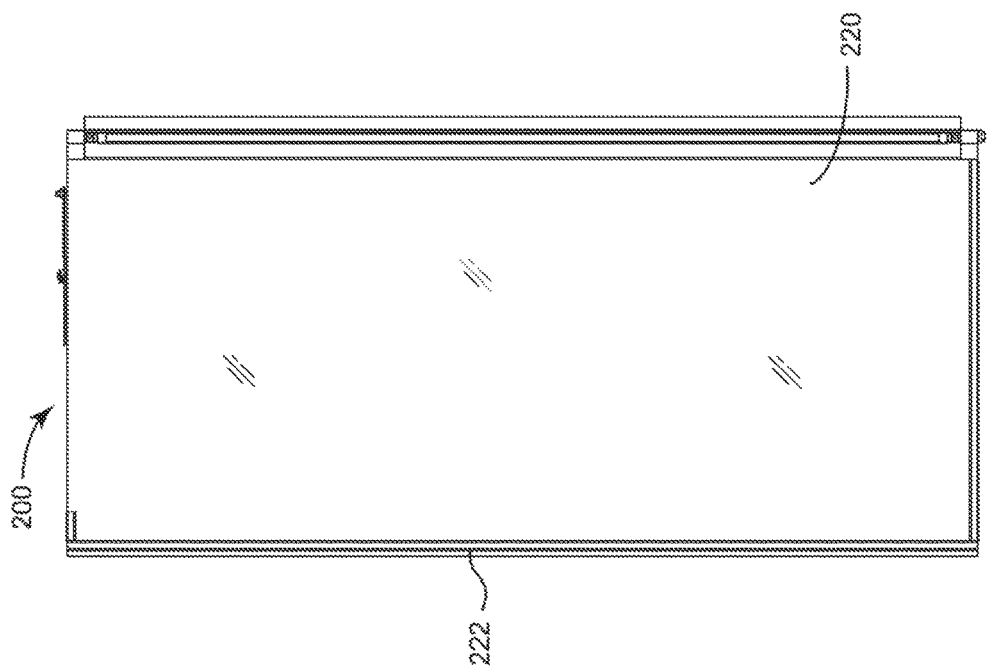
FIG. 24 is a rear elevation view of the display case door assembly of FIG. 22, according to an exemplary embodiment.
Figure 26:
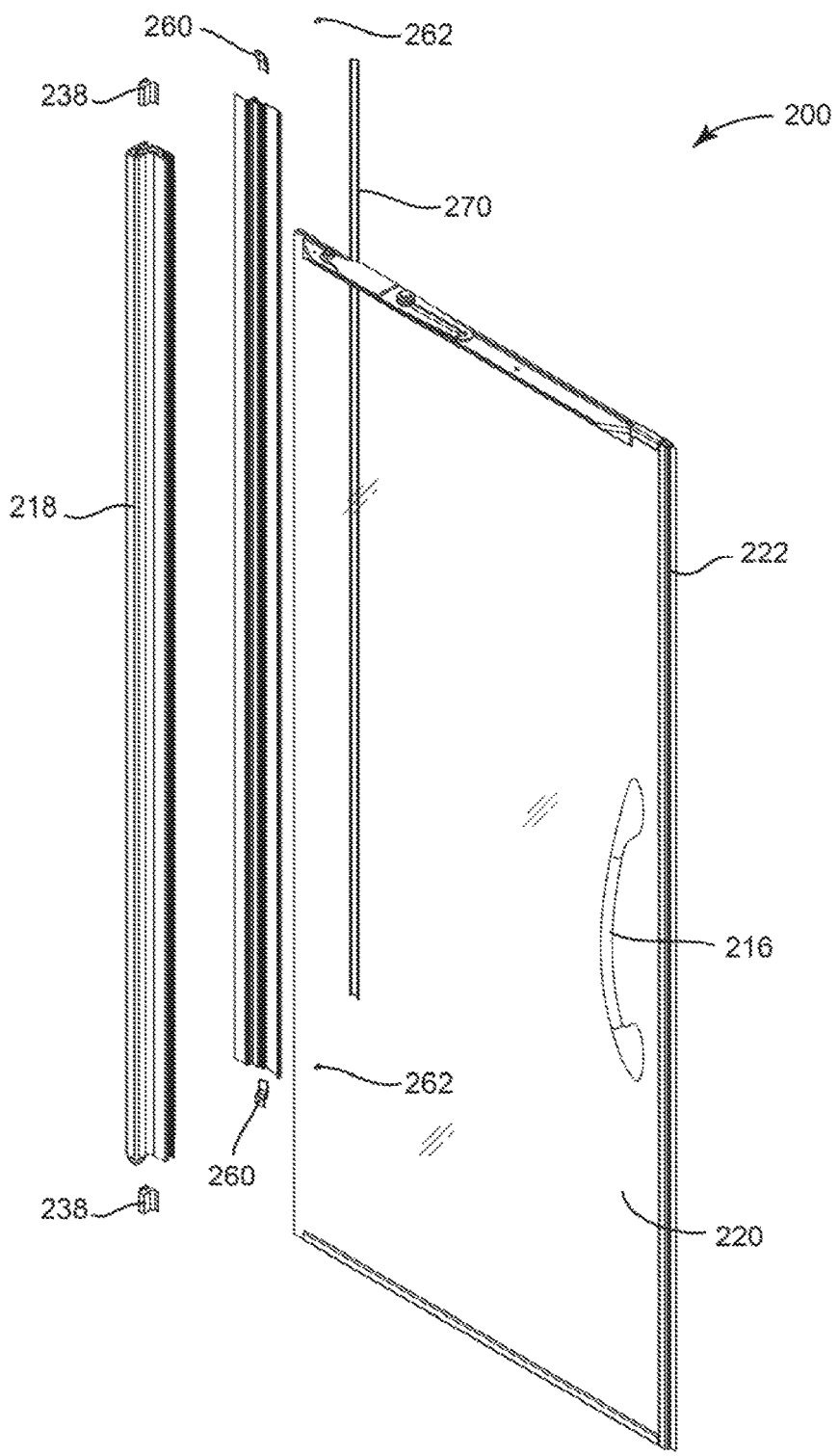
FIG. 26 is an exploded view of the display case door assembly of FIG. 22, according to an exemplary embodiment.

Referring particularly to FIGS. 22-25, several drawings illustrating display case door assembly 200 in an assembled state are shown. FIG. 22 is a front perspective view of display case door assembly 200; FIG. 23 is a front perspective detail view of a corner of display case door assembly 200; FIG. 24 is a rear elevation view of display case door assembly 200; and FIG. 25 is a rear perspective detail view of the corner of display case door assembly 200. Display case door assembly 200 may include some or all of the components of display case door assembly 10, as described with reference to FIGS. 1-21. In some embodiments, display case door assembly 200 includes some or all of the features described in U.S. patent application Ser. Nos. 15/058,898, 14/563,760, and/or U.S. Provisional Patent Application No. 61/938,555. The entire disclosure of each of these patent applications is incorporated by reference herein.

Display case door assembly 200 is shown to include a vacuum panel 220, a hinge rail 218, a handle 216, and edge guards 222. Display case door assembly 200 may also include lighting features (e.g., a LED module strip, light caps, a light mounting bracket, etc.) configured to provide lighting for the refrigerated display case. Each of these components is described in greater detail below.

Vacuum panel 220 may be the same or similar to vacuum panel 20 in display case door assembly 100. Vacuum panel 220 includes one or more panes of transparent or substantially transparent glass (e.g., insulated glass, non-tempered glass, tempered glass, etc.), plastics, or other transparent or substantially transparent materials. As such, vacuum panel 220 may be referred to as a transparent unit. In some embodiments, vacuum panel 220 includes multiple transparent panes arranged in parallel with a small gap therebetween. For example, vacuum panel 220 is shown to include a first vacuum pane 221 and a second vacuum pane 223. Vacuum panes 221 and 223 may be separated by a small gap 225 which can be evacuated to draw a vacuum between panes 221 and 223. The vacuum within gap 225 provides a thermal insulation effect which enhances the performance of display case door assembly 200 as an insulated display case door.

Hinge rail 218 is configured to support vacuum panel 220 and can rotate between an open position and a closed position. In some embodiments, hinge rail 218 is a single component that performs the functions of both a rail (i.e., supporting vacuum panel 220) and a hinge (i.e., allowing vacuum panel 220 to rotate). For example, a side edge of vacuum panel 220 can be inserted into a channel between parallel arms 232 and 234 of hinge rail 218 (shown in FIG. 23). Hinge rail 218 may be configured to grip vacuum panel 220 between arms 232-234 (e.g., using teeth along the inside surfaces of arms 232-234) to fix vacuum panel 220 to hinge rail 218. Hinge rail 218 can be made of any of a variety of materials (e.g., aluminum, stainless steel, other metals, a composite material, fiberglass, etc.) and formed using any of a variety of manufacturing processes (e.g., extrusion, pultrusion, casting, molding, etc.).

Hinge rail 218 is shown to include an opening 226 at the top end of hinge rail 218. A similar opening 226 may be included at the bottom end of hinge rail 218. Openings 226 may be configured to receive an axle 224, pin, or other object defining an axis 236 about which hinge rail 218 rotates. Axle 224 may include cylindrical pins extending from the top and bottom of a perimeter frame of the temperature-controlled storage device. In some embodiments, openings 226 are substantially rectangular and have square corners. For example, FIG. 23 shows opening 226 as a substantially square opening with a side length of L. However, opening 226 may include rounded edges. For example, FIG. 25 shows opening 226 with axle 224 removed. The edges of opening 226 are shown to include linear corner segments 228 extending from the corners of opening 226 and a curved central segment 230 joining the linear corner segments 228. Advantageously, this allows openings 226 to accommodate a cylindrical axle 224 having an outside diameter d greater than the side length L of the otherwise square openings 226.

In some embodiments, hinge rail 218 has a roughly L-shaped cross-section including a first end configured to receive vacuum panel 220 and a second end configured to receive axle 224. The first end may be defined by arms 232 and 234, whereas the second end may be defined by the perimeter of opening 226. The ends of the L-shaped cross-section may extend in substantially perpendicular directions from a common corner 242. In some embodiments, the corner 242 is formed by a removable corner block 238. Corner block 238 may include at least two substantially perpendicular and planar surfaces that intersect at an edge extending from corner 242. In some embodiments, corner block 238 includes three mutually perpendicular and planar surfaces (e.g., a rear surface, a top surface, and a side surface) that intersect at corner 242. In some embodiments, the rear surface of corner block 238 (shown in FIG. 25) is a flat surface against which a gasket can form a seal when hinge rail 218 is in a closed position.

Corner block 238 may be configured to fit within an opening 240 in hinge rail 218 (shown in FIG. 27). In some embodiments, corner block 238 is configured to be inserted into opening 240 in a direction parallel to the axis 236 about which hinge rail 218 rotates. For example, corner block 238 can be inserted into the top or bottom of hinge rail 218 via opening 240. Corner block 238 may have a relatively short length (e.g., one inch) along the direction of insertion relative to the total length of hinge rail 218 (e.g., the total height of the door). In some embodiments, one corner block 238 is inserted into the top of hinge rail 218 and another corner block 238 is inserted into the bottom of hinge rail 218 via openings 240 in the top and bottom ends of hinge rail 218. The distance between opposing corner blocks 238 may be occupied by lighting components secured to hinge rail 218.

In some embodiments, display case door assembly 200 is frameless. For example, vacuum panel 220 can attach directly to hinge rail 218 without requiring an intermediate frame to support and/or contain vacuum panel 220. Advantageously, the frameless configuration contributes to the minimalistic appearance of display case door assembly 200 and enhances the aesthetics provided by vacuum panel 220, which appears as a single pane of glass. In some embodiments, hinge rail 218 can be modified to include hinge clamps that attach to a top edge and/or bottom edge of vacuum panel 220 rather than the side edge. A first portion of the hinge clamps can be attached to vacuum panel 220, whereas a second portion of the hinge clamps can be fixed to a frame of the temperature-controlled storage device. The first portion of the hinge clamps can rotate relative to the second portion of the hinge clamps to permit vacuum panel 220 to rotate between an open position and a closed position.

Display case door assembly 200 is shown to include edge guards 222. In some embodiments, edge guards 222 are transparent moldings. Edge guards 222 may be adhered to the top edge, bottom edge, and/or non-hinge side edge of vacuum panel 220. Silicon or the like may be used for bonding edge guards 222 to the edges of vacuum panel 220. Edge guards 222 provide a sealing feature for display case door assembly 220. Similarly, display case door assembly 200 is shown to include a wiper 244 extending from hinge rail 218. Wiper 244 may be configured to contact a perimeter frame segment or mullion frame segment of the refrigerated display case when hinge rail 218 is in the closed position. In various embodiments, wiper 244 may be attached directly to hinge rail 218 or may be part of a mounting bracket 250 used to secure lighting components to hinge rail 218. Wiper 244 and edge guards 222 may be configured to seal a top edge, bottom edge, and/or side edges of display case door assembly 200 against a frame, mullion, or other display case door of the temperature-controlled storage device.

Display case door assembly 200 may include any of a variety of structures or features for connecting to the temperature-controlled storage device. For example, display case door assembly 200 may include a structure for housing wiring, a mullion, one or more gaskets, and/or other associated brackets and components typically included in refrigerated display cases. In some embodiments, display case door assembly 200 includes magnets around a perimeter of vacuum panel 220. The magnets can be configured to magnetically engage a frame of the temperature-controlled storage device when display case door assembly 200 is in a closed position and/or an open position. The magnets can hold display case door assembly 200 in the closed position and enhance the seal between display case door assembly 200 and the temperature-controlled storage device. Detailed descriptions of such components are provided in U.S. Pat. Nos. 6,606,832 and 6,606,833, both of which are incorporated by reference herein.

Referring now to FIGS. 26-29, several exploded views of display case door assembly 200 and components thereof are shown, according to an exemplary embodiment. Display case door assembly 200 is shown to include hinge rail 218, vacuum panel 220, top and bottom corner blocks 238, a mounting bracket 250, top and bottom tight caps 260, and a light cover 270. Vacuum panel 220 may be inserted into a vacuum panel channel 233 within hinge rail 218 such that a side edge of vacuum panel 220 is held within channel 233 between arms 232 and 234.

In some embodiments, hinge rail 218 includes a spacer block 246. Spacer block 246 can be inserted into hinge rail 218 to provide a surface against which the edge of vacuum panel 220 abuts when vacuum panel 220 is inserted into vacuum panel channel 233. As shown in FIG. 27, vacuum panel channel 233 may be bounded by spacer block 246, arm 232, and arm 234. In some embodiments, a top spacer block 246 is inserted into the top of hinge rail 218 and a bottom spacer block 246 is inserted into the bottom of hinge rail 218. Like corner blocks 238, spacer blocks 246 can be inserted into hinge rail 218 in a direction parallel to the axis 236 about which hinge rail 218 rotates.

Mounting bracket 250 may be configured to attach to the rear surface of hinge rail 218. In some embodiments, mounting bracket 250 includes coupling features (e.g., hooks, clips, snaps, geometric fittings, etc.) configured to secure mounting bracket 250 to hinge rail 218. Hinge rail 218 may include corresponding coupling features configured to mate with the coupling features of mounting bracket 250. Mounting bracket 250 can attach to hinge rail 218 and may be configured to support lighting features such as a lighting element (e.g., a LED strip, a fluorescent light tube, etc.), light caps 260, and light cover 270. For example, a lighting element 272 (shown in FIG. 33) can be mounted within a lighting channel 252 along the rear surface of mounting bracket 250 such that lighting element 272 emits light in a direction toward the products within the temperature-controlled storage device. Lighting element 272 can emit light toward the products within the temperature-controlled storage device when the display case door is closed, open, and/or in an intermediate position (e.g., partially open, partially closed, etc.).

In some embodiments, lighting channel 252 extends vertically (e.g., from top to bottom) along a side or edge of vacuum panel 220 and/or mounting bracket 250. Lighting element 272 can be oriented vertically within lighting channel 252. In other embodiments, lighting channel 252 extends horizontally (e.g., from side to side) along a top of bottom side or edge of vacuum panel 220 and/or mounting bracket 250. Lighting element 272 can be oriented horizontally within lighting channel 252. Lighting element 272 can be secured within lighting channel 252 using one or more fasteners, geometric fittings, adhesives, or other components configured to hold or retain lighting element 272 within lighting channel 252.

In some embodiments, mounting bracket 250 is configured to provide thermal insulation for display case door assembly 200. For example, mounting bracket 250 can be made of an insulating material (e.g., PVC) and positioned along a rear surface of hinge rail 218. In addition to providing support and protection for lighting element 272, mounting bracket 250 can provide thermal insulation along the rear surface of hinge rail 218 to reduce heat transfer through hinge rail 218. The thermal insulation provided by mounting bracket 250 can greatly reduce heat loss for embodiments in which hinge rail 218 is made of a thermally conductive material (e.g., aluminum of another metal, a composite material, etc.). In some embodiments, mounting bracket 250 is a hinge cover configured to provide thermal insulation for hinge rail 218 without necessarily providing mounting features for lighting element 272. For example, the hinge cover may be a flat insulating layer along the rear surface of hinge rail 218. It is contemplated that such a hinge cover can be used to improve the thermal insulation of display case door assembly 200 with or without lighting-related features and/or mounting features.

Light cover 270 can fit within lighting channel 252 over lighting element 272. Light cover 270 can protect lighting element 272 from damage and can provide thermal insulation for lighting element 272. For example, light cover 270 can completely cover lighting element 272 such that an isolated space 274 exists between lighting element 272 and light cover 270. Light cover 270 may provide a thermal barrier between space 274 and the interior of the temperature-controlled storage device. Heat produced by lighting element 272 may be trapped within space 274 such that only the air within space 274 is heated by lighting element 272. The thermal barrier provided by light cover 270 prevents lighting element 272 from heating the interior of the temperature-controlled storage device.

Light cover 270 may be configured to trap warmer air within space 274 such that lighting element 272 is exposed to a warmer temperature than the interior of the temperature-controlled space. This can enhance the functionality of lighting element 272 since many lighting elements perform better at higher temperatures. For example, a LED or fluorescent lighting element may emit higher intensity light at higher temperatures. Advantageously, the thermal barrier provided by light cover 270 can ensure that the temperature of space 274 is higher than the internal temperature of the temperature-controlled device. The higher temperature of space 274 may cause lighting element 272 to emit higher intensity light than would otherwise be emitted if lighting element 272 were exposed to the internal temperature of the temperature controlled storage device.

In some embodiments, light cover 270 is made of a transparent material. Light cover 270 can act as an optical lens to divert or direct the light emitted by lighting element 272. In some embodiments, light cover 270 functions as a concave lens to spread the light emitted by lighting element 272 across the interior of the temperature-controlled storage device. For example, the geometry of light cover 270 (e.g., thickness, curvature, angle, etc.) may be configured to receive light from a point source (e.g., lighting element 272) and spread the light across the products within the temperature-controlled storage device. In some embodiments, light cover 270 is configured to achieve an even distribution of the light emitted by lighting element 272 across the interior of the temperature-controlled storage device.

Light caps 260 may be configured to fit within lighting channel 252 and can be secured to mounting bracket 250 via fasteners 262. As shown in FIG. 28, light caps 260 may include an end portion 264, a middle portion 268, and a cover portion 269. End portion 264 is shown to include a rectangular surface having a hole 266 configured to receive fastener 262. The rectangular surface of end portion 264 may be configured to contact mounting bracket 250 within lighting channel 252. The bottom edge of end portion 264 may connect to a horizontal surface 267 extending radially outward from end portion 264 in a direction perpendicular to the rectangular surface of end portion 264. Surface 267 connects the bottom edge of end portion 264 to middle portion 268. In some embodiments, surface 267 has a linear edge along the bottom of end portion 264 and a curved edge along the top of middle portion 268.

Middle portion 268 is shown as a curved wall extending downward from the curved edge of surface 267. In some embodiments, middle portion 268 has a radius of curvature that matches the curvature of light cover 270. Middle portion 268 may be configured to align with light cover 270 such that the bottom edge of middle portion 268 contacts the top edge of light cover 270. Middle portion 268 may include an inner radius along the inner concave surface of middle portion 268, and an outer radius along the outer convex surface of middle portion 268. The thickness of middle portion 268 may define the difference between the inner radius and outer radius.

Cover portion 269 is shown as a curved wall extending downward from the outer convex surface of middle portion 268. In some embodiments, cover portion 269 has an inner concave surface with an inner radius, and an outer convex surface with an outer radius. The inner concave surface of cover portion 269 may have the same radius as the outer convex surface of middle portion 268. The inner concave surface of cover portion 269 may be configured to contact the outer convex surface of light cover 270. Light caps 260 can be mounted along the top and bottom of light cover 270 such that light cover 270 is held between cover portion 269 and mounting bracket 250.

In some embodiments, the height of mounting bracket 250 is less than the height of hinge rail 218. As shown in FIG. 25, mounting bracket 250 can be vertically centered on hinge rail 218 such that a small gap of height $h_1$ exists between the top of mounting bracket 250 and the top of vacuum panel 220. A similar gap of height $h_1$ may exist between the bottom of mounting bracket 250 and the bottom of vacuum panel 220. The top and bottom of vacuum panel 220 may align with the top and bottom of hinge rail 218. The height $h_1$ may be the same as the height of corner blocks 238. In some embodiments, arm 234 of hinge rail 218 includes end portions 235 within the gaps of height $h_1$ and a central portion 237 between the end portions 235. End portions 235 may be substantially planar having rectangular outer surfaces. Central portion 237 may include coupling features configured to engage corresponding coupling features of mounting bracket 250.

In some embodiments, wiper 244 is a component of mounting bracket 250. For example, FIG. 28 shows wiper 244 extending from a side surface of mounting bracket 250. Like mounting bracket 250, wiper 244 may have a height less than the height of hinge rail 218. A small gap of height $h_1$ may exist between the top of wiper 244 and the top of hinge rail 218. A similar gap of height $h_1$ may exist between the bottom of wiper 244 and the bottom of hinge rail 218.

In some embodiments, the height of light cover 270 is less than the height of mounting bracket 250. As shown in FIG. 25, light cover 270 can be vertically centered on hinge rail 218 and/or mounting bracket 250 such that a small gap of height $h_2$ exists between the top of light cover 270 and the top of mounting bracket 250. A similar gap of height $h_2$ may exist between the bottom of light cover 270 and the bottom of mounting bracket 250. The height $h_2$ may be equal to or greater than the combined height of end portion 264 and middle portion 268 of light cap 260.

Figure 30:
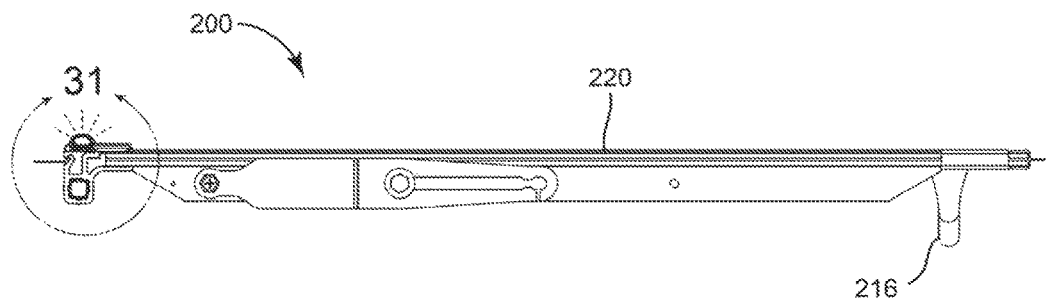
FIG. 30 is a top view of the display case door assembly of FIG. 22, according to an exemplary embodiment.
Figure 31:
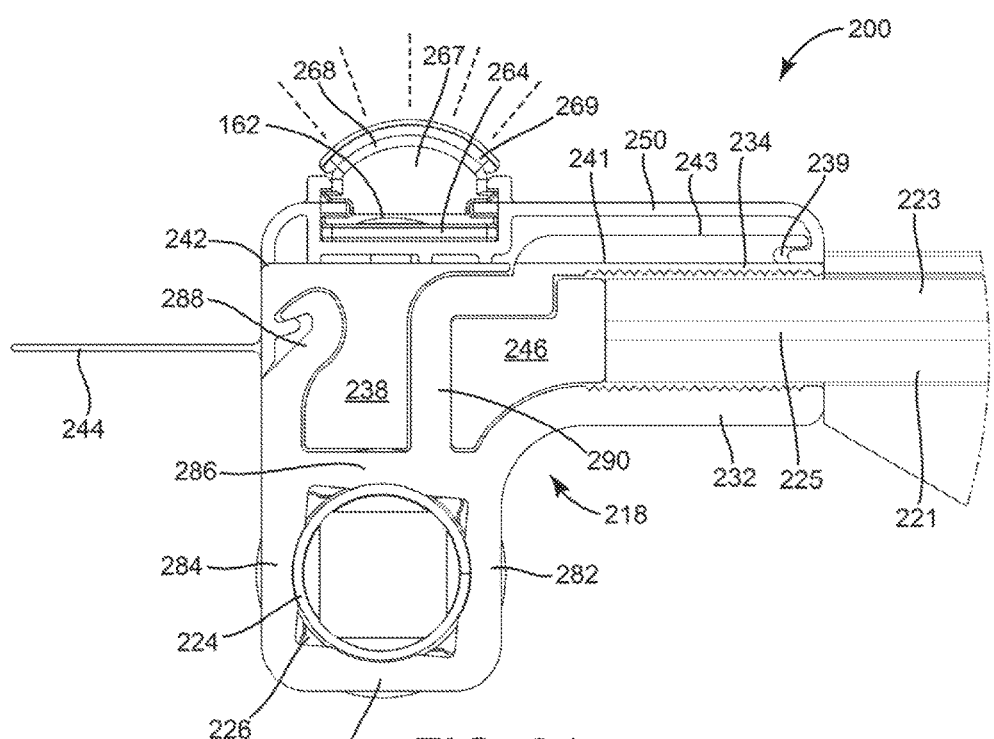
FIG. 31 is a detail lop view of the hinge rail shown in FIG. 30 and the components attached thereto, according to an exemplary embodiment.

Referring now to FIGS. 30-31, a top view of display case door assembly 200 is shown, according to an exemplary embodiment. FIG. 30 shows the entirety of display case door assembly 200, whereas FIG. 31 is a close-up view of hinge rail 218 and the components attached thereto. In FIG. 31, hinge rail 218 is shown to include a substantially rectangular portion formed by front wall 280, right side wall 282, left side wall 284, and rear wall 286. Walls 280-286 form a substantially rectangular opening 226 within which axle 224 is contained.

The intersection of rear wall 286 and right side wall 282 forms a corner from which arm 232 extends. In some embodiments, right side wall 282 extends rearward of rear wall 286 (i.e., toward the top of FIG. 31) and curves away from the rectangular portion formed by walls 280-286. Arm 232 is shown extending from the curved portion of rear wall 286 in a direction substantially parallel to rear wall 286 and away from right side wall 282.

Similarly, the intersection of rear wall 286 and left side wall 284 forms a corner from which an arm 288 extends. In some embodiment, left side wall 284 extends rearward of rear wall 286, forming arm 288. Arm 288 is shown curving inward (i.e., toward right side wall 282) and then curving back outward as arm 288 extends rearward of wall 286. The end of arm 288 forms a coupling feature (e.g., a hook or clip) configured to engage a corresponding coupling feature of mounting bracket 250 and/or corner block 238.

Hinge rail 218 is shown to include another wall 290 extending from rear wall 286. Wall 290 connects to a middle portion of rear wall 286 between the corners formed by the intersection of rear wall 286 with right side wall 282 and left side wall 284. Wall 290 is shown extending rearward of rear wall 286, rearward of arm 232, and curving outward (i.e., to the right in FIG. 31) to form arm 234. Arms 232 and 234 are substantially parallel and offset by the thickness of vacuum panel 220.

Arm 234 is shown to include a first surface 241 and a second surface 243. First surface 241 may be a rearward-facing surface of end portion 235 (e.g., above mounting bracket 250), whereas second surface 243 may be a rearward-facing surface of central portion 237. Second surface 243 is offset rearward of first surface 241. As shown in FIG. 31, a small gap 239 exists between surfaces 241 and 243. Gap 239 may be configured to receive a coupling feature of mounting bracket 250 (e.g., a hook or clip) to attach mounting bracket 250 to hinge rail 218.

Figure 32:
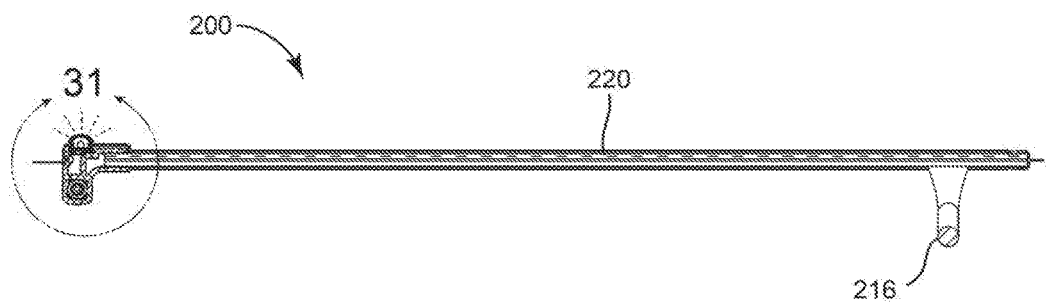
FIG. 32 is a top cross-sectional view of the display case door assembly of FIG. 22, according to an exemplary embodiment.
Figure 33:
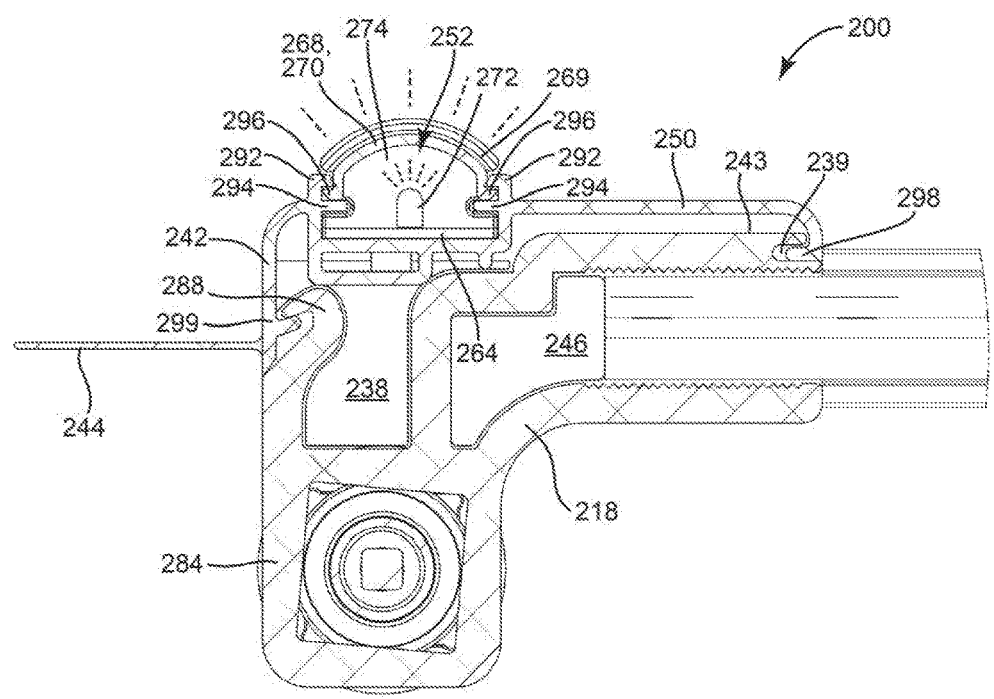
FIG. 33 is a detail top cross-sectional view of the hinge rail shown in FIG. 32 and the components attached thereto, according to an exemplary embodiment.

Referring now to FIGS. 32-33, a top cross-sectional view of display case door assembly 200 is shown, according to an exemplary embodiment. FIG. 32 shows the entirety of display case door assembly 200, whereas FIG. 33 is a close-up view of hinge rail 218 and the components attached thereto. In FIG. 33, mounting bracket 250 is shown to include coupling features 298 and 299. Coupling feature 298 is shown as a hook or clip configured to fit within gap 239 and to engage a corresponding component of hinge rail 218 (e.g., surface 243) along the rear surface of hinge rail 218. Similarly, coupling feature 299 is shown as a hook or clip configured to engage a corresponding component of hinge rail 218 (e.g., arm 288) along the left side of hinge rail 218.

In some embodiments, mounting bracket 250 is configured to align with left side wall 284 such that mounting bracket 250 and left side wall 284 form a substantially flat surface.

Mounting bracket 250 is shown to include a substantially rectangular lighting channel 252 within which lighting components are contained. For example, lighting channel 252 is shown containing a lighting element 272 configured to emit light toward the interior of the temperature-controlled storage device. Mounting bracket 250 may define the front surface, right side surface, and left side surface of lighting channel 252. However, the rear face of lighting channel 252 may be open to allow light emitted by the lighting element 272 to reach the interior of the temperature-controlled storage device. Lighting channel 252 is shown to include rear corners 292 and coupling features 294 extending into lighting channel 252. Small gaps between corners 292 and coupling features 294 are configured to receive side edges 296 of light cover 270 and/or light caps 260 (e.g., edges of middle portion 268) to secure light cover 270 and/or light caps 260 to mounting bracket 250. In some embodiments, light cover 270 can be secured to mounting bracket 250 using an adhesive or fastener. The adhesive or fastener can be used in place of or in addition to the geometric fitting between coupling features 294 and side edges 296 shown in FIG. 33.

Configuration of Exemplary Embodiments

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over older implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or resequenced according to alternative embodiments. Other substitutions, modifications, changes, and omissions may be made in the design, operating conditions and arrangement of the exemplary embodiments without departing from the scope of the present disclosure.

What is claimed is:

1. A frameless vacuum-insulated refrigerated display case door, comprising:
   a hinge rail comprising a channel portion and a hinge receiving portion, the hinge receiving portion defining two openings configured to receive hinge pins for mounting the door to a refrigerated display case, the hinge rail having a rear portion arranged to face into the refrigerated display case with the door mounted to the refrigerated display case;
   a vacuum-insulated glass (VIG) panel assembly comprising two panes of glass bounding a sealed evacuated space between the panes, a first edge of the VIG panel assembly disposed within the channel portion of the hinge rail, wherein other edges of the VIG panel assembly are unbounded by frame members; and a lighting element coupled to the rear portion of the hinge rail.

2. The door of claim 1, further comprising a mounting bracket coupled to a rear portion of the hinge rail, wherein the lighting element is coupled within the mounting bracket.

3. The door of claim 2, wherein the mounting bracket comprises a wiper configured to seal the door when the door is in a closed position.

4. The door of claim 1, further comprising a wiper attached to one of the other edges of the VIG panel assembly, the wiper configured to provide a seal along an edge of the door.

5. The door of claim 1, further comprising a handle secured to the VIG panel assembly near a side opposite the first edge of the VIG panel.

6. The door of claim 1, wherein the lighting element extends along a length of the hinge rail and is substantially parallel to the channel portion.

7. The door of claim 1, wherein the lighting element extends along at least a majority of a length of the hinge rail.

8. The door of claim 1, wherein the VIG panel assembly comprises a perimeter seal bonding the panes along a perimeter of the panes.

9. The door of claim 1, wherein the VIG comprises an anti-reflective coating configured to absorb or transmit light.

10. A refrigerated display case comprising:
a frame; and
a first vacuum-insulated door and a second vacuum-insulated door mounted to the frame, each of the first vacuum-insulated door and the second vacuum-insulated door comprising:
a hinge rail comprising a channel portion and a hinge receiving portion, the hinge receiving portion defining two openings configured to receive hinge pins for mounting the door to a refrigerated display case, the hinge rail having a rear portion arranged to face into the refrigerated display case with the door mounted to the refrigerated display case;
a vacuum-insulated glass (VIG) panel assembly comprising two panes of glass bounding a sealed evacuated space between the panes, a first edge of the VIG panel assembly disposed within the channel portion of the hinge rail, wherein other edges of the VIG panel assembly are unbounded by frame members; and
a lighting element coupled to the rear portion of the hinge rail.

11. The refrigerated display case of claim 10, further comprising a mounting bracket coupled to a rear portion of the hinge rail, wherein the lighting element is coupled within the mounting bracket.

12. The refrigerated display case of claim 11, wherein the mounting bracket comprises a wiper configured to seal the door when the door is in a closed position.

13. The refrigerated display case of claim 10, further comprising a wiper attached to one of the other edges of the VIG panel assembly, the wiper configured to provide a seal along an edge of the door.

14. The refrigerated display case of claim 10, further comprising a handle secured to the VIG panel assembly near a side opposite the first edge of the VIG panel.

15. The refrigerated display case of claim 10, wherein the lighting element extends along a length of the hinge rail and is substantially parallel to the channel portion.

16. The refrigerated display case of claim 10, wherein the lighting element extends along at least a majority of a length of the hinge rail.

17. The refrigerated display case of claim 10, wherein the VIG panel assembly comprises a perimeter seal bonding the panes along a perimeter of the panes.

18. The refrigerated display case of claim 10, wherein the VIG comprises an anti-reflective coating configured to absorb or transmit light.

* * * * *